US011622340B2

(12) United States Patent
Si et al.

(10) Patent No.: US 11,622,340 B2
(45) Date of Patent: Apr. 4, 2023

(54) METHOD AND APPARATUS FOR SS/PBCH BLOCK PATTERNS IN HIGHER FREQUENCY RANGES

(71) Applicant: Samsung Electronics Co., Ltd., Suwon-si (KR)

(72) Inventors: Hongbo Si, Plano, TX (US); Yingzhe Li, Sunnyvale, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/112,868

(22) Filed: Dec. 4, 2020

(65) Prior Publication Data

US 2021/0195537 A1 Jun. 24, 2021

Related U.S. Application Data

(60) Provisional application No. 62/951,547, filed on Dec. 20, 2019, provisional application No. 63/049,221, (Continued)

(51) Int. Cl.
*H04W 4/00* (2018.01)
*H04W 56/00* (2009.01)
(Continued)

(52) U.S. Cl.
CPC ......... *H04W 56/001* (2013.01); *H04L 5/0094* (2013.01); *H04L 27/2607* (2013.01); (Continued)

(58) Field of Classification Search
CPC ................. H04W 28/04; H04W 72/04; H04W 72/042; H04W 88/08; H04W 56/001; (Continued)

(56) References Cited

U.S. PATENT DOCUMENTS 10,462,761 B2 * 10/2019 Li .................... H04L 5/0094
2018/0248642 A1  8/2018 Si et al.
(Continued)

FOREIGN PATENT DOCUMENTS

CA  3070072 A1 *  1/2019 .......... H04J 11/0069
CA  3093496 A1 * 10/2019 ............ H04J 3/0638
(Continued)

OTHER PUBLICATIONS

Moderator (Intel Corporation), Summary #4 of email discussion on initial access aspect of NR extension up to 71 GHz, Jan. 25-Feb. 5, 2020, 3GPP TSG RAN WG1 Meeting #104-e, e-Meeting, R1-2101971, pp. 1-198 (Year: 2020).*
(Continued)

*Primary Examiner* — Phuongchau Ba Nguyen

(57) ABSTRACT

Methods and apparatuses in a wireless communication system. A method of operating a user equipment (UE) includes receiving a synchronization signals and physical broadcast channel (SS/PBCH) block; determining a numerology of the SS/PBCH block, wherein the numerology includes a subcarrier spacing (SCS) and a cyclic prefix (CP) length; and determining a SS/PBCH block pattern based on the numerology, the SS/PBCH block pattern including candidate SS/PBCH blocks that are mapped to slots within a half frame and a minimum gap ($N_{gap}^\mu$) between neighboring candidate SS/PBCH blocks, wherein: $N_{gap}^\mu=0$ symbol, based on a determination that the SCS included in the numerology of the SS/PBCH block is 120 kHz or 240 kHz; or $N_{gap}^\mu=1$ symbol, based on a determination that the SCS included in the numerology of the SS/PBCH block is 480 kHz or 960 kHz.

19 Claims, 24 Drawing Sheets

Related U.S. Application Data filed on Jul. 8, 2020, provisional application No. 63/073,752, filed on Sep. 2, 2020, provisional application No. 63/074,794, filed on Sep. 4, 2020.

(51) Int. Cl.
  *H04W 72/00* (2023.01)
  *H04W 16/14* (2009.01)
  *H04L 27/26* (2006.01)
  *H04W 72/0446* (2023.01)
  *H04L 5/00* (2006.01)

(52) U.S. Cl.
  CPC ......... *H04W 16/14* (2013.01); *H04W 72/005* (2013.01); *H04W 72/0446* (2013.01)

(58) Field of Classification Search
  CPC ............... H04W 16/14; H04W 72/005; H04W 72/0446; H04L 5/0007; H04L 5/0094; H04L 27/2607; H04L 5/001; H04L 5/0048; H04L 27/0006; H04L 27/2602; H04L 27/26025
  See application file for complete search history.

(56) References Cited

U.S. PATENT DOCUMENTS

| | | | | |
|---|---|---|---|---|
| 2019/0037509 | A1 | 1/2019 | Li et al. | |
| 2019/0090210 | A1* | 3/2019 | Islam | .............. H04L 5/0091 |
| 2019/0191457 | A1* | 6/2019 | Si | .............. H04L 5/0078 |
| 2019/0208482 | A1* | 7/2019 | Tooher | ............... H04L 27/2607 |
| 2019/0306832 | A1* | 10/2019 | Si | .............. H04W 56/0015 |
| 2020/0014512 | A1* | 1/2020 | Ramadan | .............. H04L 27/2613 |
| 2020/0053670 | A1* | 2/2020 | Jung | .............. H04W 56/0015 |
| 2020/0053781 | A1* | 2/2020 | Pan | .............. H04W 72/005 |
| 2020/0280940 | A1* | 9/2020 | Kim | .............. H04L 5/0048 |
| 2020/0404601 | A1* | 12/2020 | Lin | .............. H04W 56/001 |
| 2021/0135815 | A1* | 5/2021 | Reddy | .............. H04L 5/001 |
| 2021/0195537 | A1* | 6/2021 | Si | .............. H04L 5/0094 |
| 2021/0314938 | A1* | 10/2021 | Kim | .............. H04L 27/26025 |
| 2022/0286983 | A1* | 9/2022 | Yoshimura | .............. H04W 72/042 |

FOREIGN PATENT DOCUMENTS

| | | | | |
|---|---|---|---|---|
| CA | 3095950 | A1 * | 10/2019 | ........... H04J 11/0069 |
| CN | 110999183 | A * | 4/2020 | ........ H04W 72/0406 |
| WO | 2017/192019 | A1 | 11/2017 | |
| WO | WO-2018137541 | A1 * | 8/2018 | ............ H04W 72/04 |
| WO | WO-2019022519 | A1 * | 1/2019 | ......... H04L 27/0006 |
| WO | WO-2019160353 | A1 * | 8/2019 | ......... H04L 41/0896 |
| WO | WO-2020145487 | A1 * | 7/2020 | ............ H04L 27/26 |

OTHER PUBLICATIONS

Arvind Chakrapani, On the Design Details of SS/PBCH, Signal Generation and PRACH in 5G-NR, Jun. 16, 2020, IEEE Access, pp. 1-21 (Year: 2020).*
"3rd Generation Partnership Project; Technical Specification Group Radio Access Network; NR; Physical channels and modulation (Release 15)", 3GPP TS 38.211 V15.7.0, Sep. 2019, 97 pages.
"3rd Generation Partnership Project; Technical Specification Group Radio Access Network; NR; Multiplexing and channel coding (Release 15)", 3GPP TS 38.212 V15.7.0, Sep. 2019, 101 pages.
"3rd Generation Partnership Project; Technical Specification Group Radio Access Network; NR; Physical layer procedures for control (Release 15)" 3GPP TS 38.213 V15.7.0, Sep. 2019, 108 pages.
"3rd Generation Partnership Project; Technical Specification Group Radio Access Network; NR; Physical layer procedures for data (Release 15)", 3GPP TS 38.214 V15.7.0, Sep. 2019, 106 pages.
"3rd Generation Partnership Project; Technical Specification Group Radio Access Network; NR; Radio Resource Control (RRC) protocol specification (Release 15)", 3GPP TS 38.331 V15.7.0, Sep. 2019, 527 pages.
International Search Report of the International Searching Authority in connection with International Application No. PCT/KR2020/018556 dated Mar. 2, 2021, 3 pages.
Nokia, et al., "Discussion on NR V2X Sidelink Synchronization mechanism", 3GPP TSG-RAN WG1 Meeting #98bis, R1-1910515, Chongqing, China, Oct. 14-20, 2019, 12 pages.
Spreadtrum Communications, "Discussion on synchronization mechanism for NR V2X", 3GPP TSG RAN WG1 Meeting #99, R1-1912578, Reno, USA, Nov. 18-22, 2019, 14 pages.
Vivo, "NR sidelink synchronization mechanism", 3GPP TSG RAN WG1 Ad-Hoc Meeting 1901, R1-1900119, Taipei, Jan. 21-25, 2019, 13 pages.
Extended European Search Report dated Dec. 19, 2022 regarding Application No. 20903507.0, 10 pages.
OPPO, "Initial access signals/channels for NR-U", 3GPP TSG RAN WG1 #97, R1-1906483, May 2019, 5 pages.
Qualcomm Incorporated, "Feature lead summary on initial access signals and channels for NR-U", 3GPP TSG RAN WG1 Meeting #97, R1-1907733, May 2019, 43 pages.

* cited by examiner

FIG. 7

METHOD AND APPARATUS FOR SS/PBCH BLOCK PATTERNS IN HIGHER FREQUENCY RANGES

CROSS-REFERENCE TO RELATED APPLICATIONS AND CLAIM OF PRIORITY

The present application claims priority to:
U.S. Provisional Patent Application No. 62/951,547, filed on Dec. 20, 2019;
U.S. Provisional Patent Application No. 63/049,221, filed on Jul. 8, 2020;
U.S. Provisional Patent Application No. 63/073,752, filed on Sep. 2, 2020; and
U.S. Provisional Patent Application No. 63/074,794, filed on Sep. 4, 2020. The content of the above-identified patent document is incorporated herein by reference.

TECHNICAL FIELD

The present disclosure relates generally to wireless communication systems and, more specifically, the present disclosure relates to a synchronization signal/physical broadcast channel (SS/PBCH) block pattern in a higher frequency range in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to a SS/PBCH block pattern in a higher frequency range in a wireless communication system.

In one embodiment, a user equipment (UE) in a wireless communication system is provided. The UE comprises a transceiver configured to receive a SS/PBCH block. The UE further comprises a processor operably connected to the transceiver, the processor of the UE configured to: determine a numerology of the SS/PBCH block, wherein the numerology includes a sub-carrier spacing (SCS) and a cyclic prefix (CP) length, determine a SS/PBCH block pattern based on the numerology, wherein the SS/PBCH block pattern includes candidate SS/PBCH blocks that are mapped to slots within a half frame and a minimum gap ($N_{gap}^\mu$) between neighboring candidate SS/PBCH blocks, wherein: $N_{gap}^\mu = 0$ symbol, if the SCS included in the numerology of the SS/PBCH block is 120 kHz or 240 kHz; or $N_{gap}^\mu = 1$ symbol, if the SCS included in the numerology of the SS/PBCH block is 480 kHz or 960 kHz.

In another embodiment, a base station (BS) in a wireless communication system is provided. The BS comprises a processor configured to: decide a numerology of a SS/PBCH block, wherein the numerology includes an SCS and a CP length; decide a SS/PBCH block pattern based on the numerology, wherein the SS/PBCH block pattern includes candidate SS/PBCH blocks that are mapped to slots within a half frame and a minimum gap ($N_{gap}^\mu$) between neighboring candidate SS/PBCH blocks, wherein: $N_{gap}^\mu = 0$ symbol, if the SCS included in the numerology of the SS/PBCH block is 120 kHz or 240 kHz; or $N_{gap}^\mu = 1$ symbol, if the SCS included in the numerology of the SS/PBCH block is 480 kHz or 960 kHz; and generate SS/PBCH blocks based on the numerology and the SS/PBCH block pattern. The BS further comprises a transceiver operably connected to the processor, the transceiver of the BS configured to transmit the SS/PBCH blocks.

In yet another embodiment, a method of a UE in a wireless communication system, the method comprising: receiving a SS/PBCH block; determining a numerology of the SS/PBCH block, wherein the numerology includes an SCS and a CP length; and determining a SS/PBCH block pattern based on the numerology, the SS/PBCH block pattern including candidate SS/PBCH blocks that are mapped to slots within a half frame and a minimum gap ($N_{gap}^\mu$) between neighboring candidate SS/PBCH blocks, wherein: $N_{gap}^\mu = 0$ symbol, based on a determination that the SCS included in the numerology of the SS/PBCH block is 120 kHz or 240 kHz; or $N_{gap}^\mu = 1$ symbol, based on a determination that the SCS included in the numerology of the SS/PBCH block is 480 kHz or 960 kHz.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 7 illustrates an example SS/PBCH block time domain pattern in slot(s) according to embodiments of the present disclosure;

DETAILED DESCRIPTION

FIG. 1 through FIG. 23, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v15.7.0, "NR; Physical channels and modulation"; 3GPP TS 38.212 v15.7.0, "NR; Multiplexing and Channel coding"; 3GPP TS 38.213 v15.7.0, "NR; Physical Layer Procedures for Control"; 3GPP TS 38.214 v15.7.0, "NR; Physical Layer Procedures for Data"; and 3GPP TS 38.321 v15.7.0, "NR; Medium Access Control (MAC) protocol specification."

Figure 1:
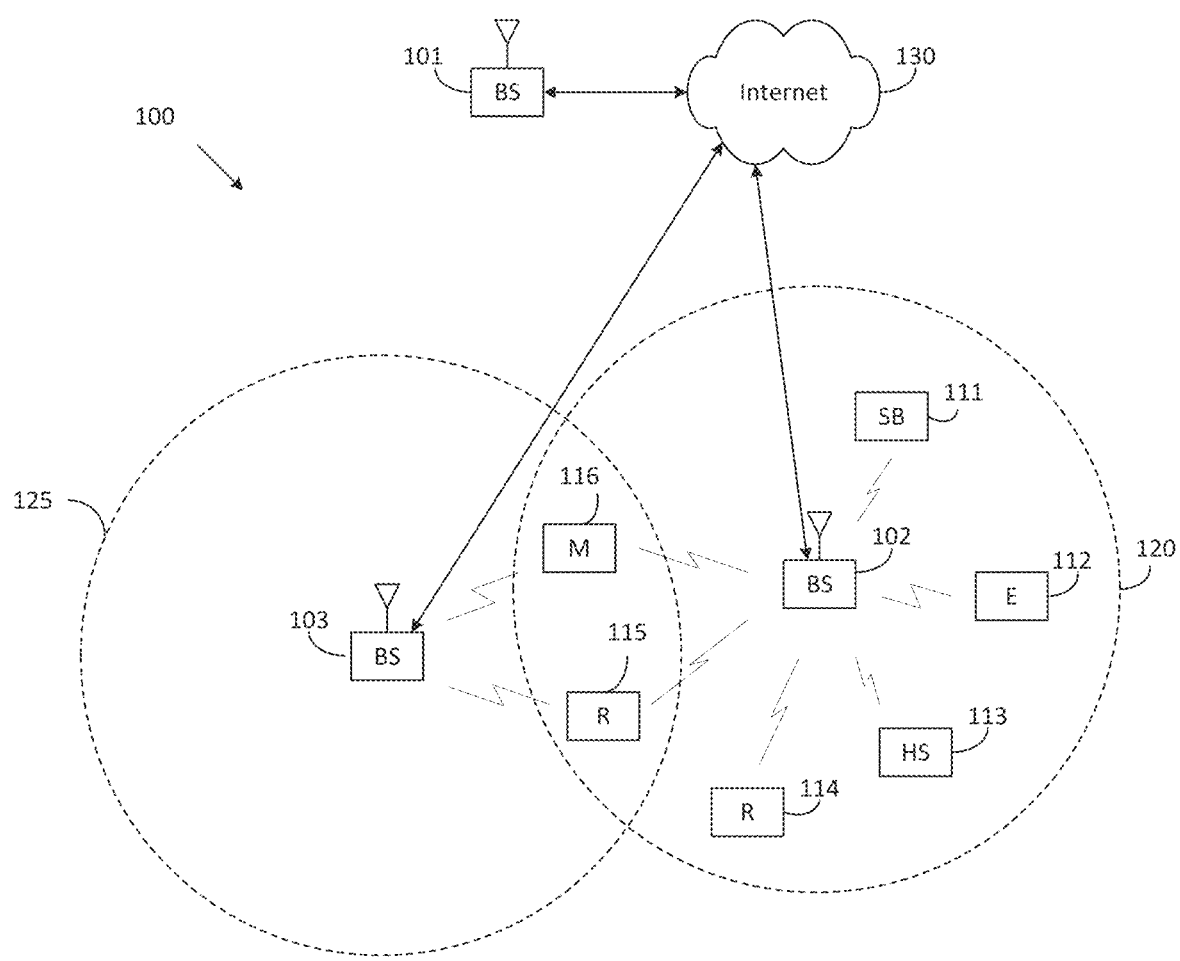
FIG. 1 illustrates an example wireless network according to embodiments of the present disclosure.
Figure 2:
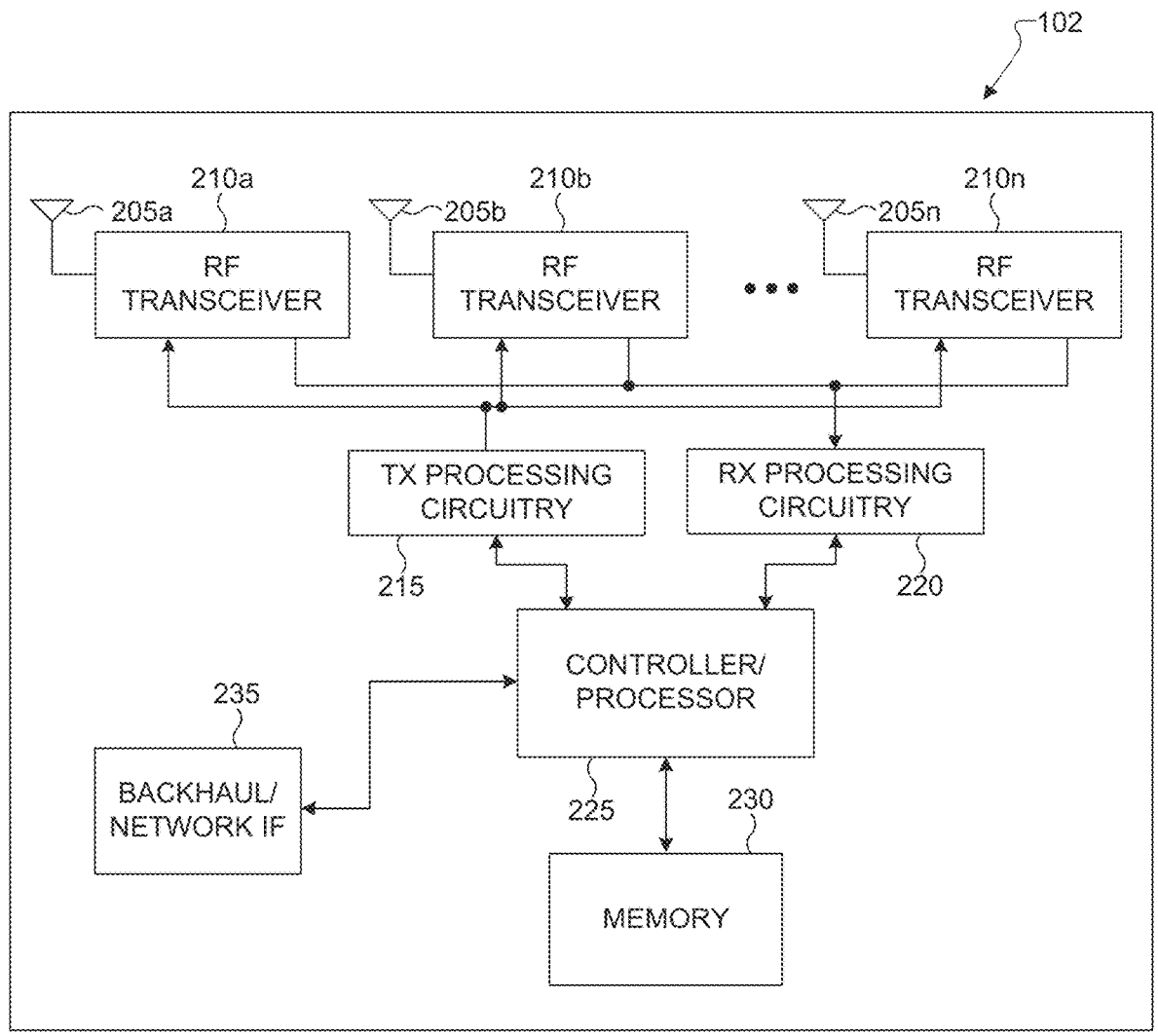
FIG. 2 illustrates an example gNB according to embodiments of the present disclosure.
Figure 3:
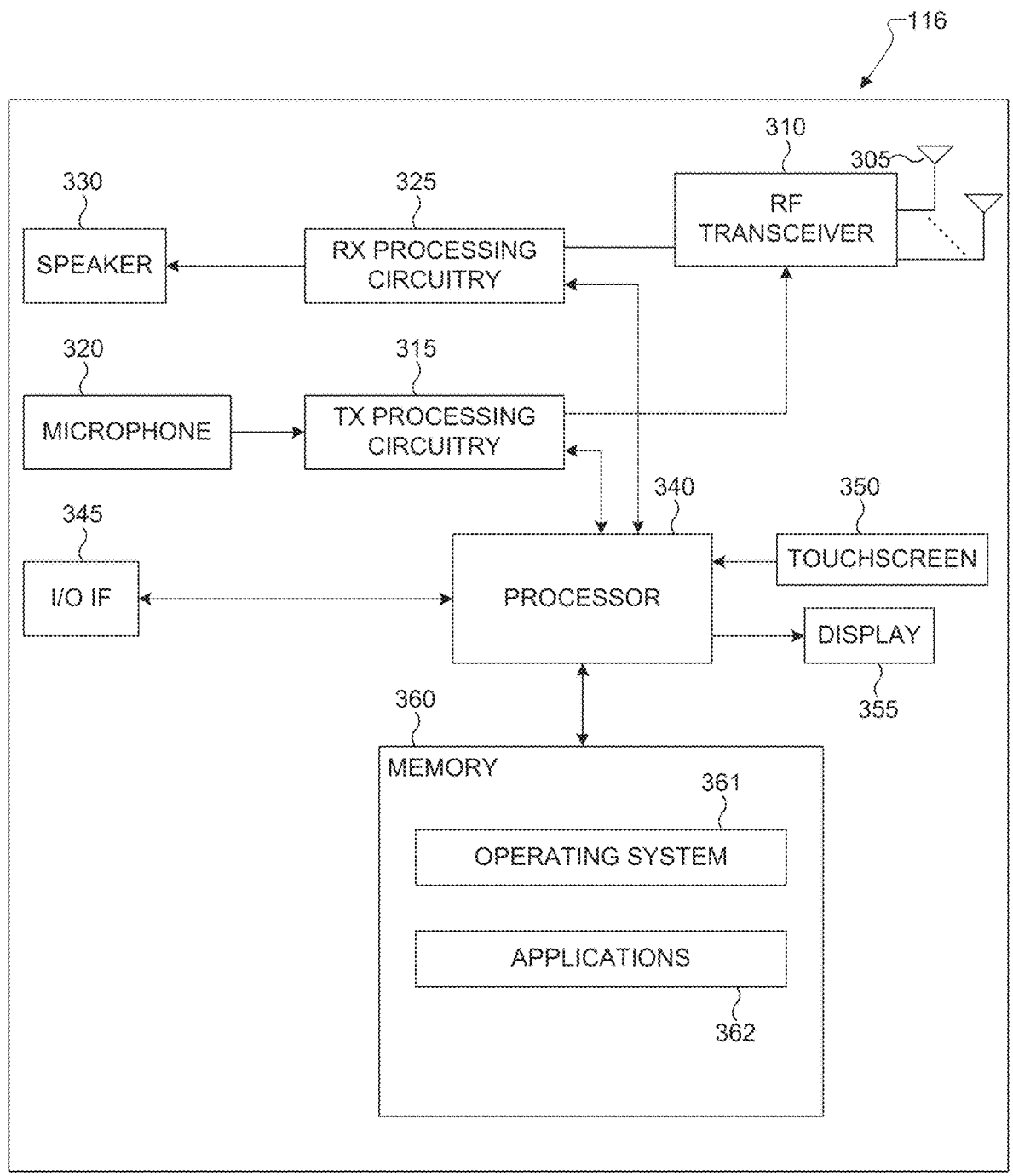
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for beam management and coverage enhancements for semi-persistent and configured grant transmission. In certain embodiments, and one or more of the gNBs 101-103 includes circuitry, programing, or a combination thereof, for beam management and coverage enhancements for semi-persistent and configured grant transmission.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and RX processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, efforts have been made to develop and deploy an improved 5G/NR or pre-5G/NR communication system. Therefore, the 5G/NR or pre-5G/NR communication system is also called a "beyond 4G network" or a "post LTE system." The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. Aspects of the present disclosure may also be applied to deployment of 5G communication system, 6G or even later release which may use terahertz (THz) bands. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can include 12 SCs with inter-SC spacing of 15 KHz or 30 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide channel state information (CSI) to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DMRS is transmitted only in the BW of a respective PDCCH or PDSCH and a UE can use the DMRS to demodulate data or control information.

Figure 4:
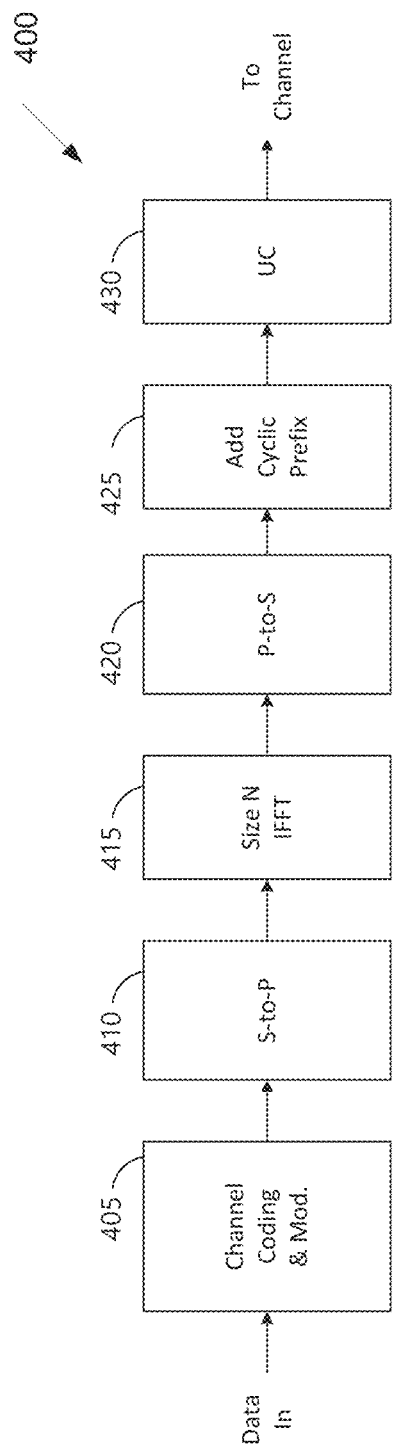
FIGS. 4 and 5 illustrate example wireless transmit and receive paths according to this disclosure.
Figure 5:
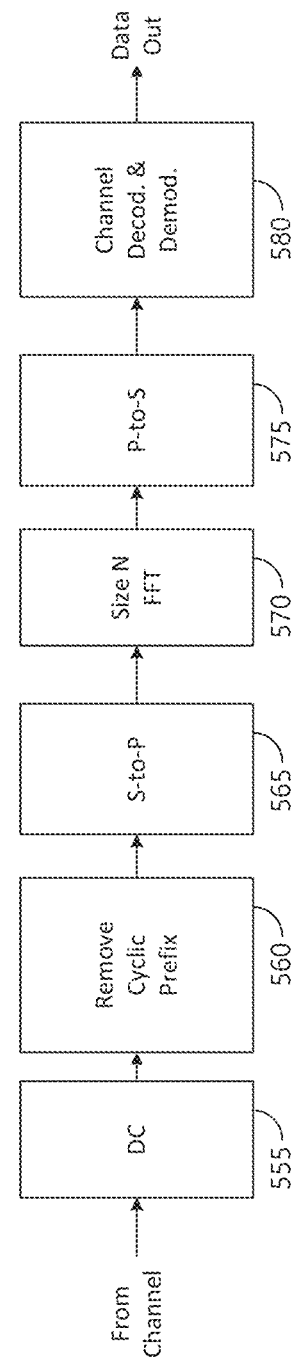

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support the codebook design and structure for systems having 2D antenna arrays as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 400, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

The present disclosure focuses on the SS/PBCH block pattern in time domain for higher frequency range with new numerology (including potentially new subcarrier spacing and/or extended CP length). The content of this disclosure includes the following embodiments and examples. In one embodiment, a SS/PBCH block pattern is determined in time domain using examples: scaling Rel-15 SS/PBCH block pattern; scaling and disabling Rel-15 SS/PBCH block pattern; new SS/PBCH block pattern using a reference SCS; new common SS/PBCH block pattern for all supported SCS; new SS/PBCH block pattern for extended CP and using a reference SCS; and new common SS/PBCH block pattern for extended CP and for all supported SCS. In one embodiment, a SS/PBCH block pattern is determined for operation with and without shared spectrum channel access. In one embodiment, low latency consideration is determined for a SS/PBCH block pattern.

In new radio (NR) Rel-15, multiple numerologies are supported, for SS/PBCH block and other transmission separately. A summary of the supported numerologies is given by TABLE 1A.

TABLE 1A

Supported numerology for NR Rel-15

| Subcarrier spacing | Cyclic prefix | Supported for SS/PBCH block | Supported for other transmission |
| --- | --- | --- | --- |
| 15 kHz | Normal | Yes | Yes |
| 30 kHz | Normal | Yes | Yes |
| 60 kHz | Normal, Extended | No | Yes |
| 120 kHz | Normal | Yes | Yes |
| 240 kHz | Normal | Yes | No |

Figure 6:
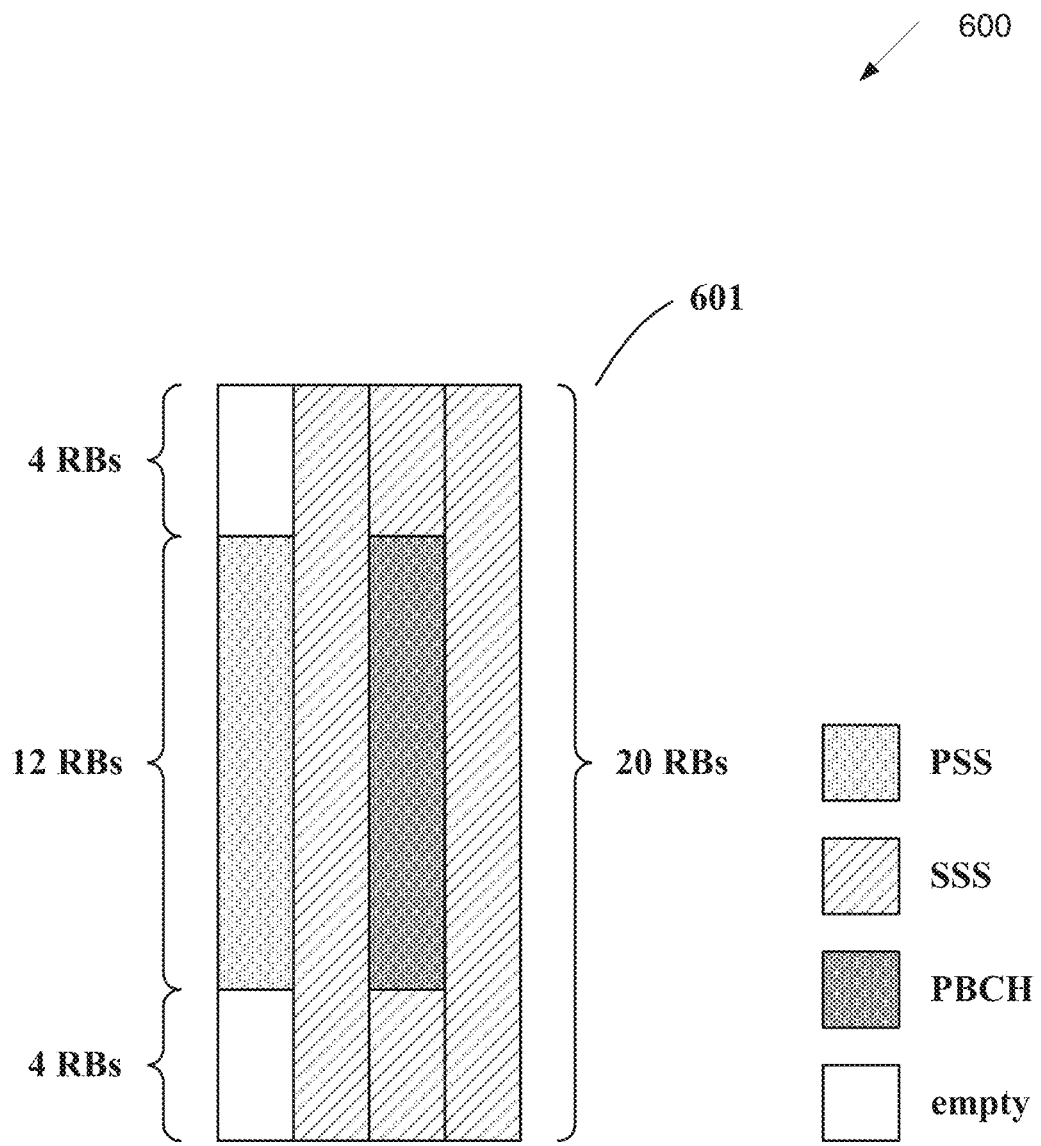
FIG. 6 illustrates an example SS/PBCH block composition according to embodiments of the present disclosure.

FIG. 6 illustrates an example SS/PBCH block composition 600 according to embodiments of the present disclosure. An embodiment of the SS/PBCH block composition 600 shown in FIG. 6 is for illustration only. In NR Rel-15, each SS/PBCH block compromises of four consecutive OFDM symbols, wherein the center 12 RBs of the first symbol are mapped for primary synchronization signal (PSS), the second and forth symbols ae mapped for PBCH, and the third symbol is mapped for both secondary synchronization signal (SSS) and PBCH. An illustration of the SS/PBCH block composition is shown in FIG. 6. The same SS/PBCH composition is applied to all supported carrier frequency ranges in NR, which spans from 0.41 GHz to 7.125 GHz as frequency range 1 (FR1), and spans from 24.25 to 52.6 GHz as frequency range 2 (FR2). In every RB mapped for PBCH, 3 out of the 12 resource elements (REs) are mapped for the demodulation reference signal (DM-RS) of PBCH, wherein the 3 REs are uniformly distributed in the RB and the starting location of the first RE is based on cell identity (ID).

NR Rel-15 supports one or two SCS for SS/PBCH block, fora given band, wherein the same SCS is applied to PSS, SSS, and PBCH (including its DM-RS). For FR1, 15 kHz and/or 30 kHz can be applied to SS/PBCH block, and for FR2, 120 kHz and/or 240 kHz can be applied to SS/PBCH block.

Figure 7:
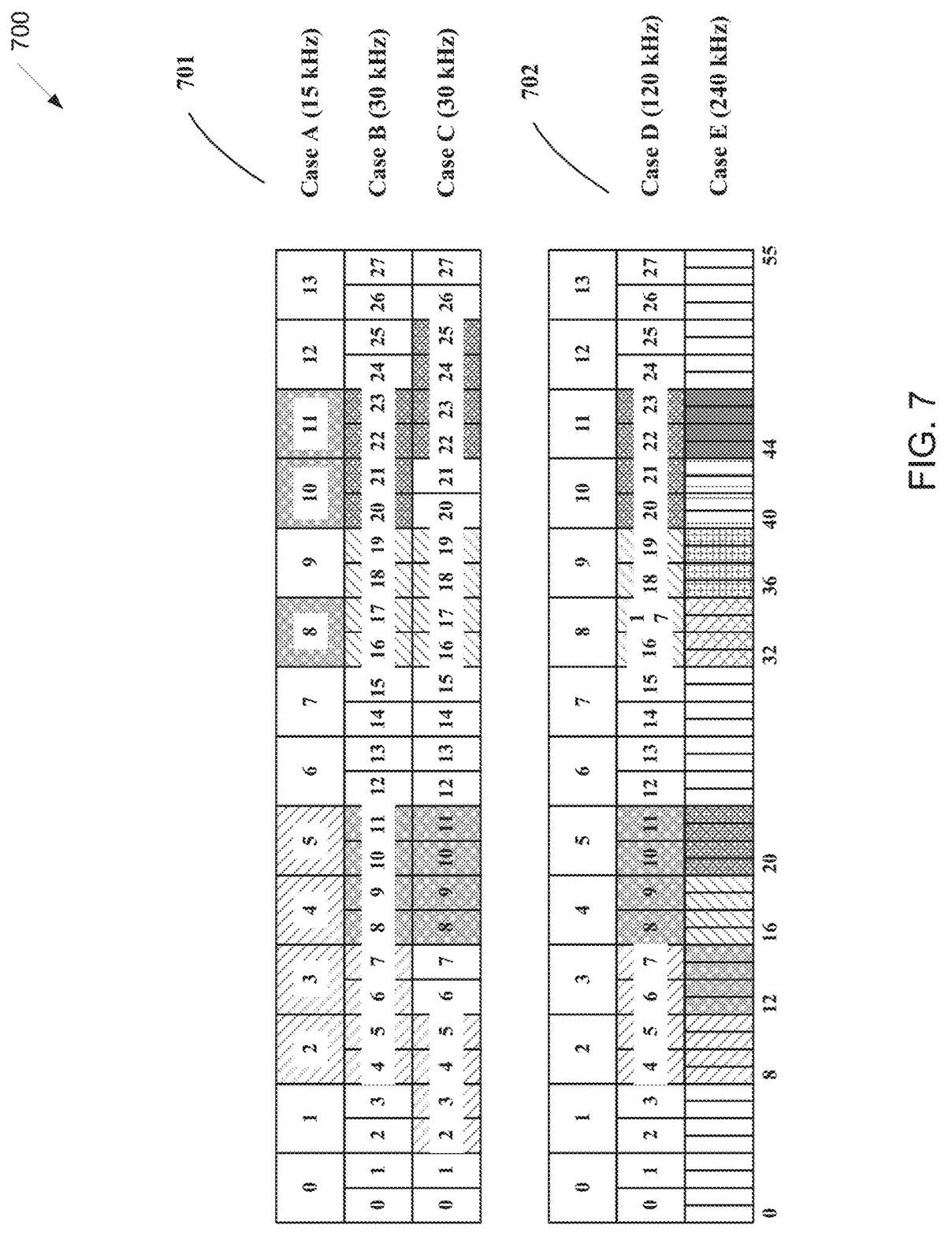

FIG. 7 illustrates an example SS/PBCH block time domain pattern in slot(s) 700 according to embodiments of the present disclosure. An embodiment of the SS/PBCH block time domain pattern in slot(s) 700 shown in FIG. 7 is for illustration only. NR Rel-15 also supports multiple candidate SS/PBCH blocks within a time unit of half frame, wherein the time unit repeats in time domain with a configurable periodicity. The time domain pattern of SS/PBCH blocks to at least one slot is illustrated in FIG. 7. For FR1 (701), the SS/PBCH block pattern is designed according to 15 kHz as the reference SCS, and for FR2 (702), the SS/PBCH block pattern is designed according to 60 kHz as the reference SCS.

The maximum number of candidate SS/PBCH blocks, denoted as $L_{max}$, is determined based on carrier frequency range, and for FR1 and FR2 licensed spectrums, the value can be one of 4 or 8 or 64, for a given carrier frequency range. An illustration of the time domain pattern for the slots containing candidate SS/PBCH blocks within a half frame is shown in FIG. 8.

Figure 8:
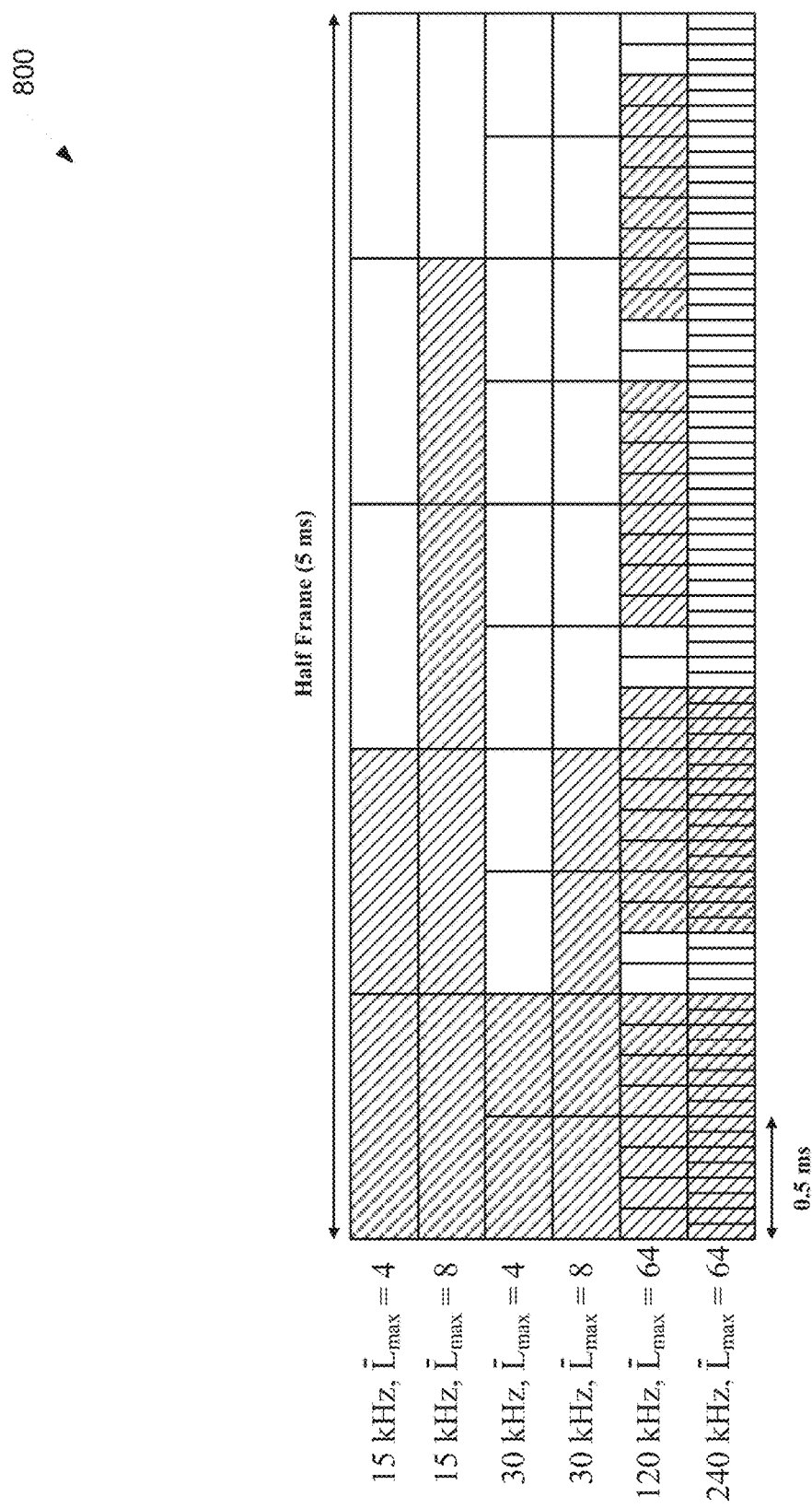
FIG. 8 illustrates example slots containing candidate SS/PBCH block in a half frame according to embodiments of the present disclosure.

FIG. 8 illustrates example slots containing candidate SS/PBCH block in a half frame 800 according to embodiments of the present disclosure. An embodiment of the slots containing candidate SS/PBCH block in a half frame 800 shown in FIG. 8 is for illustration only. For a new carrier frequency range between 52.6 GHz and 71 GHz, a new numerology at least with a larger subcarrier spacing could be supported, to accommodate the larger phase noise and larger carrier bandwidth. When a new numerology (e.g., including a new subcarrier spacing) is supported in NR, the SS/PBCH block pattern in time domain needs to be enhanced in order to support such new numerology. The present disclosure specifies the details of SS/PBCH block pattern for higher frequency range, wherein the higher frequency range at least includes the carrier frequency range between 52.6 GHz and 71 GHz, and can be applicable to both licensed (e.g., operated without shared spectrum channel access) and unlicensed bands (e.g., operated with shared spectrum channel access) in the frequency range.

Although exemplary descriptions and embodiments to follow assume OFDM or OFDMA, the present disclosure can be extended to other OFDM-based transmission waveforms or multiple access schemes such as filtered OFDM (F-OFDM). The present disclosure covers several components which can be used in conjunction or in combination with another or can operate as standalone schemes.

In one embodiment, the SS/PBCH block pattern in time domain within a predefined time period (e.g., a half frame) is determined based a SS/PBCH block pattern in a predefined time unit (e.g., one slot or several consecutive slots), and repeated in time domain to consist all candidate SS/PBCH blocks within the predefined time period. For this embodiment, the first symbols of the candidate SS/PBCH blocks within the predefined time period have indexes of $S_{start} + N_{symb}^{slot} \cdot K \cdot n$, and K is the size of predefined time unit in term of slots, $N_{symb}^{slot}$ is the number of symbols in a slot (e.g., 14 for normal CP and 12 for extended CP), and $S_{start}$ is the set of symbols as the first symbols of the candidate SS/PBCH blocks within the predefined time unit. n is an index of the predefined time unit within the predefined time period, wherein $n \in S_{index}$. For example, in NR Rel-15, the SS/PBCH block pattern in a predefined time unit is illustrated in FIG. 7, and the set of $S_{index}$ is illustrated in FIG. 8.

In one embodiment, at least one of embodiments and/or example can be supported for a SS/PBCH block pattern in the predefined time unit, for a given SCS, wherein the SCS can be in {120 kHz, 240 kHz, 480 kHz, 960 kHz, 960 kHz} for example. This embodiment focuses on the design of $S_{start}$ and K, which can be combined with the other embodiment focusing on $S_{index}$ to provide a complete design of SS/PBCH block pattern in time domain.

In one embodiment, the predefined time unit for SS/PBCH block pattern is with respect to a reference SCS, and the mapping of candidate SS/PBCH block(s) in the predefined time unit is determined based on preserving a number of symbols for control resource set (CORESET) and/or hybrid automatic repeat request (HARQ) acknowledgement (ACK) transmission in the slot (including the delay requirement for TX to RX switch).

In one embodiment, the predefined time unit for the SS/PBCH block pattern is determined assuming a minimum requirement number of symbols between neighboring candidate SS/PBCH blocks to be preserved for beam sweeping of the SS/PBCH blocks, e.g., $N_{gap}^{\mu}$ is the minimum number of symbol required for beam sweeping of SS/PBCH block. The interval between neighboring elements in $S_{start}$ may be at least $4+N_{gap}^{\mu}$, wherein 4 is the number of symbols for SS/PBCH block.

In one example, a SS/PBCH block pattern in the predefined time unit maintains the same as one of the supported SS/PBCH block pattern in Rel-15 and scaled by the new numerology. For this example, the predefined time unit is a slot or several consecutive slots, and the SS/PBCH block pattern in the predefined time unit follows one example in FIG. 7.

In one example, for a given numerology with normal CP length, the first symbols of the candidate SS/PBCH blocks within a half frame have indexes of {2, 8}+14·n, where n∈$S_{index}$ and $S_{index}$ is as described in example of this disclosure. This example is shown as #1 in TABLE 1B.

In another example, for a given numerology with normal CP length, the first symbols of the candidate SS/PBCH blocks within a half frame have indexes of {4, 8, 16, 20}+28·n, where n∈$S_{index}$ and $S_{index}$ is as described in example of this disclosure. This example is shown as #2 in TABLE 1B.

In yet another example, for a given numerology with normal CP length, the first symbols of the candidate SS/PBCH blocks within a half frame have indexes of {8, 12, 16, 20, 32, 36, 40, 44}+56·n, where n∈$S_{index}$ and $S_{index}$ is as described in example of this disclosure. This example is shown as #3 in TABLE 1B.

In one example, a SS/PBCH block pattern in the predefined time unit is following the Rel-15 pattern by disabling part of the candidate SS/PBCH blocks.

In one example, for a given numerology with normal CP length, the first symbols of the candidate SS/PBCH blocks within a half frame have indexes of {2}+14·n, where n∈$S_{index}$ and $S_{index}$ is as described in example of this disclosure. In this example, the candidate SS/PBCH blocks with odd candidate SS/PBCH block index (e.g., starting symbol as 8) is disabled. An illustration of this example is shown in 901 of FIG. 9, and also shown as #4 in TABLE 1B.

In another example, for a given numerology with normal CP length, the first symbols of the candidate SS/PBCH blocks within a half frame have indexes of {8}+14·n, where n∈$S_{index}$ and $S_{index}$ is as described in example of this disclosure. In this example, the candidate SS/PBCH blocks with even candidate SS/PBCH block index (e.g., starting symbol as 2) is disabled. This example is shown as #5 in TABLE 1B.

In yet another example, for a given numerology with normal CP length, the first symbols of the candidate SS/PBCH blocks within a half frame have indexes of {4, 16}+28·n, where n∈$S_{index}$ and $S_{index}$ is as described in example of this disclosure. In this example, the candidate SS/PBCH blocks with odd candidate SS/PBCH block index (e.g., starting symbol as 8 or 20) is disabled. An illustration of this example is shown in 902 of FIG. 9, and also shown as #6 in TABLE 1B.

In yet another example, for a given numerology with normal CP length, the first symbols of the candidate SS/PBCH blocks within a half frame have indexes of {8, 20}+28·n, where n∈$S_{index}$ and $S_{index}$ is as described in example of this disclosure. In this example, the candidate SS/PBCH blocks with even candidate SS/PBCH block index (e.g., starting symbol as 4 or 16) is disabled. This example is shown as #7 in TABLE 1B.

In yet another example, for a given numerology with normal CP length, the first symbols of the candidate SS/PBCH blocks within a half frame have indexes of {8, 16, 32, 40}+56·n, where n∈$S_{index}$ and $S_{index}$ is as described in example of this disclosure. In this example, the candidate SS/PBCH blocks with odd candidate SS/PBCH block index (e.g., starting symbol as 12, 20, 36, or 44) is disabled. An illustration of this example is shown in 903 of FIG. 9, and also shown as #8 in TABLE 1B.

In yet another example, for a given numerology with normal CP length, the first symbols of the candidate SS/PBCH blocks within a half frame have indexes of {12, 20, 36, 44}+56·n, where n∈$S_{index}$ and $S_{index}$ is as described in example of this disclosure. In this example, the candidate SS/PBCH blocks with even candidate SS/PBCH block index (e.g., starting symbol as 8, 16, 32, or 40) is disabled. This example is shown as #9 in TABLE 1B.

In one example, disabling the candidate SS/PBCH blocks with even candidate SS/PBCH block index or odd candidate SS/PBCH block index can be configurable to the UE, e.g., at least for a SCell or PSCell.

Figure 9:
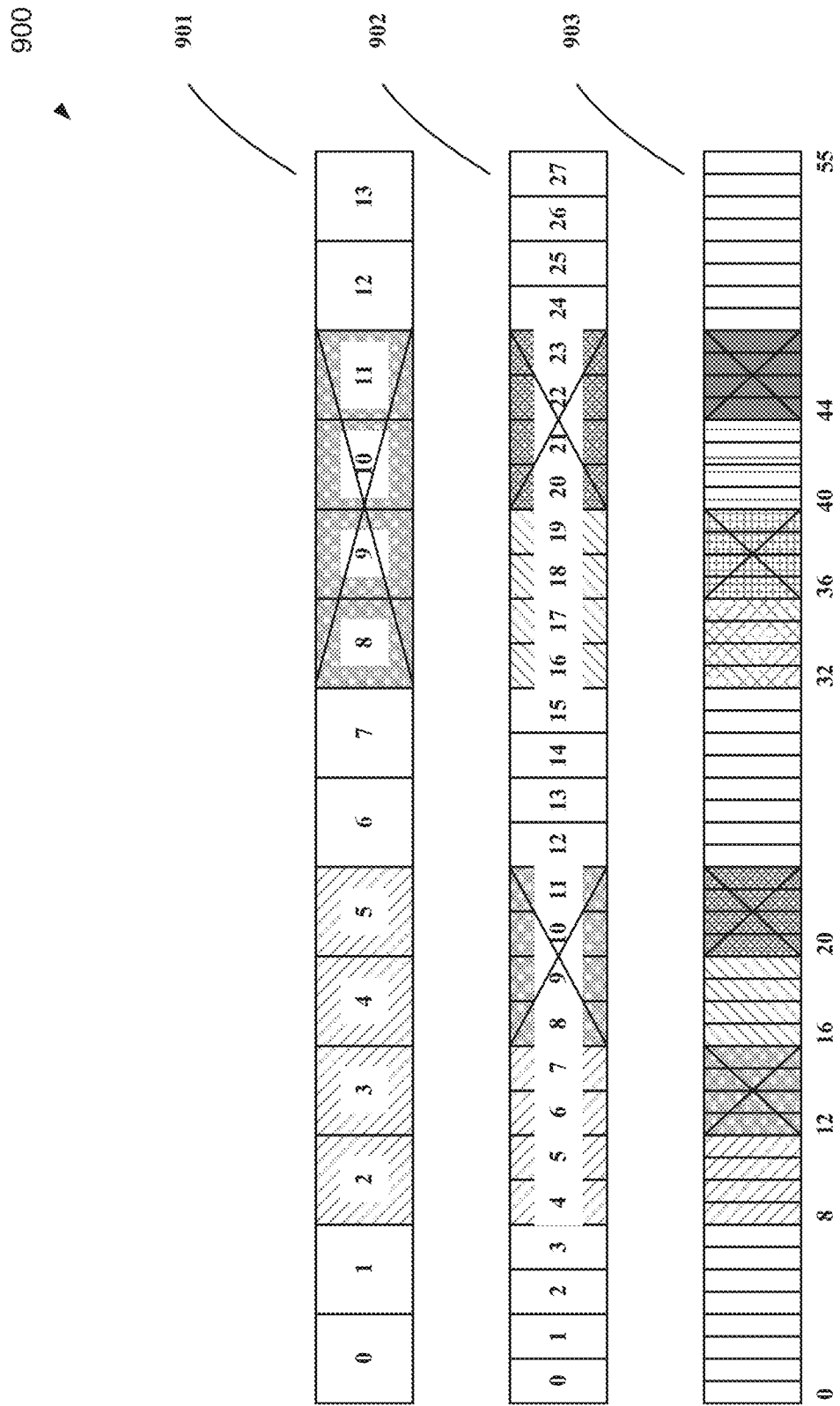
FIG. 9 illustrates an example disabling candidate SS/PBCH blocks according to embodiments of the present disclosure.

FIG. 9 illustrates an example disabling candidate SS/PBCH blocks 900 according to embodiments of the present disclosure. An embodiment of the disabling candidate SS/PBCH blocks 900 shown in FIG. 9 is for illustration only. In yet another example, the predefined time unit for SS/PBCH block pattern is a slot with respect to a reference SCS, and the mapping of candidate SS/PBCH block(s) in the slot with respect to all the supported SCSs in the carrier frequency range is determined based on the requirement of number of symbols for CORESET and delay requirement for TX to RX switch (e.g., aiming to receive the corresponding HARQ ACK in the same slot).

In one example, the reference SCS can be 480 kHz. In another example, the reference SCS can be 240 kHz. In yet another example, the reference SCS can be 120 kHz.

Figure 10:
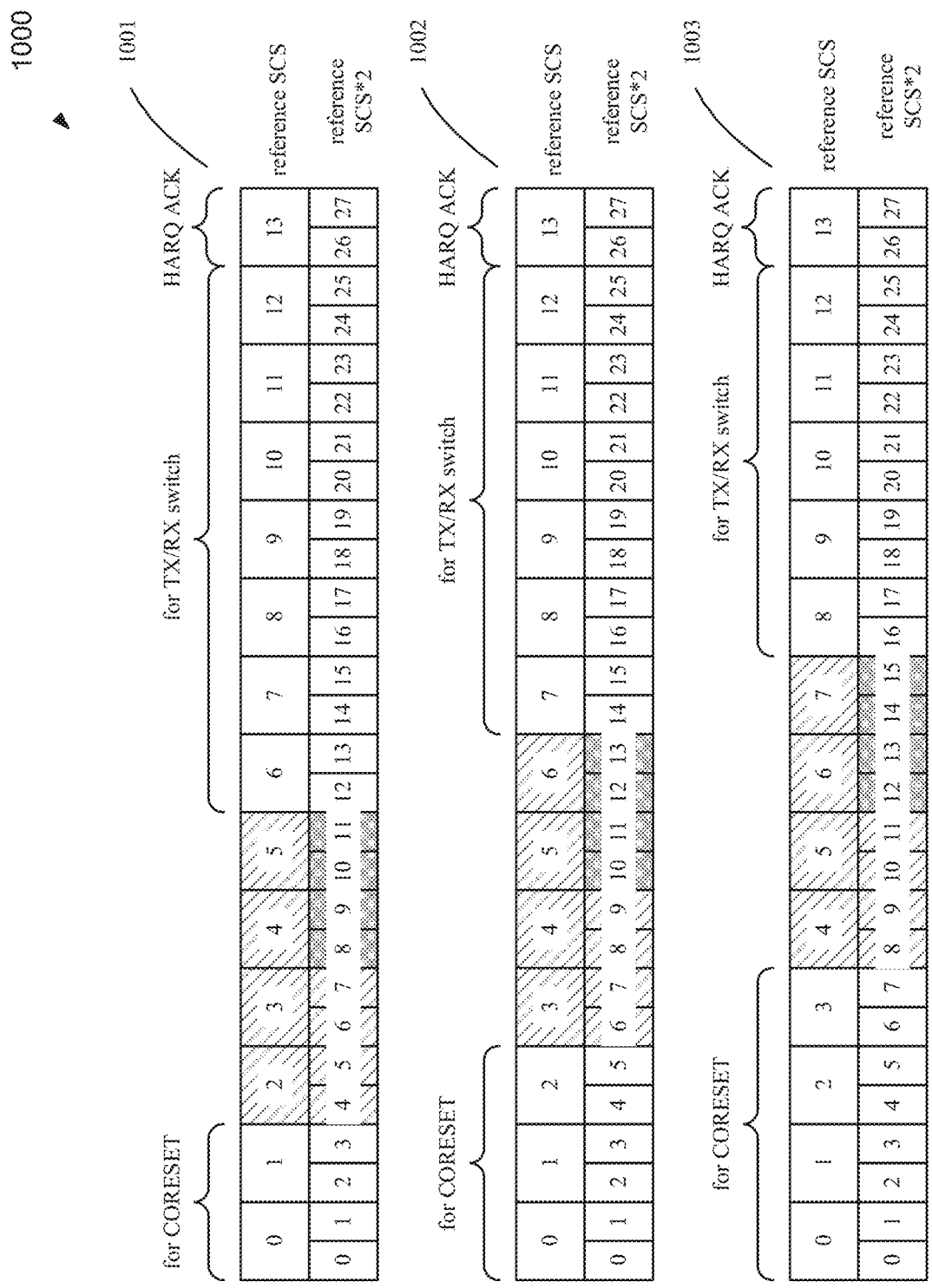
FIG. 10 illustrates an example SS/PBCH block patterns according to embodiments of the present disclosure.

FIG. 10 illustrates an example SS/PBCH block patterns 1000 according to embodiments of the present disclosure. An embodiment of the SS/PBCH block patterns 1000 shown in FIG. 10 is for illustration only. In one example, there is one candidate SS/PBCH block mapped to the slot with respect to reference SCS, and for a first numerology with normal CP length, the first symbols of the candidate SS/PBCH blocks within a half frame have indexes of {2}+14·n, where n∈$S_{index,1}$ and $S_{index,1}$ is as described in example of this disclosure, and for a second numerology with normal CP length, the first symbols of the candidate SS/PBCH blocks within a half frame have indexes of {4, 8}+28·n, where n∈$S_{index,2}$ and $S_{index,2}$ is as described in example of this disclosure, and the SCS in the second numerology is twice of the reference SCS in the first numerology (e.g., the SCS in the second numerology is 960 kHz, and the reference SCS in the first numerology is 480 kHz). An illustration of this example is shown in 1001 of FIG. 10. For this example, if the reference SCS is 480 kHz, the gap for TX/RX switch can be as large as 2.23*7 us (e.g., 7 symbols in 480 kHz SCS and normal CP), and the maximum number of symbols for CORESET with respect to the reference SCS can be 2. This example is shown as #10 and #11 in TABLE 1B.

In another example, there is one candidate SS/PBCH block mapped to the slot with respect to reference SCS, and for a first numerology with normal CP length, the first symbols of the candidate SS/PBCH blocks within a half frame have indexes of $\{3\}+14 \cdot n$, where $n \in S_{index,1}$ and $S_{index,1}$ is as described in example of this disclosure, and for a second numerology with normal CP length, the first symbols of the candidate SS/PBCH blocks within a half frame have indexes of $\{6,10\}+28 \cdot n$, where $n \in S_{index,2}$ and $S_{index,2}$ is as described in example of this disclosure, and the SCS in the second numerology is twice of the reference SCS in the first numerology (e.g., the SCS in the second numerology is 960 kHz, and the reference SCS in the first numerology is 480 kHz). An illustration of this example is shown in 1002 of FIG. 10. For this example, if the reference SCS is 480 kHz, the gap for TX/RX switch can be as large as 2.23*6 us (e.g., 6 symbols in 480 kHz SCS and normal CP), and the maximum number of symbols for CORESET with respect to the reference SCS can be 3. This example is shown as #12 and #13 in TABLE 1B.

In yet another example, there is one candidate SS/PBCH block mapped to the slot with respect to reference SCS, and for a first numerology with normal CP length, the first symbols of the candidate SS/PBCH blocks within a half frame have indexes of $\{4\}+14 \cdot n$, where $n \in S_{index,1}$ and $S_{index,1}$ is as described in example of this disclosure, and for a second numerology with normal CP length, the first symbols of the candidate SS/PBCH blocks within a half frame have indexes of $\{8, 12\}+28 \cdot n$, where $n \in S_{index,2}$ and $S_{index,2}$ is as described in example of this disclosure, and the SCS in the second numerology is twice of the reference SCS in the first numerology (e.g., the SCS in the second numerology is 960 kHz, and the reference SCS in the first numerology is 480 kHz). An illustration of this example is shown in 1003 of FIG. 10. For this example, if the reference SCS is 480 kHz, the gap for TX/RX switch can be as large as 2.23*5 us (e.g., 5 symbols in 480 kHz SCS and normal CP), and the maximum number of symbols for CORESET with respect to the reference SCS can be 4. This example is shown as #14 and #15 in TABLE 1B.

In yet another example, there are two candidate SS/PBCH blocks mapped to consecutive symbols in the slot with respect to reference SCS, and for a first numerology with normal CP length, the first symbols of the candidate SS/PBCH blocks within a half frame have indexes of $\{1, 5\}+14 \cdot n$, where $n \in S_{index,1}$ and $S_{index,1}$ is as described in example of this disclosure, and for a second numerology with normal CP length, the first symbols of the candidate SS/PBCH blocks within a half frame have indexes of $\{2,6,10,14\}+28 \cdot n$, where $n \in S_{index,2}$ and $S_{index,2}$ is as described in example of this disclosure, and the SCS in the second numerology is twice of the reference SCS in the first numerology (e.g., the SCS in the second numerology is 960 kHz, and the reference SCS in the first numerology is 480 kHz). An illustration of this example is shown in 1101 of FIG. 11. For this example, if the reference SCS is 480 kHz, the gap for TX/RX switch can be as large as 2.23*4 us (e.g., 4 symbols in 480 kHz SCS and normal CP), and the maximum number of symbols for CORESET with respect to the reference SCS can be 1. This example is shown as #16 and #17 in TABLE 1B.

Figure 11:
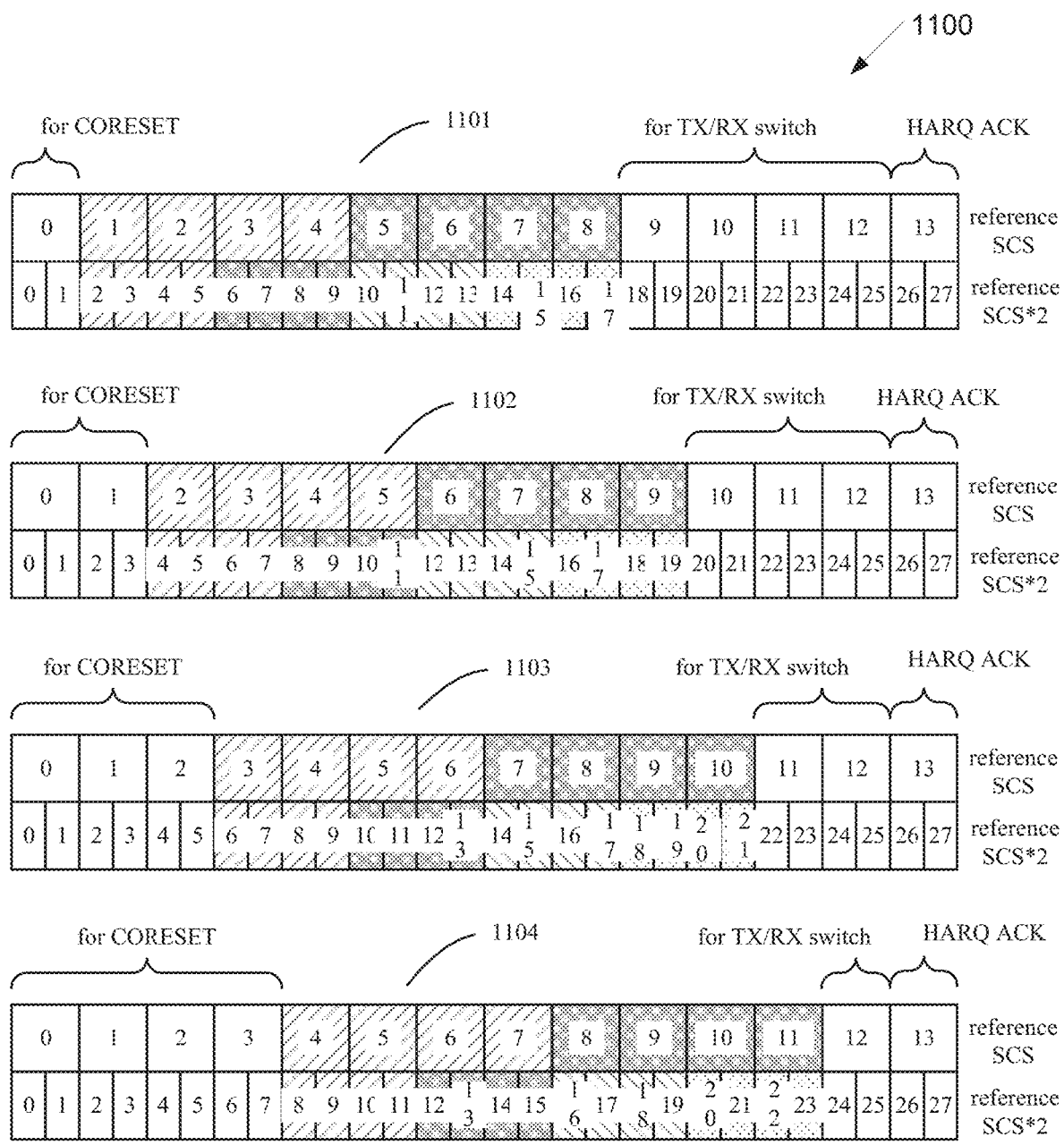
FIG. 11 illustrates another example SS/PBCH block pattern according to embodiments of the present disclosure.

FIG. 11 illustrates another example SS/PBCH block pattern 1100 according to embodiments of the present disclosure. An embodiment of the SS/PBCH block patterns 1100 shown in FIG. 11 is for illustration only. In yet another example, there are two candidate SS/PBCH blocks mapped to consecutive symbols in the slot with respect to reference SCS, and for a first numerology with normal CP length, the first symbols of the candidate SS/PBCH blocks within a half frame have indexes of $\{2, 6\}+14 \cdot n$, where $n \in S_{index,1}$ and $S_{index,1}$ is as described in example of this disclosure, and for a second numerology with normal CP length, the first symbols of the candidate SS/PBCH blocks within a half frame have indexes of $\{4, 8, 12, 16\}+28 \cdot n$, where $n \in S_{index,2}$ and $S_{index,2}$ is as described in example of this disclosure, and the SCS in the second numerology is twice of the reference SCS in the first numerology (e.g., the SCS in the second numerology is 960 kHz, and the reference SCS in the first numerology is 480 kHz). An illustration of this example is shown in 1102 of FIG. 11. For this example, if the reference SCS is 480 kHz, the gap for TX/RX switch can be as large as 2.23*3 us (e.g., 3 symbols in 480 kHz SCS and normal CP), and the maximum number of symbols for CORESET with respect to the reference SCS can be 2. This example is shown as #18 and #19 in TABLE 1B.

In yet another example, there are two candidate SS/PBCH blocks mapped to consecutive symbols in the slot with respect to reference SCS, and for a first numerology with normal CP length, the first symbols of the candidate SS/PBCH blocks within a half frame have indexes of $\{3, 7\}+14 \cdot n$, where $n \in S_{index,1}$ and $S_{index,1}$ is as described in example of this disclosure, and for a second numerology with normal CP length, the first symbols of the candidate SS/PBCH blocks within a half frame have indexes of $\{6, 10, 14, 18\}+28 \cdot n$, where $n \in S_{index,2}$ and $S_{index,2}$ is as described in example of this disclosure, and the SCS in the second numerology is twice of the reference SCS in the first numerology (e.g., the SCS in the second numerology is 960 kHz, and the reference SCS in the first numerology is 480 kHz). An illustration of this example is shown in 1103 of FIG. 11. For this example, if the reference SCS is 480 kHz, the gap for TX/RX switch can be as large as 2.23*2 us (e.g., 2 symbols in 480 kHz SCS and normal CP), and the maximum number of symbols for CORESET with respect to the reference SCS can be 3. This example is shown as #20 and #21 in TABLE 1B.

In yet another example, there are two candidate SS/PBCH blocks mapped to consecutive symbols in the slot with respect to reference SCS, and for a first numerology with normal CP length, the first symbols of the candidate SS/PBCH blocks within a half frame have indexes of $\{4, 8\}+14 \cdot n$, where $n \in S_{index,1}$ and $S_{index,1}$ is as described in example of this disclosure, and for a second numerology with normal CP length, the first symbols of the candidate SS/PBCH blocks within a half frame have indexes of $\{8, 12, 16, 20\}+28 \cdot n$, where $n \in S_{index,2}$ and $S_{index,2}$ is as described in example of this disclosure, and the SCS in the second numerology is twice of the reference SCS in the first numerology (e.g., the SCS in the second numerology is 960 kHz, and the reference SCS in the first numerology is 480 kHz). An illustration of this example is shown in 1104 of FIG. 11. For this example, if the reference SCS is 480 kHz, the gap for TX/RX switch can be as large as 2.23*1 us (e.g., 1 symbol in 480 kHz SCS and normal CP), and the maximum number of symbols for CORESET with respect to the reference SCS can be 4. This example is shown as #22 and #23 in TABLE 1B.

Figure 12:
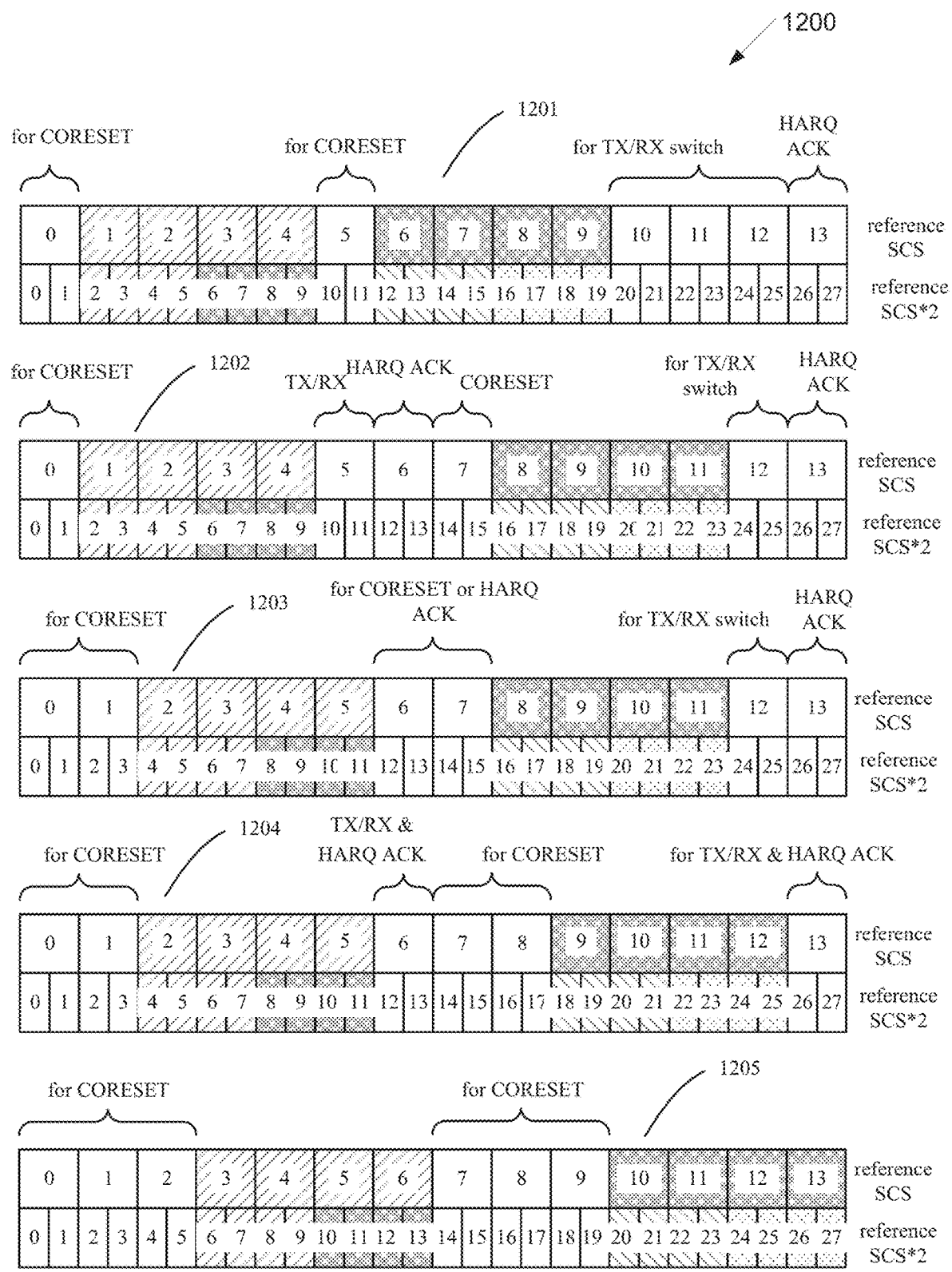
FIG. 12 illustrates yet another example SS/PBCH block patterns according to embodiments of the present disclosure.

FIG. 12 illustrates yet another example SS/PBCH block patterns 1200 according to embodiments of the present disclosure. An embodiment of the SS/PBCH block patterns 1200 shown in FIG. 12 is for illustration only. In yet another example, there are two candidate SS/PBCH blocks mapped to non-consecutive symbols in the slot with respect to reference SCS, and for a first numerology with normal CP length, the first symbols of the candidate SS/PBCH blocks within a half frame have indexes of $\{1, 6\}+14 \cdot n$, where $n \in S_{index,1}$ and $S_{index,1}$ is as described in example of this disclosure, and for a second numerology with normal CP length, the first symbols of the candidate SS/PBCH blocks within a half frame have indexes of $\{2, 6, 12, 16\}+28 \cdot n$, where $n \in S_{index,2}$ and $S_{index,2}$ is as described in example of this disclosure, and the SCS in the second numerology is twice of the reference SCS in the first numerology (e.g., the SCS in the second numerology is 960 kHz, and the reference SCS in the first numerology is 480 kHz). An illustration of this example is shown in 1201 of FIG. 12. For this example, if the reference SCS is 480 kHz, the gap for TX/RX switch can be as large as 2.23*3 us (e.g., 3 symbols in 480 kHz SCS and normal CP), and the maximum number of symbols for CORESET with respect to the reference SCS can be 1. This example is shown as #24 and #25 in TABLE 1B.

In yet another example, there are two candidate SS/PBCH blocks mapped to non-consecutive symbols in the slot with respect to reference SCS, and for a first numerology with normal CP length, the first symbols of the candidate SS/PBCH blocks within a half frame have indexes of $\{1, 8\}+14 \cdot n$, where $n \in S_{index,1}$ and $S_{index,1}$ is as described in example of this disclosure, and for a second numerology with normal CP length, the first symbols of the candidate SS/PBCH blocks within a half frame have indexes of $\{2, 6, 16, 20\}+28 \cdot n$, where $n \in S_{index,2}$ and $S_{index,2}$ is as described in example of this disclosure, and the SCS in the second numerology is twice of the reference SCS in the first numerology (e.g., the SCS in the second numerology is 960 kHz, and the reference SCS in the first numerology is 480 kHz). An illustration of this example is shown in 1202 of FIG. 12. For this example, if the reference SCS is 480 kHz, the gap for TX/RX switch can be as large as 2.23*1 us (e.g., 1 symbol in 480 kHz SCS and normal CP), and the maximum number of symbols for CORESET with respect to the reference SCS can be 1. This example is shown as #26 and #27 in TABLE 1B.

In yet another example, there are two candidate SS/PBCH blocks mapped to non-consecutive symbols in the slot with respect to reference SCS, and for a first numerology with normal CP length, the first symbols of the candidate SS/PBCH blocks within a half frame have indexes of $\{2, 8\}+14 \cdot n$, where $n \in S_{index,1}$ and $S_{index,1}$ is as described in example of this disclosure, and for a second numerology with normal CP length, the first symbols of the candidate SS/PBCH blocks within a half frame have indexes of $\{4, 8, 16, 20\}+28 \cdot n$, where $n \in S_{index,2}$ and $S_{index,2}$ is as described in example of this disclosure, and the SCS in the second numerology is twice of the reference SCS in the first numerology. In one example, the SCS in the second numerology is 960 kHz, and the reference SCS in the first numerology is 480 kHz. In another example, the SCS in the second numerology is 240 kHz, and the reference SCS in the first numerology is 120 kHz. An illustration of this example is shown in 1203 of FIG. 12. For this example, if the reference SCS is 480 kHz, the gap for TX/RX switch can be as large as 2.23*1 us (e.g., 1 symbol in 480 kHz SCS and normal CP), and the maximum number of symbols for CORESET with respect to the reference SCS can be 2. This example is shown as #28 and #29 in TABLE 1B.

In yet another example, there are two candidate SS/PBCH blocks mapped to non-consecutive symbols in the slot with respect to reference SCS, and for a first numerology with normal CP length, the first symbols of the candidate SS/PBCH blocks within a half frame have indexes of $\{2, 9\}+14 \cdot n$, where $n \in S_{index,1}$ and $S_{index,1}$ is as described in example of this disclosure, and for a second numerology with normal CP length, the first symbols of the candidate SS/PBCH blocks within a half frame have indexes of $\{4, 8, 18, 22\}+28 \cdot n$, where $n \in S_{index,2}$ and $S_{index,2}$ is as described in example of this disclosure, and the SCS in the second numerology is twice of the reference SCS in the first numerology (e.g., the SCS in the second numerology is 960 kHz, and the reference SCS in the first numerology is 480 kHz). An illustration of this example is shown in 1204 of FIG. 12. For this example, if the reference SCS is 480 kHz, the gap for TX/RX switch can be as large as 2.23*1 us (e.g., 1 symbol in 480 kHz SCS and normal CP), and the maximum number of symbols for CORESET with respect to the reference SCS can be 2. This example is shown as #30 and #31 in TABLE 1B.

In yet another example, there are two candidate SS/PBCH blocks mapped to non-consecutive symbols in the slot with respect to reference SCS, and for a first numerology with normal CP length, the first symbols of the candidate SS/PBCH blocks within a half frame have indexes of $\{3, 10\}+14 \cdot n$, where $n \in S_{index,1}$ and $S_{index,1}$ is as described in example of this disclosure, and for a second numerology with normal CP length, the first symbols of the candidate SS/PBCH blocks within a half frame have indexes of $\{6, 10, 20, 24\}+28 \cdot n$, where $n \in S_{index,2}$ and $S_{index,2}$ is as described in example of this disclosure, and the SCS in the second numerology is twice of the reference SCS in the first numerology (e.g., the SCS in the second numerology is 960 kHz, and the reference SCS in the first numerology is 480 kHz). An illustration of this example is shown in 1205 of FIG. 12. For this example, there is no gap for TX/RX switch and HARQ ACK, and the maximum number of symbols for CORESET with respect to the reference SCS can be 3. This example is shown as #32 and #33 in TABLE 1B.

In yet another embodiment, the predefined time unit for SS/PBCH block pattern is a slot with respect to the SCS of the SS/PBCH block, and the SS/PBCH block pattern is common for all supported SCS or at least one of the supported SCS. For this example, the mapping of candidate SS/PBCH block(s) in the slot can be determined based on the requirement of number of symbols for CORESET and delay requirement for TX to RX switch (e.g., aiming to receive the corresponding HARQ ACK in the same slot).

In one example, the supported SCS for the higher frequency range can be the set of {120 kHz, 240 kHz, 480 kHz, 960 kHz} or its subset.

Figure 13A:
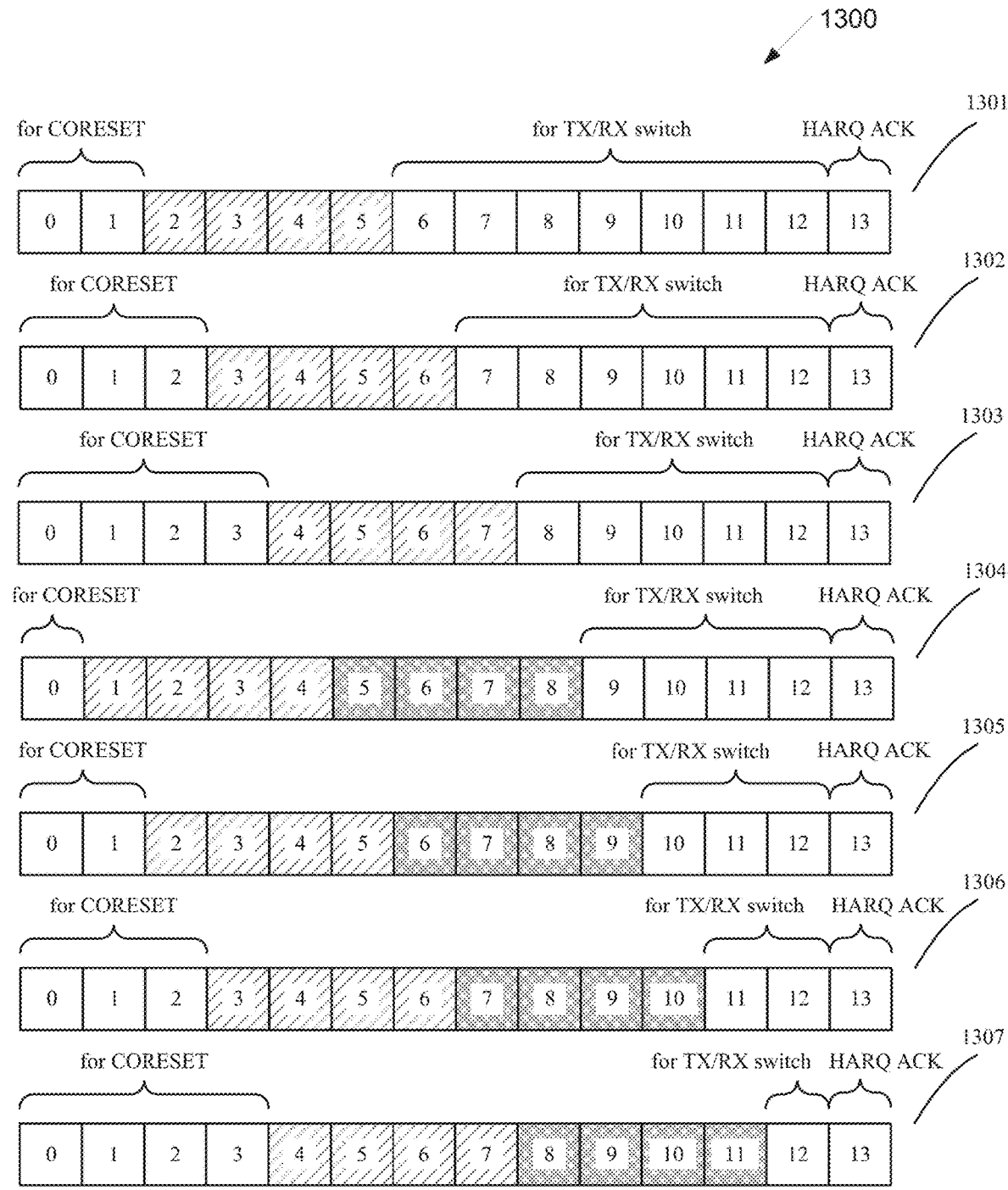
FIG. 13A illustrates yet another example SS/PBCH block patterns according to embodiments of the present disclosure.

FIG. 13A illustrates yet another example SS/PBCH block patterns 1300 according to embodiments of the present disclosure. An embodiment of the SS/PBCH block patterns 1300 shown in FIG. 13A is for illustration only. In one example, there is one candidate SS/PBCH block mapped to the slot as the predefined time unit for SS/PBCH block pattern, and for every supported SCS with normal CP, the first symbols of the candidate SS/PBCH blocks within a half frame have indexes of $\{2\}+14 \cdot n$, where $n \in S_{index}$ and $S_{index}$ is as described in one example of this disclosure. An illustration of this example is shown in 1301 of FIG. 13A.

For this example, the gap for TX/RX switch can be as large as 1.11*7 us (e.g., 7 symbols in 960 kHz SCS and normal CP if 960 kHz is the maximum supported SCS) or 2.23*7 us (e.g., 7 symbols in 480 kHz SCS and normal CP if 480 kHz is the maximum supported SCS), and the maximum number of symbols for CORESET can be 2. This example is also shown as #1 in TABLE 1C.

In another example, there is one candidate SS/PBCH block mapped to the slot as the predefined time unit for SS/PBCH block pattern, and for every supported SCS with normal CP, the first symbols of the candidate SS/PBCH blocks within a half frame have indexes of $\{3\}+14 \cdot n$, where $n \in S_{index}$ and $S_{index}$ is as described in one example of this disclosure. An illustration of this example is shown in 1302 of FIG. 13A. For this example, the gap for TX/RX switch can be as large as 1.11*6 us (e.g., 6 symbols in 960 kHz SCS and normal CP if 960 kHz is the maximum supported SCS) or 2.23*6 us (e.g., 6 symbols in 480 kHz SCS and normal CP if 480 kHz is the maximum supported SCS), and the maximum number of symbols for CORESET can be 3. This example is also shown as #2 in TABLE 1C.

In yet another example, there is one candidate SS/PBCH block mapped to the slot as the predefined time unit for SS/PBCH block pattern, and for every supported SCS with normal CP, the first symbols of the candidate SS/PBCH blocks within a half frame have indexes of $\{4\}+14 \cdot n$, where $n \in S_{index}$ and $S_{index}$ is as described in one example of this disclosure. An illustration of this example is shown in 1303 of FIG. 13A. For this example, the gap for TX/RX switch can be as large as 1.11*5 us (e.g., 5 symbols in 960 kHz SCS and normal CP if 960 kHz is the maximum supported SCS) or 2.23*5 us (e.g., 5 symbols in 480 kHz SCS and normal CP if 480 kHz is the maximum supported SCS), and the maximum number of symbols for CORESET can be 4. This example is also shown as #3 in TABLE 1C.

In yet another example, there are two candidate SS/PBCH blocks mapped to consecutive symbols in the slot as the predefined time unit for SS/PBCH block pattern, and for every supported SCS with normal CP, the first symbols of the candidate SS/PBCH blocks within a half frame have indexes of $\{1, 5\}+14 \cdot n$, where $n \in S_{index}$ and $S_{index}$ is as described in one example of this disclosure. An illustration of this example is shown in 1304 of FIG. 13A. For this example, the gap for TX/RX switch can be as large as 1.11*4 us (e.g., 4 symbols in 960 kHz SCS and normal CP if 960 kHz is the maximum supported SCS) or 2.23*4 us (e.g., 4 symbols in 480 kHz SCS and normal CP if 480 kHz is the maximum supported SCS), and the maximum number of symbols for CORESET can be 1. This example is also shown as #4 in TABLE 1C.

In yet another example, there are two candidate SS/PBCH blocks mapped to consecutive symbols in the slot as the predefined time unit for SS/PBCH block pattern, and for every supported SCS with normal CP, the first symbols of the candidate SS/PBCH blocks within a half frame have indexes of $\{2, 6\}+14 \cdot n$, where $n \in S_{index}$ and $S_{index}$ is as described in one example of this disclosure. An illustration of this example is shown in 1305 of FIG. 13A. For this example, the gap for TX/RX switch can be as large as 1.11*3 us (e.g., 3 symbols in 960 kHz SCS and normal CP if 960 kHz is the maximum supported SCS) or 2.23*3 us (e.g., 3 symbols in 480 kHz SCS and normal CP if 480 kHz is the maximum supported SCS), and the maximum number of symbols for CORESET can be 2. This example is also shown as #5 in TABLE 1C.

In yet another example, there are two candidate SS/PBCH blocks mapped to consecutive symbols in the slot as the predefined time unit for SS/PBCH block pattern, and for every supported SCS with normal CP, the first symbols of the candidate SS/PBCH blocks within a half frame have indexes of $\{3, 7\}+14 \cdot n$, where $n \in S_{index}$ and $S_{index}$ is as described in one example of this disclosure. An illustration of this example is shown in 1306 of FIG. 13A. For this example, the gap for TX/RX switch can be as large as 1.11*2 us (e.g., 2 symbols in 960 kHz SCS and normal CP if 960 kHz is the maximum supported SCS) or 2.23*2 us (e.g., 2 symbols in 480 kHz SCS and normal CP if 480 kHz is the maximum supported SCS), and the maximum number of symbols for CORESET can be 3. This example is also shown as #6 in TABLE 1C.

In yet another example, there are two candidate SS/PBCH blocks mapped to consecutive symbols in the slot as the predefined time unit for SS/PBCH block pattern, and for every supported SCS with normal CP, the first symbols of the candidate SS/PBCH blocks within a half frame have indexes of $\{4, 8\}+14 \cdot n$, where $n \in S_{index}$ and $S_{index}$ is as described in one example of this disclosure. An illustration of this example is shown in 1307 of FIG. 13A. For this example, the gap for TX/RX switch can be as large as 1.11*1 us (e.g., 1 symbols in 960 kHz SCS and normal CP if 960 kHz is the maximum supported SCS) or 2.23*1 us (e.g., 1 symbols in 480 kHz SCS and normal CP if 480 kHz is the maximum supported SCS), and the maximum number of symbols for CORESET can be 4. This example is also shown as #7 in TABLE 1C.

Figure 13B:
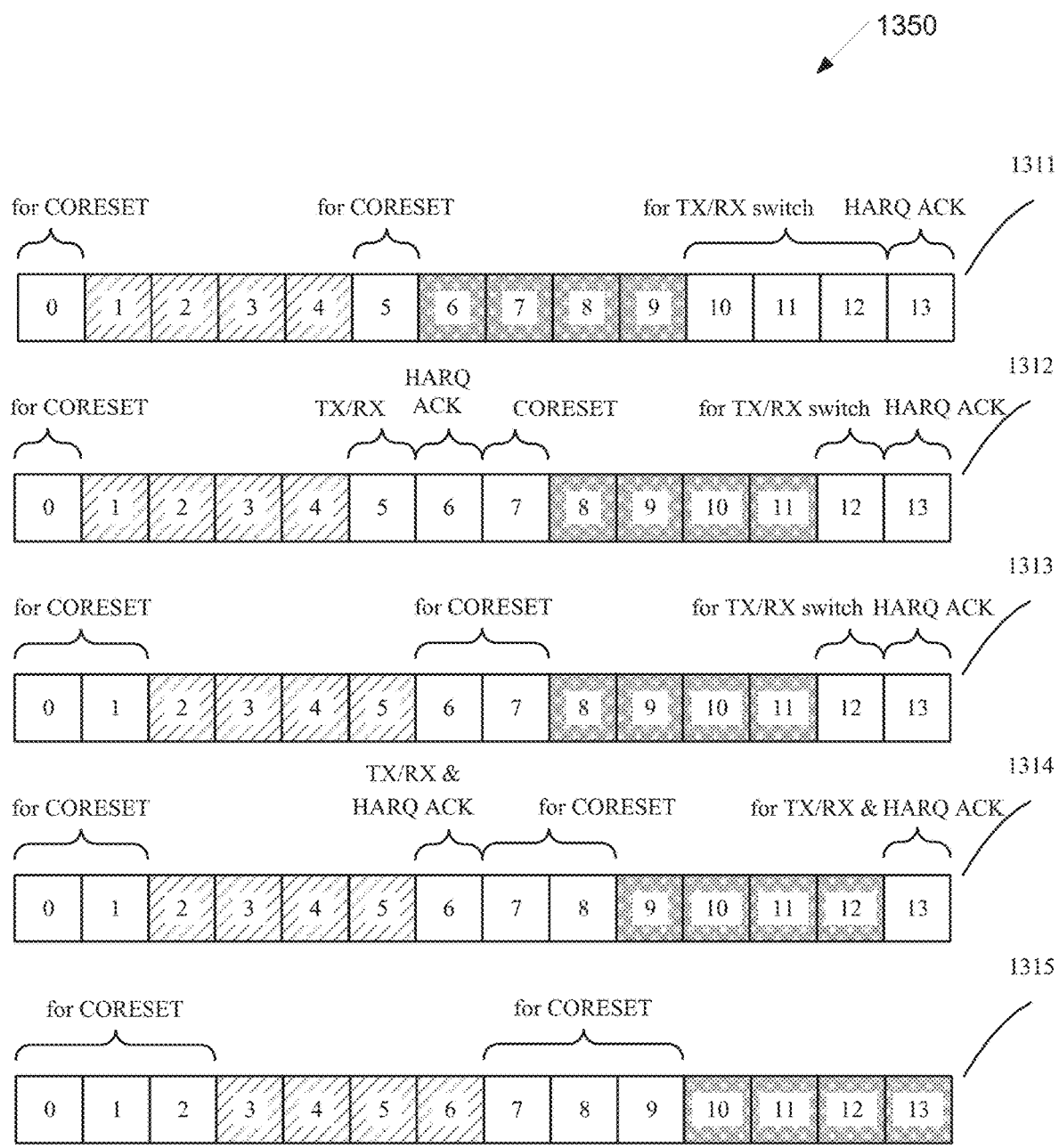
FIG. 13B illustrates yet another example SS/PBCH block patterns according to embodiments of the present disclosure.

FIG. 13B illustrates yet another example SS/PBCH block patterns 1350 according to embodiments of the present disclosure. An embodiment of the SS/PBCH block patterns 1350 shown in FIG. 13B is for illustration only. In yet another example, there are two candidate SS/PBCH blocks mapped to non-consecutive symbols in the slot as the predefined time unit for SS/PBCH block pattern, and for every supported SCS with normal CP, the first symbols of the candidate SS/PBCH blocks within a half frame have indexes of $\{1, 6\}+14 \cdot n$, where $n \in S_{index}$ and $S_{index}$ is as described in one example of this disclosure. An illustration of this example is shown in 1311 of FIG. 13B. For this example, the gap for TX/RX switch can be as large as 1.11*3 us (e.g., 3 symbols in 960 kHz SCS and normal CP if 960 kHz is the maximum supported SCS) or 2.23*3 us (e.g., 3 symbols in 480 kHz SCS and normal CP if 480 kHz is the maximum supported SCS), and the maximum number of symbols for CORESET can be 1. This example is also shown as #8 in TABLE 1C.

In yet another example, there are two candidate SS/PBCH blocks mapped to non-consecutive symbols in the slot as the predefined time unit for SS/PBCH block pattern, and for every supported SCS with normal CP, the first symbols of the candidate SS/PBCH blocks within a half frame have indexes of $\{1, 8\}+14 \cdot n$, where $n \in S_{index}$ and $S_{index}$ is as described in one example of this disclosure. An illustration of this example is shown in 1312 of FIG. 13Bb. For this example, the gap for TX/RX switch can be as large as 1.11*1 us (e.g., 1 symbol in 960 kHz SCS and normal CP if 960 kHz is the maximum supported SCS) or 2.23*1 us (e.g., 1 symbol in 480 kHz SCS and normal CP if 480 kHz is the maximum supported SCS), and the maximum number of symbols for CORESET can be 1. This example is also shown as #9 in TABLE 1C.

In yet another example, there are two candidate SS/PBCH blocks mapped to non-consecutive symbols in the slot as the predefined time unit for SS/PBCH block pattern, and for every supported SCS with normal CP, the first symbols of the candidate SS/PBCH blocks within a half frame have indexes of {2, 8}+14·n, where n∈$S_{index}$ and $S_{index}$ is as described in one example of this disclosure. An illustration of this example is shown in 1313 of FIG. 13B. For this example, the gap for TX/RX switch can be as large as 1.11*1 us (e.g., 1 symbol in 960 kHz SCS and normal CP if 960 kHz is the maximum supported SCS) or 2.23*1 us (e.g., 1 symbol in 480 kHz SCS and normal CP if 480 kHz is the maximum supported SCS), and the maximum number of symbols for CORESET can be 2. This example is also shown as #10 in TABLE 1C.

In yet another example, there are two candidate SS/PBCH blocks mapped to non-consecutive symbols in the slot as the predefined time unit for SS/PBCH block pattern, and for every supported SCS with normal CP, the first symbols of the candidate SS/PBCH blocks within a half frame have indexes of {2, 9}+14·n, where n∈$S_{index}$ and $S_{index}$ is as described in one example of this disclosure. An illustration of this example is shown in 1314 of FIG. 13B. For this example, the gap for TX/RX switch can be as large as 1.11*1 us (e.g., 1 symbol in 960 kHz SCS and normal CP if 960 kHz is the maximum supported SCS) or 2.23*1 us (e.g., 1 symbol in 480 kHz SCS and normal CP if 480 kHz is the maximum supported SCS), and the maximum number of symbols for CORESET can be 2. This example is also shown as #11 in TABLE 1C.

In yet another example, there are two candidate SS/PBCH blocks mapped to non-consecutive symbols in the slot as the predefined time unit for SS/PBCH block pattern, and for every supported SCS with normal CP, the first symbols of the candidate SS/PBCH blocks within a half frame have indexes of {3,10}+14·n, where n∈$S_{index}$ and $S_{index}$ is as described in one example of this disclosure. An illustration of this example is shown in 1315 of FIG. 13B. For this example, there is no gap for TX/RX switch and HARQ ACK, and the maximum number of symbols for CORESET can be 3. This example is also shown as #12 in TABLE 1C.

In yet another embodiment, the predefined time unit for SS/PBCH block pattern is a slot with respect to a reference SCS, and the mapping of candidate SS/PBCH block(s) in the slot with respect to all the supported SCSs in the carrier frequency range is determined based on the requirement of number of symbols for CORESET and delay requirement for TX to RX switch (e.g., aiming to receive the corresponding HARQ ACK in the same slot).

In one example, the reference SCS can be the minimum SCS for data transmission for the considered carrier frequency range, e.g., 120 kHz or 240 kHz or 480 kHz.

Figure 14:
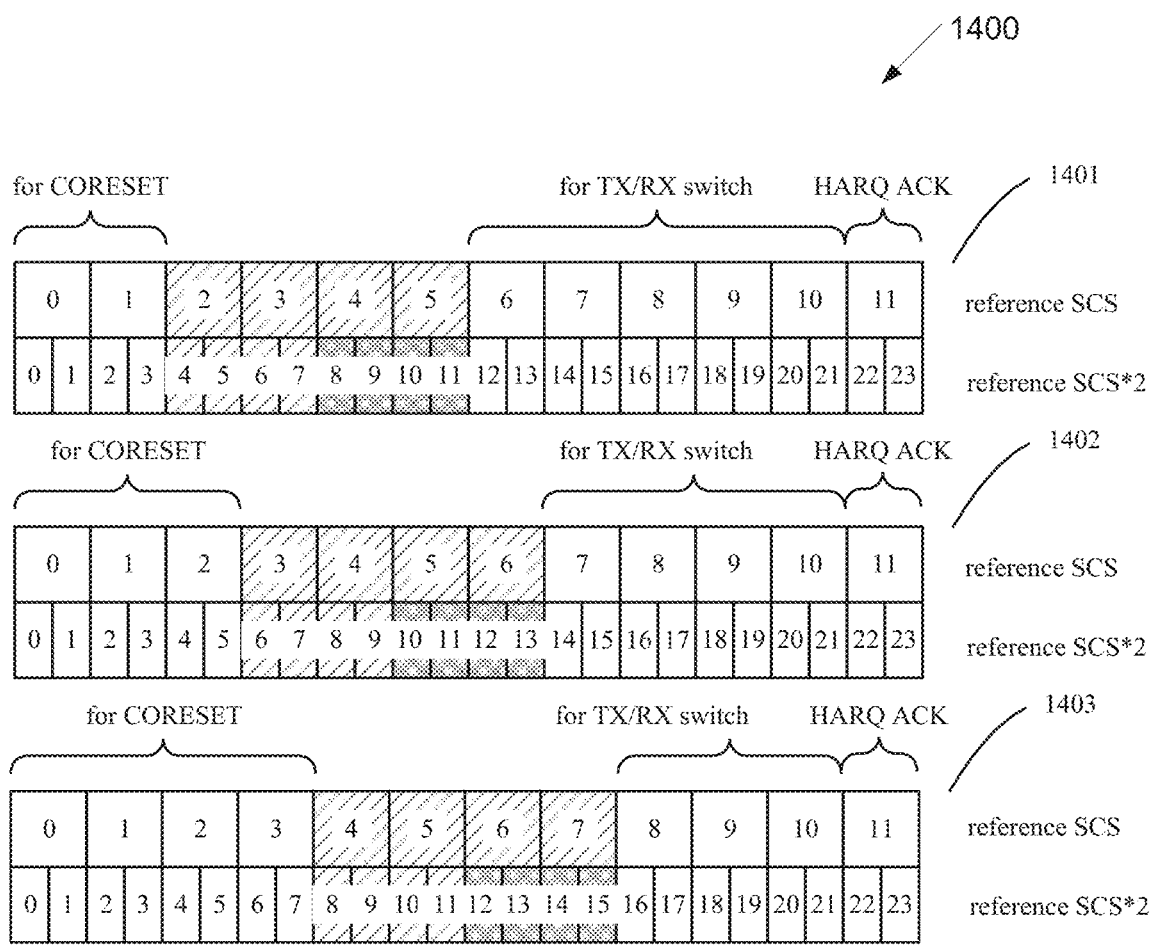
FIG. 14 illustrates yet another example SS/PBCH block patterns according to embodiments of the present disclosure.

FIG. 14 illustrates yet another example SS/PBCH block patterns 1400 according to embodiments of the present disclosure. An embodiment of the SS/PBCH block patterns 1400 shown in FIG. 14 is for illustration only. In one example, there is one candidate SS/PBCH block mapped to the slot with respect to reference SCS, and for a first numerology with extended CP length, the first symbols of the candidate SS/PBCH blocks within a half frame have indexes of {2}+12·n, where n∈$S_{index,1}$ and $S_{index,1}$ is as described in one example of this disclosure, and for a second numerology with extended CP length, the first symbols of the candidate SS/PBCH blocks within a half frame have indexes of {4, 8}+24·n, where n∈$S_{index,2}$ and $S_{index,2}$ is as described in one example of this disclosure, and the SCS in the second numerology is twice of the reference SCS in the first numerology (e.g., the SCS in the second numerology is 960 kHz, and the reference SCS in the first numerology is 480 kHz). An illustration of this example is shown in 1401 of FIG. 14. For this example, if the reference SCS is 480 kHz, the gap for TX/RX switch can be as large as 2.6*5 us (e.g., 5 symbols in 480 kHz SCS and extended CP), and the maximum number of symbols for CORESET with respect to the reference SCS can be 2. This example is shown as #1 and #2 of TABLE 1D.

In another example, there is one candidate SS/PBCH block mapped to the slot with respect to reference SCS, and for a first numerology with extended CP length, the first symbols of the candidate SS/PBCH blocks within a half frame have indexes of {3}+12·n, where n∈$S_{index,1}$ and $S_{index,1}$ is as described in one example of this disclosure, and for a second numerology with extended CP length, the first symbols of the candidate SS/PBCH blocks within a half frame have indexes of {6,10}+24·n, where n∈$S_{index,2}$ and $S_{index,2}$ is as described in one example of this disclosure, and the SCS in the second numerology is twice of the reference SCS in the first numerology (e.g., the SCS in the second numerology is 960 kHz, and the reference SCS in the first numerology is 480 kHz). An illustration of this example is shown in 1402 of FIG. 14. For this example, if the reference SCS is 480 kHz, the gap for TX/RX switch can be as large as 2.6*4 us (e.g., 4 symbols in 480 kHz SCS and extended CP), and the maximum number of symbols for CORESET with respect to the reference SCS can be 3. This example is shown as #3 and #4 of TABLE 1D.

In yet another example, there is one candidate SS/PBCH block mapped to the slot with respect to reference SCS, and for a first numerology with extended CP length, the first symbols of the candidate SS/PBCH blocks within a half frame have indexes of {4}+12·n, where n∈$S_{index,1}$ and $S_{index,1}$ is as described in one example of this disclosure, and for a second numerology with extended CP length, the first symbols of the candidate SS/PBCH blocks within a half frame have indexes of {8, 12}+24·n, where n∈$S_{index,2}$ and $S_{index,2}$ is as described in one example of this disclosure, and the SCS in the second numerology is twice of the reference SCS in the first numerology (e.g., the SCS in the second numerology is 960 kHz, and the reference SCS in the first numerology is 480 kHz). An illustration of this example is shown in 1403 of FIG. 14. For this example, if the reference SCS is 480 kHz, the gap for TX/RX switch can be as large as 2.6*3 us (e.g., 3 symbols in 480 kHz SCS and extended CP), and the maximum number of symbols for CORESET with respect to the reference SCS can be 4. This example is shown as #5 and #6 of TABLE 1D.

Figure 15A:
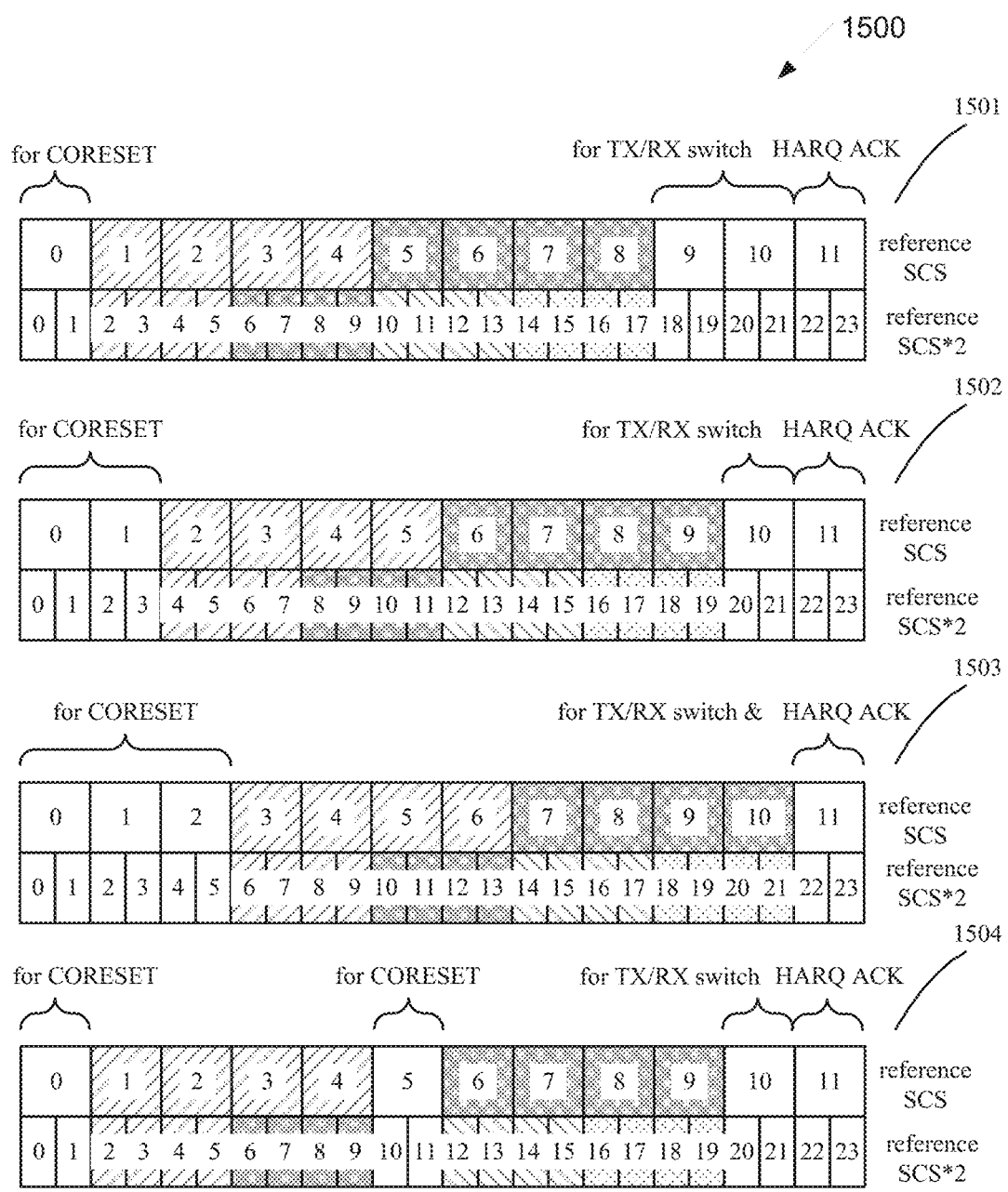
FIG. 15A illustrates yet another example SS/PBCH block patterns according to embodiments of the present disclosure.
Figure 15B:
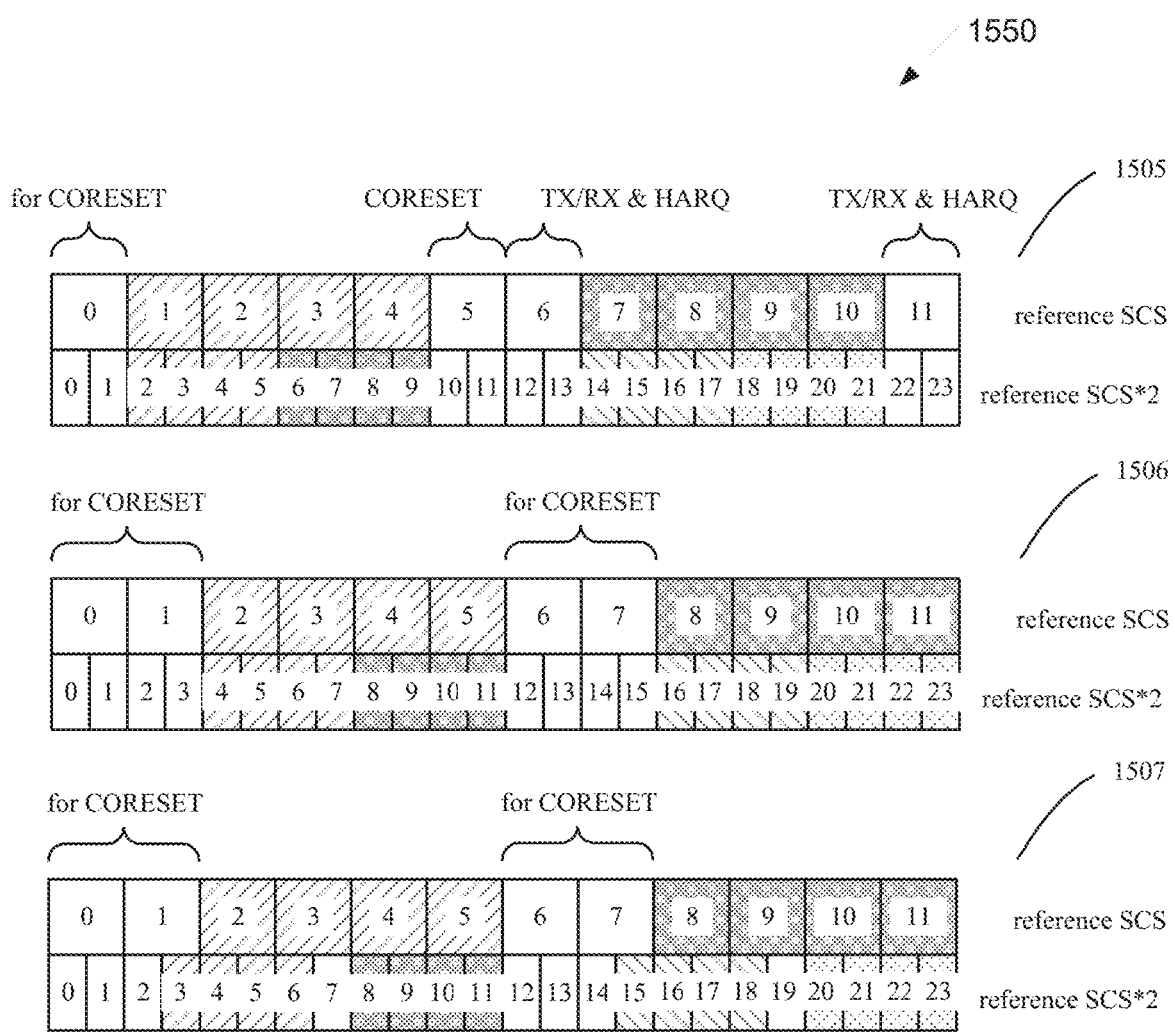
FIG. 15B illustrates yet another example SS/PBCH block patterns according to embodiments of the present disclosure.

FIG. 15A illustrates yet another example SS/PBCH block patterns 1500 according to embodiments of the present disclosure. An embodiment of the SS/PBCH block patterns 1500 shown in FIG. 15A is for illustration only. FIG. 15B illustrates yet another example SS/PBCH block patterns 1550 according to embodiments of the present disclosure. An embodiment of the SS/PBCH block patterns 1550 shown in FIG. 15B is for illustration only. In yet another example, there are two candidate SS/PBCH block mapped to the slot with respect to reference SCS, and for a first numerology with extended CP length, the first symbols of the candidate SS/PBCH blocks within a half frame have indexes of {1, 5}+12·n, where n∈$S_{index,1}$ and $S_{index,1}$ is as described in one example of this disclosure, and for a second numerology with extended CP length, the first symbols of the candidate SS/PBCH blocks within a half frame have indexes of {2, 6, 10, 14}+24·n, where n∈$S_{index,2}$ and $S_{index,2}$ is as described in one example of this disclosure, and the SCS in the second numerology is twice of the reference SCS in the first numerology (e.g., the SCS in the second numerology is 960 kHz, and the reference SCS in the first numerology is 480 kHz). An illustration of this example is shown in 1501 of FIG. 15A. For this example, if the reference SCS is 480 kHz, the gap for TX/RX switch can be as large as 2.6*2 us (e.g., 2 symbols in 480 kHz SCS and extended CP), and the maximum number of symbols for CORESET with respect to the reference SCS can be 1. This example is shown as #7 and #8 of TABLE 1D.

In yet another example, there are two candidate SS/PBCH block mapped to the slot with respect to reference SCS, and for a first numerology with extended CP length, the first symbols of the candidate SS/PBCH blocks within a half frame have indexes of {2, 6}+12·n, where n∈$S_{index,1}$ and $S_{index,1}$ is as described in one example of this disclosure, and for a second numerology with extended CP length, the first symbols of the candidate SS/PBCH blocks within a half frame have indexes of {4, 8, 12, 16}+24·n, where n∈$S_{index,2}$ and $S_{index,2}$ is as described in one example of this disclosure, and the SCS in the second numerology is twice of the reference SCS in the first numerology (e.g., the SCS in the second numerology is 960 kHz, and the reference SCS in the first numerology is 480 kHz). An illustration of this example is shown in 1502 of FIG. 15A. For this example, if the reference SCS is 480 kHz, the gap for TX/RX switch can be as large as 2.6*1 us (e.g., 1 symbol in 480 kHz SCS and extended CP), and the maximum number of symbols for CORESET with respect to the reference SCS can be 2. This example is shown as #9 and #10 of TABLE 1D.

In yet another example, there are two candidate SS/PBCH block mapped to the slot with respect to reference SCS, and for a first numerology with extended CP length, the first symbols of the candidate SS/PBCH blocks within a half frame have indexes of {3, 7}+12·n, where n∈$S_{index,1}$ and $S_{index,1}$ is as described in one example of this disclosure, and for a second numerology with extended CP length, the first symbols of the candidate SS/PBCH blocks within a half frame have indexes of {6, 10, 14, 18}+24·n, where n∈$S_{index,2}$ and $S_{index,2}$ is as described in one example of this disclosure, and the SCS in the second numerology is twice of the reference SCS in the first numerology (e.g., the SCS in the second numerology is 960 kHz, and the reference SCS in the first numerology is 480 kHz). An illustration of this example is shown in 1503 of FIG. 15A. For this example, if the reference SCS is 480 kHz, the gap for TX/RX switch can be as large as 2.6*1 us (e.g., 1 symbol in 480 kHz SCS and extended CP), and the maximum number of symbols for CORESET with respect to the reference SCS can be 3. This example is shown as #11 and #12 of TABLE 1D.

In yet another example, there are two candidate SS/PBCH block mapped to the slot with respect to reference SCS, and for a first numerology with extended CP length, the first symbols of the candidate SS/PBCH blocks within a half frame have indexes of {1, 6}+12·n, where n∈$S_{index,1}$ and $S_{index,1}$ is as described in one example of this disclosure, and for a second numerology with extended CP length, the first symbols of the candidate SS/PBCH blocks within a half frame have indexes of {2, 6, 12, 16}+24·n, where n∈$S_{index,2}$ and $S_{index,2}$ is as described in one example of this disclosure, and the SCS in the second numerology is twice of the reference SCS in the first numerology (e.g., the SCS in the second numerology is 960 kHz, and the reference SCS in the first numerology is 480 kHz). An illustration of this example is shown in 1504 of FIG. 15A. For this example, if the reference SCS is 480 kHz, the gap for TX/RX switch can be as large as 2.6*1 us (e.g., 1 symbol in 480 kHz SCS and extended CP), and the maximum number of symbols for CORESET with respect to the reference SCS can be 1. This example is shown as #13 and #14 of TABLE 1D.

In yet another example, there are two candidate SS/PBCH blocks mapped to the slot with respect to reference SCS, and for a first numerology with extended CP length, the first symbols of the candidate SS/PBCH blocks within a half frame have indexes of {1, 7}+12·n, where n∈$S_{index,1}$ and $S_{index,1}$ is as described in one example of this disclosure, and for a second numerology with extended CP length, the first symbols of the candidate SS/PBCH blocks within a half frame have indexes of {2, 6, 14, 18}+24·n, where n∈$S_{index,2}$ and $S_{index,2}$ is as described in one example of this disclosure, and the SCS in the second numerology is twice of the reference SCS in the first numerology (e.g., the SCS in the second numerology is 960 kHz, and the reference SCS in the first numerology is 480 kHz). An illustration of this example is shown in 1305 of FIG. 15B. For this example, if the reference SCS is 480 kHz, the gap for TX/RX switch can be as large as 2.6*1 us (e.g., 1 symbol in 480 kHz SCS and extended CP), and the maximum number of symbols for CORESET with respect to the reference SCS can be 1. This example is shown as #15 and #16 of TABLE 1D.

In yet another example, there are two candidate SS/PBCH block mapped to the slot with respect to reference SCS, and for a first numerology with extended CP length, the first symbols of the candidate SS/PBCH blocks within a half frame have indexes of {2, 8}+12·n, where n∈$S_{index,1}$ and $S_{index,1}$ is as described in one example of this disclosure, and for a second numerology with extended CP length, the first symbols of the candidate SS/PBCH blocks within a half frame have indexes of {4, 8, 16, 20}+24·n, where n∈$S_{index,2}$ and $S_{index,2}$ is as described in one example of this disclosure, and the SCS in the second numerology is twice of the reference SCS in the first numerology (e.g., the SCS in the second numerology is 960 kHz, and the reference SCS in the first numerology is 480 kHz). An illustration of this example is shown in 1506 of FIG. 15B. For this example, there is no gap for TX/RX switch, and the maximum number of symbols for CORESET with respect to the reference SCS can be 2. This example is shown as #17 and #18 of TABLE 1D.

In yet another example, there are two candidate SS/PBCH block mapped to the slot with respect to reference SCS, and for a first numerology with extended CP length, the first symbols of the candidate SS/PBCH blocks within a half frame have indexes of {2, 8}+12·n, where n∈$S_{index,1}$ and $S_{index,1}$ is as described in one example of this disclosure, and for a second numerology with extended CP length, the first symbols of the candidate SS/PBCH blocks within a half frame have indexes of {3, 8, 15, 20}+24·n, where n∈$S_{index,2}$ and $S_{index,2}$ is as described in one example of this disclosure, and the SCS in the second numerology is twice of the reference SCS in the first numerology (e.g., the SCS in the second numerology is 960 kHz, and the reference SCS in the first numerology is 480 kHz). An illustration of this example is shown in 1507 of FIG. 15B. This example is shown as #19 and #20 of TABLE 1D.

In yet another embodiment, the predefined time unit for SS/PBCH block pattern is a slot with respect to the SCS of the SS/PBCH block, and the SS/PBCH block pattern is common for all supported SCS or at least one of the supported SCS. For this example, the mapping of candidate SS/PBCH block(s) in the slot can be determined based on the requirement of number of symbols for CORESET and delay requirement for TX to RX switch (e.g., aiming to receive the corresponding HARQ ACK in the same slot).

In one example, the supported SCS for the higher frequency range can be the set of {120 kHz, 240 kHz, 480 kHz, 960 kHz} or its subset.

Figure 16A:
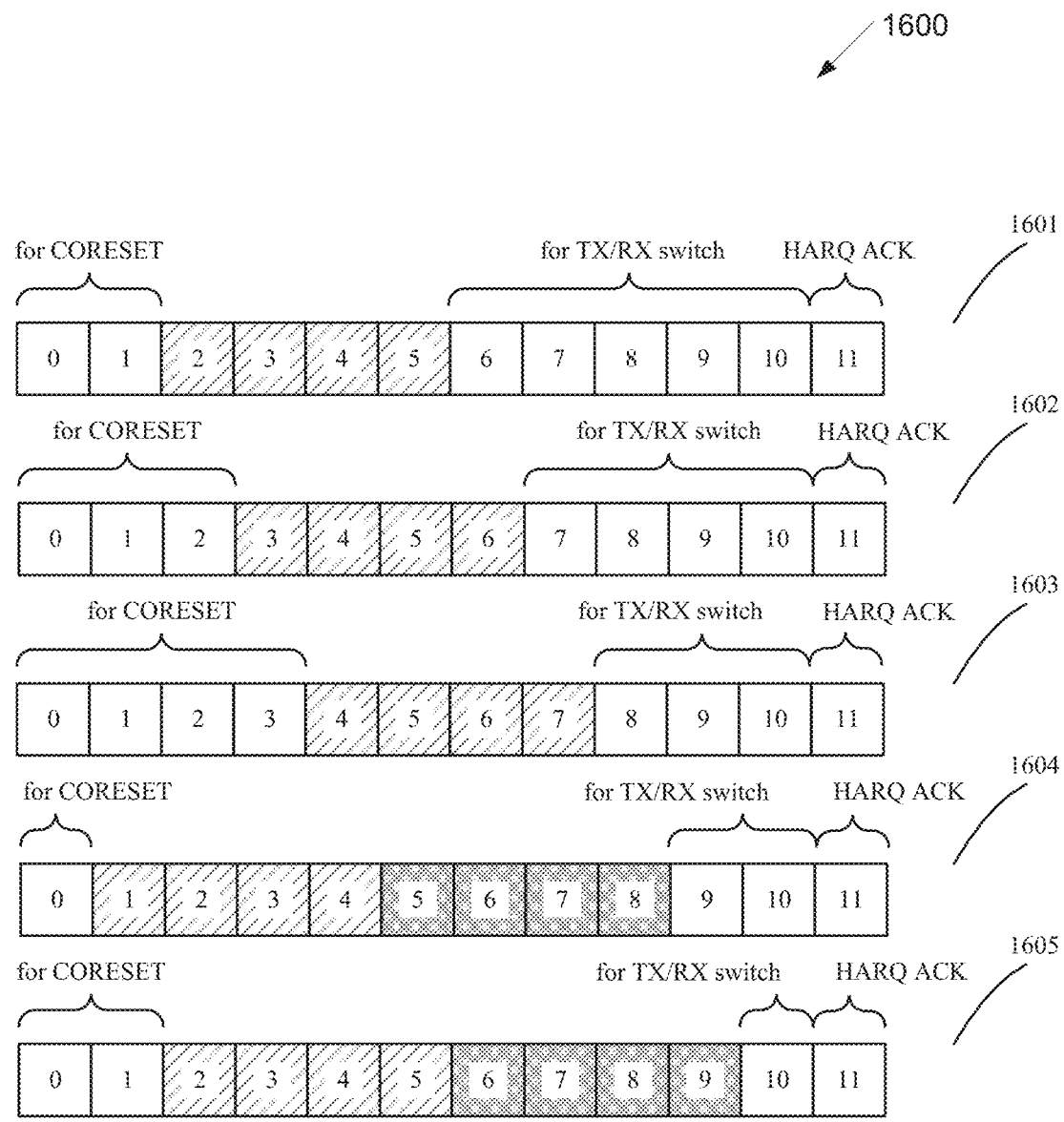
FIG. 16A illustrates yet another example SS/PBCH block patterns according to embodiments of the present disclosure.

FIG. 16A illustrates yet another example SS/PBCH block patterns 1600 according to embodiments of the present disclosure. An embodiment of the SS/PBCH block patterns 1600 shown in FIG. 16A is for illustration only. In one example, there is one candidate SS/PBCH block mapped to the slot as the predefined time unit for SS/PBCH block pattern, and for every supported SCS with extended CP, the first symbols of the candidate SS/PBCH blocks within a half frame have indexes of {2}+12·n, where n∈$S_{index}$ and $S_{index}$ is as described in one example of this disclosure. An illustration of this example is shown in 1601 of FIG. 16A. For this example, the gap for TX/RX switch can be as large as 1.3*5 us (e.g., 5 symbols in 960 kHz SCS and extended CP if 960 kHz is the maximum supported SCS) or 2.6*5 us (e.g., 5 symbols in 480 kHz SCS and extended CP if 480 kHz is the maximum supported SCS), and the maximum number of symbols for CORESET can be 2. This example is shown as #21 of TABLE 1D.

In another example, there is one candidate SS/PBCH block mapped to the slot as the predefined time unit for SS/PBCH block pattern, and for every supported SCS with extended CP, the first symbols of the candidate SS/PBCH blocks within a half frame have indexes of {3}+12·n, where n∈$S_{index}$ and $S_{index}$ is as described in one example of this disclosure. An illustration of this example is shown in 1602 of FIG. 16A. For this example, the gap for TX/RX switch can be as large as 1.3*4 us (e.g., 4 symbols in 960 kHz SCS and extended CP if 960 kHz is the maximum supported SCS) or 2.6*4 us (e.g., 4 symbols in 480 kHz SCS and extended CP if 480 kHz is the maximum supported SCS), and the maximum number of symbols for CORESET can be 3. This example is shown as #22 of TABLE 1D.

In yet another example, there is one candidate SS/PBCH block mapped to the slot as the predefined time unit for SS/PBCH block pattern, and for every supported SCS with extended CP, the first symbols of the candidate SS/PBCH blocks within a half frame have indexes of {4}+12·n, where n∈$S_{index}$ and $S_{index}$ is as described in one example of this disclosure. An illustration of this example is shown in 1603 of FIG. 16A. For this example, the gap for TX/RX switch can be as large as 1.3*3 us (e.g., 3 symbols in 960 kHz SCS and extended CP if 960 kHz is the maximum supported SCS) or 2.6*3 us (e.g., 3 symbols in 480 kHz SCS and extended CP if 480 kHz is the maximum supported SCS), and the maximum number of symbols for CORESET can be 4. This example is shown as #23 of TABLE 1D.

In yet another example, there are two candidate SS/PBCH blocks mapped to the slot as the predefined time unit for SS/PBCH block pattern, and for every supported SCS with extended CP, the first symbols of the candidate SS/PBCH blocks within a half frame have indexes of {1, 5}+12·n, where n∈$S_{index}$ and $S_{index}$ is as described in one example of this disclosure. An illustration of this example is shown in 1604 of FIG. 16A. For this example, the gap for TX/RX switch can be as large as 1.3*2 us (e.g., 2 symbols in 960 kHz SCS and extended CP if 960 kHz is the maximum supported SCS) or 2.6*2 us (e.g., 2 symbols in 480 kHz SCS and extended CP if 480 kHz is the maximum supported SCS), and the maximum number of symbols for CORESET can be 1. This example is shown as #24 of TABLE 1D.

In yet another example, there are two candidate SS/PBCH blocks mapped to the slot as the predefined time unit for SS/PBCH block pattern, and for every supported SCS with extended CP, the first symbols of the candidate SS/PBCH blocks within a half frame have indexes of {2, 6}+12·n, where n∈$S_{index}$ and $S_{index}$ is as described in one example of this disclosure. An illustration of this example is shown in 1605 of FIG. 16A. For this example, the gap for TX/RX switch can be as large as 1.3*1 us (e.g., 1 symbol in 960 kHz SCS and extended CP if 960 kHz is the maximum supported SCS) or 2.6*1 us (e.g., 1 symbol in 480 kHz SCS and extended CP if 480 kHz is the maximum supported SCS), and the maximum number of symbols for CORESET can be 2. This example is shown as #25 of TABLE 1D.

Figure 16B:
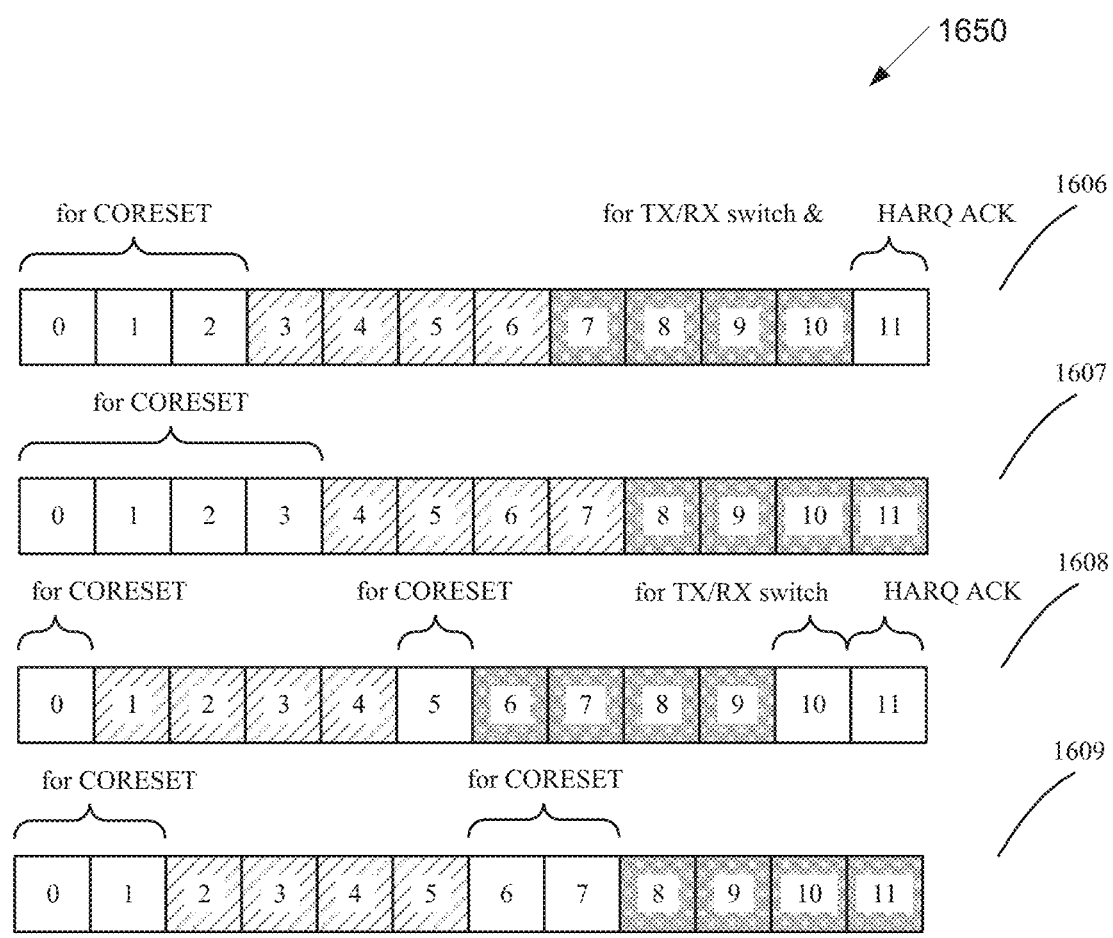
FIG. 16B illustrates yet another example SS/PBCH block patterns according to embodiments of the present disclosure.

FIG. 16B illustrates yet another example SS/PBCH block patterns 1650 according to embodiments of the present disclosure. An embodiment of the SS/PBCH block patterns 1650 shown in FIG. 16B is for illustration only. In yet another example, there are two candidate SS/PBCH blocks mapped to the slot as the predefined time unit for SS/PBCH block pattern, and for every supported SCS with extended CP, the first symbols of the candidate SS/PBCH blocks within a half frame have indexes of {3, 7}+12·n, where n∈$S_{index}$ and $S_{index}$ is as described in one example of this disclosure. An illustration of this example is shown in 1606 of FIG. 16B. For this example, the gap for TX/RX switch can be as large as 1.3*1 us (e.g., 1 symbol in 960 kHz SCS and extended CP if 960 kHz is the maximum supported SCS) or 2.6*1 us (e.g., 1 symbol in 480 kHz SCS and extended CP if 480 kHz is the maximum supported SCS), and the maximum number of symbols for CORESET can be 3. This example is shown as #26 of TABLE 1D.

In yet another example, there are two candidate SS/PBCH blocks mapped to the slot as the predefined time unit for SS/PBCH block pattern, and for every supported SCS with extended CP, the first symbols of the candidate SS/PBCH blocks within a half frame have indexes of {4, 8}+12·n, where n∈$S_{index}$ and $S_{index}$ is as described in one example of this disclosure. An illustration of this example is shown in 1607 of FIG. 16B. For this example, there is no gap for TX/RX switch, and the maximum number of symbols for CORESET can be 4. This example is shown as #27 of TABLE 1D.

In yet another example, there are two candidate SS/PBCH blocks mapped to the slot as the predefined time unit for SS/PBCH block pattern, and for every supported SCS with extended CP, the first symbols of the candidate SS/PBCH blocks within a half frame have indexes of {1, 6}+12·n, where n∈$S_{index}$ and $S_{index}$ is as described in one example of this disclosure. An illustration of this example is shown in 1608 of FIG. 16B. For this example, the gap for TX/RX switch can be as large as 1.3*1 us (e.g., 1 symbol in 960 kHz SCS and extended CP if 960 kHz is the maximum supported SCS) or 2.6*1 us (e.g., 1 symbol in 480 kHz SCS and extended CP if 480 kHz is the maximum supported SCS), and the maximum number of symbols for CORESET can be 1. This example is shown as #28 of TABLE 1D.

In yet another example, there are two candidate SS/PBCH blocks mapped to the slot as the predefined time unit for SS/PBCH block pattern, and for every supported SCS with extended CP, the first symbols of the candidate SS/PBCH blocks within a half frame have indexes of {2, 8}+12·n, where n∈$S_{index}$ and $S_{index}$ is as described in one example of this disclosure. An illustration of this example is shown in 1609 of FIG. 16A. For this example, there is no gap for TX/RX switch, and the maximum number of symbols for CORESET can be 2. This example is shown as #29 of TABLE 1D.

Example according to above examples for normal CP is shown in TABLE 1B, or TABLE 1C, and example according to above examples for extended CP is shown in TABLE 1D.

TABLE 1B

Example SS/PBCH block pattern.

| Example Index | $S_{start}$ | $N_{symb}^{slot}$ | K | SCS for SSB (kHz) |
|---|---|---|---|---|
| #1 | {2, 8} | 14 | 1 | 120/240/480/960 |
| #2 | {4, 8, 16, 20} | 14 | 2 | 120/240/480/960 |
| #3 | {8, 12, 16, 20, 32, 36, 40, 44} | 14 | 4 | 120/240/480/960 |
| #4 | {2} | 14 | 1 | 120/240/480/960 |
| #5 | {8} | 14 | 1 | 120/240/480/960 |
| #6 | {4, 16} | 14 | 2 | 120/240/480/960 |
| #7 | {8, 20} | 14 | 2 | 120/240/480/960 |
| #8 | {8, 16, 32, 40} | 14 | 4 | 120/240/480/960 |
| #9 | {12, 20, 36, 44} | 14 | 4 | 120/240/480/960 |
| #10 | {2} | 14 | 1 | 120/240/480 |
| #11 | {4, 8} | 14 | 2 | 240/480/960 |
| #12 | {3} | 14 | 1 | 120/240/480 |
| #13 | {6, 10} | 14 | 2 | 240/480/960 |
| #14 | {4} | 14 | 1 | 120/240/480 |
| #15 | {8, 12} | 14 | 2 | 240/480/960 |
| #16 | {1, 5} | 14 | 1 | 120/240/480 |
| #17 | {2, 6, 10, 14} | 14 | 2 | 240/480/960 |
| #18 | {2, 6} | 14 | 1 | 120/240/480 |
| #19 | {4, 8, 12, 16} | 14 | 2 | 240/480/960 |
| #20 | {3, 7} | 14 | 1 | 120/240/480 |
| #21 | {6, 10, 14, 18} | 14 | 2 | 240/480/960 |
| #22 | {4, 8} | 14 | 1 | 120/240/480 |
| #23 | {8, 12, 16, 20} | 14 | 2 | 240/480/960 |
| #24 | {1, 6} | 14 | 1 | 120/240/480 |
| #25 | {2, 6, 12, 16} | 14 | 2 | 240/480/960 |
| #26 | {1, 8} | 14 | 1 | 120/240/480 |
| #27 | {2, 6, 16, 20} | 14 | 2 | 240/480/960 |
| #28 | {2, 8} | 14 | 1 | 120/240/480 |
| #29 | {4, 8, 16, 20} | 14 | 2 | 240/480/960 |
| #30 | {2, 9} | 14 | 1 | 120/240/480 |
| #31 | {4, 8, 18, 22} | 14 | 2 | 240/480/960 |
| #32 | {3, 10} | 14 | 1 | 120/240/480 |
| #33 | {6, 10, 20, 24} | 14 | 2 | 240/480/960 |

TABLE 1C

Example SS/PBCH block pattern.

| Example Index | $S_{start}$ | $N_{symb}^{slot}$ | K | SCS for SSB (kHz) |
|---|---|---|---|---|
| #1 | {2} | 14 | 1 | 120/240/480/960 |
| #2 | {3} | 14 | 1 | 120/240/480/960 |
| #3 | {4} | 14 | 1 | 120/240/480/960 |
| #4 | {1, 5} | 14 | 2 | 120/240/480/960 |
| #5 | {2, 6} | 14 | 2 | 120/240/480/960 |
| #6 | {3, 7} | 14 | 2 | 120/240/480/960 |
| #7 | {4, 8} | 14 | 2 | 120/240/480/960 |
| #8 | {1, 6} | 14 | 2 | 120/240/480/960 |
| #9 | {1, 8} | 14 | 2 | 120/240/480/960 |
| #10 | {2, 8} | 14 | 2 | 120/240/480/960 |
| #11 | {2, 9} | 14 | 2 | 120/240/480/960 |
| #12 | {3, 10} | 14 | 2 | 120/240/480/960 |

TABLE 1D

Example SS/PBCH block pattern.

| Example Index | $S_{start}$ | $N_{symb}^{slot}$ | K | SCS for SSB (kHz) |
|---|---|---|---|---|
| #1 | {2} | 12 | 1 | 120/240/480 |
| #2 | {4, 8} | 12 | 2 | 240/480/960 |
| #3 | {3} | 12 | 1 | 120/240/480 |
| #4 | {6, 10} | 12 | 2 | 240/480/960 |
| #5 | {4} | 12 | 1 | 120/240/480 |
| #6 | {8, 12} | 12 | 2 | 240/480/960 |
| #7 | {1, 5} | 12 | 1 | 120/240/480 |
| #8 | {2, 6, 10, 14} | 12 | 2 | 240/480/960 |
| #9 | {2, 6} | 12 | 1 | 120/240/480 |

TABLE 1D-continued

Example SS/PBCH block pattern.

| Example Index | $S_{start}$ | $N_{symb}^{slot}$ | K | SCS for SSB (kHz) |
|---|---|---|---|---|
| #10 | {4, 8, 12, 16} | 12 | 2 | 240/480/960 |
| #11 | {3, 7} | 12 | 1 | 120/240/480 |
| #12 | {6, 10, 14, 18} | 12 | 2 | 240/480/960 |
| #13 | {1, 6} | 12 | 1 | 120/240/480 |
| #14 | {2, 6, 12, 16} | 12 | 2 | 240/480/960 |
| #15 | {1, 7} | 12 | 1 | 120/240/480 |
| #16 | {2, 6, 14, 18} | 12 | 2 | 240/480/960 |
| #17 | {2, 8} | 12 | 1 | 120/240/480 |
| #18 | {4, 8, 16, 20} | 12 | 2 | 240/480/960 |
| #19 | {2, 8} | 12 | 1 | 120/240/480 |
| #20 | {3, 8, 15, 20} | 12 | 2 | 240/480/960 |
| #21 | {2} | 12 | 1 | 120/240/480/960 |
| #22 | {3} | 12 | 1 | 120/240/480/960 |
| #23 | {4} | 12 | 1 | 120/240/480/960 |
| #24 | {1, 5} | 12 | 1 | 120/240/480/960 |
| #25 | {2, 6} | 12 | 1 | 120/240/480/960 |
| #26 | {3, 7} | 12 | 1 | 120/240/480/960 |
| #27 | {4, 8} | 12 | 1 | 120/240/480/960 |
| #28 | {1, 6} | 12 | 1 | 120/240/480/960 |
| #29 | {2, 8} | 12 | 1 | 120/240/480/960 |

In one embodiment, the first 4 symbols with respect to 120 kHz SCS, which is $4 \cdot 2^\mu$ symbols with respect to $120 \cdot 2^\mu$ kHz SCS, are reserved and not mapped for SS/PBCH blocks, and the 4 last symbols with respect to 120 kHz SCS, which is $4 \cdot 2^\mu$ symbols with respect to $120 \cdot 2^\mu$ kHz SCS, are reserved and not mapped for SS/PBCH blocks. There are $4 \cdot 2^\mu$ number of SS/PBCH blocks in the predefined time unit (e.g., 2 slots in 120 kHz SCS).

In one embodiment, the first SS/PBCH block within the predefined time unit starts from symbol #4 with respect to 120 kHz SCS, which is symbol #$4 \cdot 2^\mu$ with respect to $120 \cdot 2^\mu$ kHz SCS. The last SS/PBCH block within the predefined time unit starts at symbol #$24 \cdot 2^\mu - 4$ with respect to $120 \cdot 2^\mu$ kHz SCS. If the gap between two neighboring SS/PBCH block is at least 1 symbol with respect to some SCS, symbols #12 to #15 with respect to 120 kHz SCS can be utilized for the SS/PBCH block mapping. For instance, the SS/PBCH block in the first half can be shifted to later symbols, and SS/PBCH block in the second half can be shifted to the earlier symbols. In this example, the SS/PBCH block pattern with respect to $120 \cdot 2^\mu$ kHz SCS can be expressed as follow, wherein $N_{gap}^\mu$ is the minimum number of symbol required for beam sweeping of SS/PBCH block with respect to $120 \cdot 2^\mu$ kHz SCS.

$S_{start}\{4 \cdot 2^\mu, 4 \cdot 2^\mu + (4 + N_{gap}^\mu), \ldots 4 \cdot 2^\mu + (4 + N_{gap}^\mu)(2 \cdot 2^\mu - 1), 24 \cdot 2^\mu - 4 - (4 + N_{gap}^\mu)(2 \cdot 2^\mu - 1), \ldots, 24 \cdot 2^\mu - 4 - (4 + N_{gap}^\mu), 24 \cdot 2^\mu - 4\}$, $N_{symp}^{slot} = 14$, and $k = 2 \cdot 2^\mu$.

Figure 17:
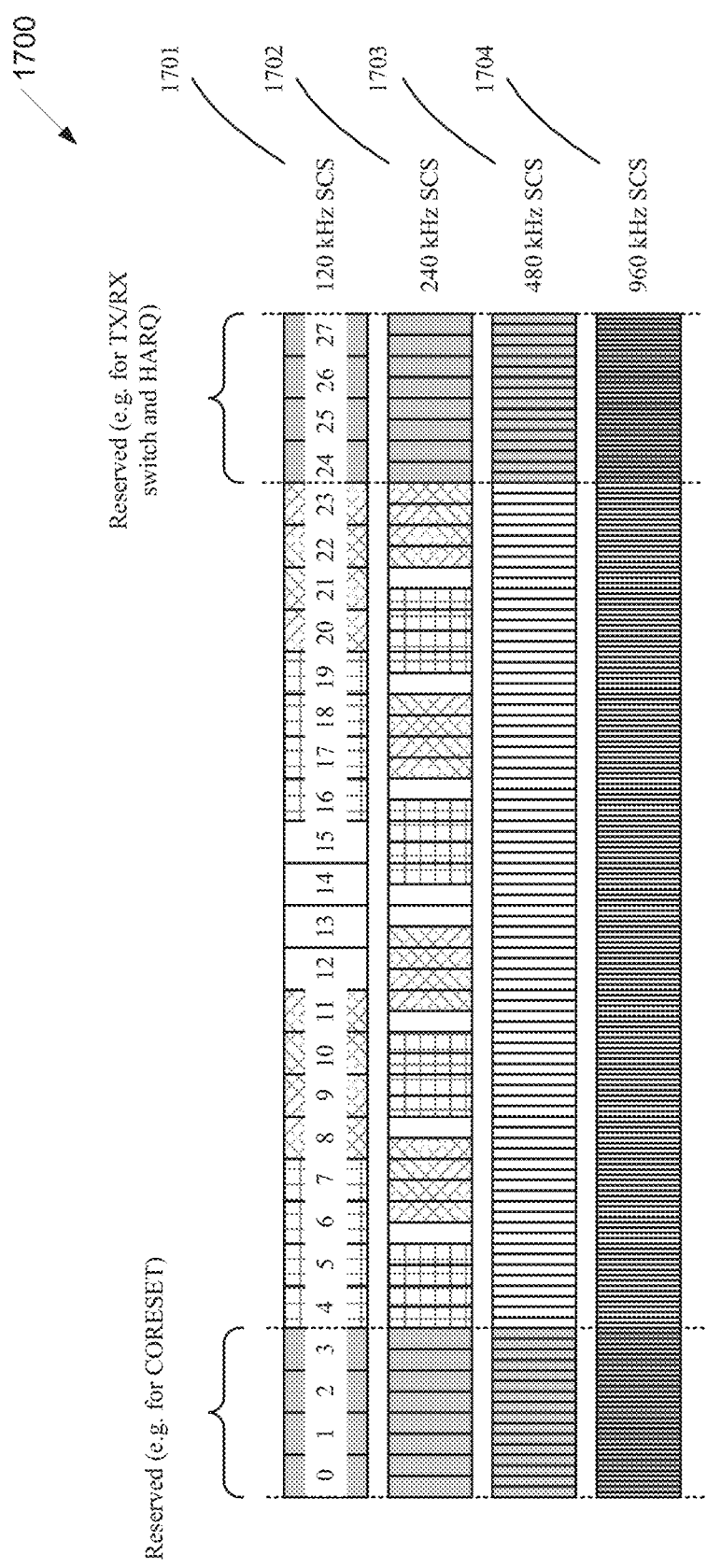
FIG. 17 illustrates yet another example SS/PBCH block patterns according to embodiments of the present disclosure.

Example corresponding to this example is shown in TABLE 2A, and illustration of this example is shown in FIG. 17. 1702 in FIG. 17 corresponds to the example with $N_{gap}^\mu = 1$, which is Example 2 in TABLE 2A.

TABLE 2A

Example SS/PBCH block pattern.

| Example Index | $S_{start}$ | $N_{symb}^{slot}$ | K | $N_{gap}^\mu$ | SCS for SSB |
|---|---|---|---|---|---|
| #1 | {8, 12, 16, 20, 32, 36, 40, 44} | 14 | 4 | 0 | 240 kHz |
| #2 | {8, 13, 18, 23, 29, 34, 39, 44} | 14 | 4 | 1 | 240 kHz |
| #3 | {16, 20, 24, 28, 32, 36, 40, 44, 64, 68, 72, 76, 80, 84, 88, 92} | 14 | 8 | 0 | 480 kHz |

TABLE 2A-continued

Example SS/PBCH block pattern.

| Example Index | $S_{start}$ | $N_{symb}^{slot}$ | K | $N_{gap}^{\mu}$ | SCS for SSB |
|---|---|---|---|---|---|
| #4 | {16, 21, 26, 31, 36, 41, 46, 51, 57, 62, 67, 72, 77, 82, 87, 92} | 14 | 8 | 1 | 480 kHz |
| #5 | {32, 36, 40, 44, 48, 52, 56, 60, 64, 68, 72, 76, 80, 84, 88, 92, 128, 132, 136, 140, 144, 148, 152, 156, 160, 164, 168, 172, 176, 180, 184, 188} | 14 | 16 | 0 | 960 kHz |
| #6 | {32, 37, 42, 47, 52, 57, 62, 67, 72, 77, 82, 87, 92, 97, 102, 107, 113, 118, 123, 128, 133, 138, 143, 148, 153, 158, 163, 168, 173, 178, 183, 188} | 14 | 16 | 1 | 960 kHz |

FIG. 17 illustrates yet another example SS/PBCH block patterns 1700 according to embodiments of the present disclosure. An embodiment of the SS/PBCH block patterns 1700 shown in FIG. 17 is for illustration only. In another example, the first SS/PBCH block within the predefined time unit starts from symbol #4 with respect to 120 kHz SCS, which is symbol #4·2$^\mu$ with respect to 120·2$^\mu$ kHz SCS. If the gap between two neighboring SS/PBCH block is at least 1 symbol with respect to some SCS, symbols #12 to #15 with respect to 120 kHz SCS can be utilized for the SS/PBCH block mapping. For instance, the SS/PBCH block in the first half can be shifted to later symbols, and SS/PBCH block in the second half can be shifted to the earlier symbols. In this example, the SS/PBCH block pattern with respect to 120·2$^\mu$ kHz SCS can be expressed as follow, wherein $N_{gap}^{\mu}$ is the minimum number of symbol required for beam sweeping of SS/PBCH block with respect to 120·2$^\mu$ kHz SCS.

$$S_{start}=\{4\cdot2^{\mu},4\cdot2^{\mu}+(4+N_{gap}^{\mu}),\ldots,4\cdot2^{\mu}+(4+N_{gap}^{\mu})(4\cdot2^{\mu}-1)\}, N_{symb}^{slot}=14, \text{ and } K=2\cdot2^{\mu}.$$

Example corresponding to this example is shown in TABLE 2B.

TABLE 2B

Example SS/PBCH block pattern.

| Example Index | $S_{start}$ | $N_{symb}^{slot}$ | K | $N_{gap}^{\mu}$ | SCS for SSB |
|---|---|---|---|---|---|
| #1 | {8, 13, 18, 23, 28, 33, 38, 43} | 14 | 4 | 1 | 240 kHz |

TABLE 2B-continued

Example SS/PBCH block pattern.

| Example Index | $S_{start}$ | $N_{symb}^{slot}$ | K | $N_{gap}^{\mu}$ | SCS for SSB |
|---|---|---|---|---|---|
| #2 | {16, 21, 26, 31, 36, 41, 46, 51, 56, 61, 66, 71, 76, 81, 86, 91} | 14 | 8 | 1 | 480 kHz |
| #3 | {32, 37, 42, 47, 52, 57, 62, 67, 72, 77, 82, 87, 92, 97, 102, 107, 112, 117, 122, 127, 132, 137, 142, 147, 152, 157, 162, 167, 172, 177, 182, 187} | 14 | 16 | 1 | 960 kHz |

In another example, the first 2 symbols with respect to 120 kHz SCS, which is 2·2$^\mu$ symbols with respect to 120·2$^\mu$ kHz SCS, are reserved and not mapped for SS/PBCH blocks, and the 2 last symbols with respect to 120 kHz SCS, which is 2·2$^\mu$ symbols with respect to 120·2$^\mu$ kHz SCS, are reserved and not mapped for SS/PBCH blocks. There are 4·2$^\mu$ number of SS/PBCH blocks in the predefined time unit (e.g., 2 slots in 120 kHz SCS). If the gap between two neighboring SS/PBCH block is at least 1 symbol with respect to some SCS, symbols #2, #3, #12 to #15, #24, and #25 with respect to 120 kHz SCS can be utilized for the SS/PBCH block mapping.

In one example, the SS/PBCH block pattern with respect to 120·2$^\mu$ kHz SCS can be expressed as follow, wherein $N_{gap}^{\mu}$ is the minimum number of symbol required for beam sweeping of SS/PBCH block with respect to 120·2$^\mu$ kHz SCS (e.g., $N_{gap}^{\mu}=0$ for 120 kHz and/or 240 kHz SCS, and $N_{gap}^{\mu}=1$ for 480 kHz and/or 960 kHz SCS).

$$S_{start}=\{S_1, S_1+(4+N_{gap}^{\mu}), \ldots, S_1+(4+N_{gap}^{\mu})(2\cdot2^{\mu}-1), S_2-4-(4+N_{gap}^{\mu})(2\cdot2^{\mu}-1), \ldots, S_2-4-(4+N_{gap}^{\mu}), S_2-4\}, N_{symb}^{slot}=14, \text{ and } K=2\cdot2^{\mu}.$$

where $S_1$ is the starting symbol of the first SS/PBCH block within the predefined time unit, and contained in symbol #2, or #3, or #4 with respect to 120 kHz SCS (e.g., $S_1=4, 5, 6, 7,$ or 8 for 240 kHz SCS, or $S_1=8, 9, \ldots,$ or 16 for 480 kHz SCS, or $S_1=16, 17, \ldots, 32$ for 960 kHz SCS), and $S_2$ is the symbol after the last symbol of the last SS/PBCH block within the predefined time unit (i.e., equivalently $S_2-4$ is the starting symbol of the last SS/PBCH block), and contained in symbol #24, or #25, or #26 with respect to 120 kHz SCS (e.g., $S_1=48, 49, \ldots,$ or 52 for 240 kHz SCS, or $S_1=96, 97, \ldots,$ or 104 for 480 kHz SCS, or $S_1=192, 193, \ldots, 208$ for 960 kHz SCS).

Figure 18:
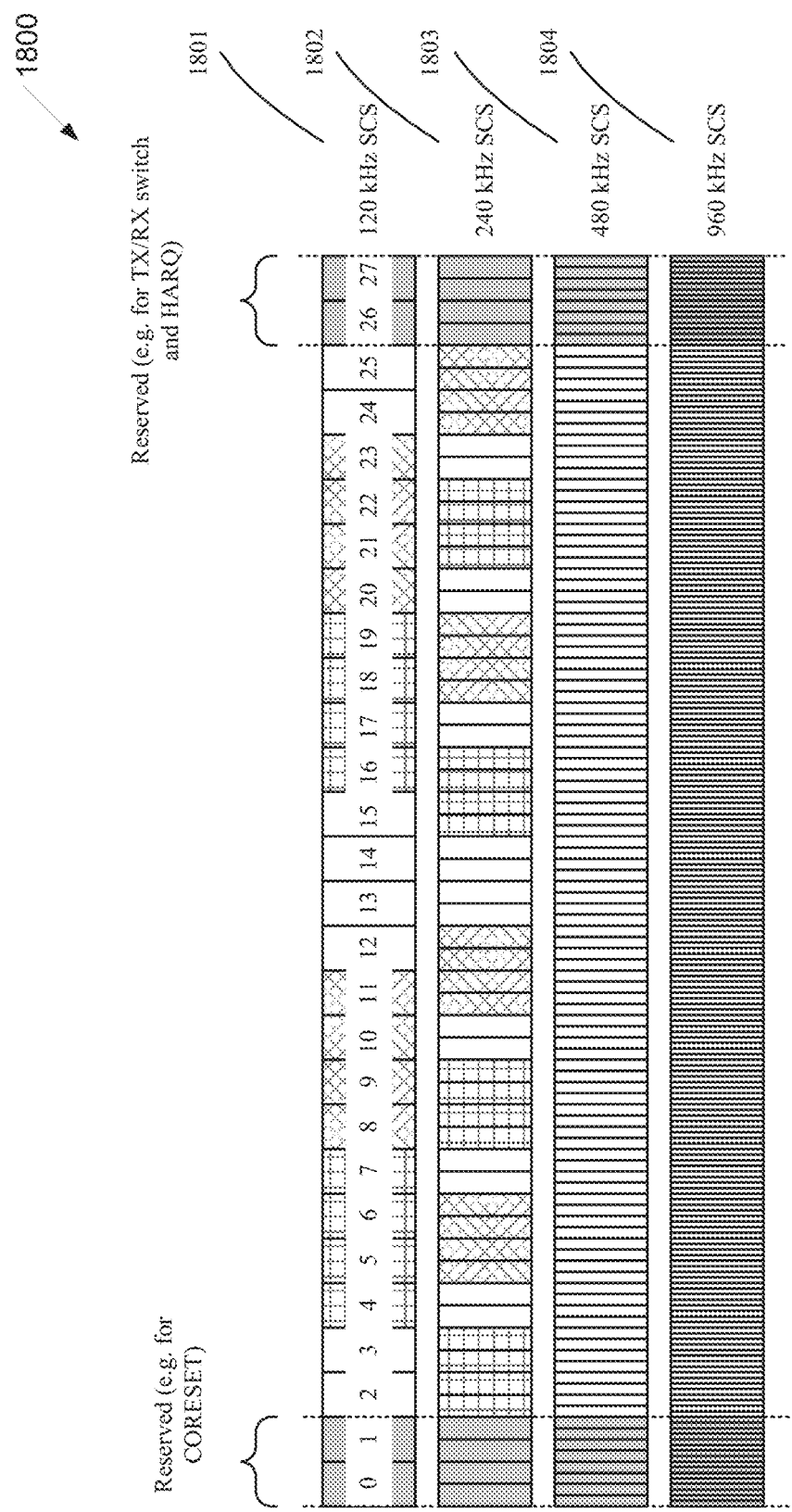
FIG. 18 illustrates yet another example SS/PBCH block patterns according to embodiments of the present disclosure.

Example corresponding to this example is shown in TABLE 3, and illustration of this example is shown in FIG. 18. 1802 in FIG. 18 corresponds to the example with $N_{gap}^{\mu}=2$, which is Example 3 in TABLE 3.

TABLE 3

Example SS/PBCH block pattern.

| Example Index | $S_{start}$ | $S_1$ | $S_2$ | $N_{symb}^{slot}$ | K | $N_{gap}^{\mu}$ | SCS for SSB |
|---|---|---|---|---|---|---|---|
| #1 | {8, 13, 18, 23, 32, 37, 42, 47} | 8 | 51 | 14 | 4 | 1 | 240 kHz |
| #2 | {5, 10, 15, 20, 29, 34, 39, 44} | 5 | 48 | 14 | 4 | 1 | 240 kHz |
| #3 | {4, 10, 16, 22, 30, 36, 42, 48} | 4 | 52 | 14 | 4 | 2 | 240 kHz |
| #4 | {4, 10, 16, 22, 28, 34, 40, 46} | 4 | 50 | 14 | 4 | 2 | 240 kHz |
| #5 | {6, 12, 18, 24, 30, 36, 42, 48} | 6 | 52 | 14 | 4 | 2 | 240 kHz |
| #6 | {8, 14, 20, 26, 32, 38, 44, 50, 58, 64, 70, 76, 82, 88, 94, 100} | 8 | 104 | 14 | 8 | 2 | 480 kHz |

TABLE 3-continued

Example SS/PBCH block pattern.

| Example Index | $S_{start}$ | $S_1$ | $S_2$ | $N_{symb}^{slot}$ | K | $N_{gap}^{\mu}$ | SCS for SSB |
|---|---|---|---|---|---|---|---|
| #7 | {8, 14, 20, 26, 32, 38, 44, 50, 56, 62, 68, 74, 80, 86, 92, 98} | 8 | 102 | 14 | 8 | 2 | 480 kHz |
| #8 | {10, 16, 22, 28, 34, 40, 46, 52, 58, 64, 70, 76, 82, 88, 94, 100} | 10 | 104 | 14 | 8 | 2 | 480 kHz |
| #9 | {16, 22, 28, 34, 40, 46, 52, 58, 64, 70, 76, 82, 88, 94, 100, 106, 114, 120, 126, 132, 138, 144, 150, 156, 162, 168, 174, 180, 186, 192, 198, 204} | 16 | 208 | 14 | 16 | 2 | 960 kHz |
| #10 | {16, 22, 28, 34, 40, 46, 52, 58, 64, 70, 76, 82, 88, 94, 100, 106, 112, 118, 124, 130, 136, 142, 148, 154, 160, 166, 172, 178, 184, 190, 196, 202} | 16 | 206 | 14 | 16 | 2 | 960 kHz |
| #11 | {18, 24, 30, 36, 42, 48, 54, 60, 66, 72, 78, 84, 90, 96, 102, 108, 114, 120, 126, 132, 138, 144, 150, 156, 162, 168, 174, 180, 186, 192, 198, 204} | 18 | 208 | 14 | 16 | 2 | 960 kHz |
| #12 | {4, 9, 14, 19, 32, 37, 42, 47} | 4 | 51 | 14 | 4 | 1 | 240 kHz |
| #13 | {4, 9, 14, 19, 33, 38, 43, 48} | 4 | 52 | 14 | 4 | 1 | 240 kHz |
| #14 | {5, 10, 15, 20, 32, 37, 42, 47} | 5 | 51 | 14 | 4 | 1 | 240 kHz |
| #15 | {5, 10, 15, 20, 33, 38, 43, 48} | 5 | 52 | 14 | 4 | 1 | 240 kHz |
| #16 | {8, 13, 18, 23, 28, 33, 38, 43, 64, 69, 74, 79, 84, 89, 94, 99} | 8 | 103 | 14 | 8 | 1 | 480 kHz |
| #17 | {8, 13, 18, 23, 28, 33, 38, 43, 65, 70, 75, 80, 85, 90, 95, 100} | 8 | 104 | 14 | 8 | 1 | 480 kHz |
| #18 | {9, 14, 19, 24, 29, 34, 39, 44, 64, 69, 74, 79, 84, 89, 94, 99} | 9 | 103 | 14 | 8 | 1 | 480 kHz |
| #19 | {9, 14, 19, 24, 29, 34, 39, 44, 65, 70, 75, 80, 85, 90, 95, 100} | 9 | 104 | 14 | 8 | 1 | 480 kHz |
| #20 | {16, 21, 26, 31, 36, 41, 46, 51, 56, 61, 66, 71, 76, 81, 86, 91, 128, 133, 138, 143, 148, 153, 158, 163, 168, 173, 178, 183, 188, 193, 198, 203} | 16 | 207 | 14 | 16 | 1 | 960 kHz |
| #21 | {16, 21, 26, 31, 36, 41, 46, 51, 56, 61, 66, 71, 76, 81, 86, 91, 129, 134, 139, 144, 149, 154, 159, 164, 169, 174, 179, 184, 189, 194, 199, 204} | 16 | 208 | 14 | 16 | 1 | 960 kHz |
| #22 | {17, 22, 27, 32, 37, 42, 47, 52, 57, 62, 67, 72, 77, 82, 87, 92, 128, 133, 138, 143, 148, 153, 158, 163, 168, 173, 178, 183, 188, 193, 198, 203} | 17 | 207 | 14 | 16 | 1 | 960 kHz |
| #23 | {17, 22, 27, 32, 37, 42, 47, 52, 57, 62, 67, 72, 77, 82, 87, 92, 129, 134, 139, 144, 149, 154, 159, 164, 169, 174, 179, 184, 189, 194, 199, 204} | 17 | 208 | 14 | 16 | 1 | 960 kHz |

FIG. 18 illustrates yet another example SS/PBCH block patterns 1800 according to embodiments of the present disclosure. An embodiment of the SS/PBCH block patterns 1800 shown in FIG. 18 is for illustration only. In another embodiment, the interval between neighboring SS/PBCH blocks may not be uniform (e.g., $N_{gap}^{\mu}$ can be different for a given pattern), and the first one or first two symbols of a slot are reserved for CORESET.

In one example, for SCS of SS/PBCH block as 240 kHz, the SS/PBCH block pattern can be given by {4, 8, 16, 20, 32, 36, 44, 48}+14·4·n or equivalently {4, 8, 16, 20}+14·2·n. In another example, for SCS of SS/PBCH block as 240 kHz, the SS/PBCH block pattern can be given by {4, 9, 15, 20, 32, 37, 43, 48}+14·4·n or equivalently {4, 9, 15, 20}+14·2·n. In yet another example, for SCS of SS/PBCH block as 480 kHz, the SS/PBCH block pattern can be given by {8, 12, 16, 20, 32, 36, 40, 44, 64, 68, 72, 76, 88, 92, 96, 100}+14·8·n or equivalently {8, 12, 16, 20, 32, 36, 40, 44}+14·4·n. In yet another example, for SCS of SS/PBCH block as 480 kHz, the SS/PBCH block pattern can be given by {8, 13, 18, 23, 29, 34, 39, 44, 64, 69, 74, 79, 85, 90, 95, 100}+14·8·n or equivalently {8, 13, 18, 23, 29, 34, 39, 44}14·4·n.

In yet another example, for SCS of SS/PBCH block as 960 kHz, the SS/PBCH block pattern can be given by $$\left\{\begin{array}{c} 16, 20, 24, 28, 32, 36, 40, 44, \\ 64, 68, 72, 76, 80, 84, 88, 92 \\ 128, 132, 136, 140, 144, 148, 152, 156, 176, \\ 180, 184, 188, 192, 196, 200, 204 \end{array}\right\} + 14 \cdot 16 \cdot n$$

or equivalently {16, 20, 24, 28, 32, 36, 40, 44, 64, 68, 72, 76, 80, 84, 88, 92}+14·8·n.

In yet another example, for SCS of SS/PBCH block as 960 kHz, the SS/PBCH block pattern can be given by $$\left\{\begin{array}{c}16, 21, 26, 31, 36, 41, 46, 51,\\ 57, 62, 67, 72, 77, 82, 87, 92\\ 128, 133, 138, 143, 148, 153, 158, 163, 169,\\ 174, 179, 184, 189, 194, 199, 204\end{array}\right\} + 14 \cdot 16 \cdot n$$

or equivalently {16, 21, 26, 31, 36, 41, 46, 51, 57, 62, 67, 72, 77, 82, 87, 92}+14·8·n.

In one example, the first 2 symbols with respect to 240 kHz SCS, which is $2 \cdot 2^\mu$ symbols with respect to $240 \cdot 2^\mu$ kHz SCS, are reserved and not mapped for SS/PBCH blocks, and the 2 last symbols with respect to 240 kHz SCS, which is $2 \cdot 2^\mu$ symbols with respect to $240 \cdot 2^\mu$ kHz SCS, are reserved and not mapped for SS/PBCH blocks. There are $8 \cdot 2^\mu$ number of SS/PBCH blocks in the predefined time unit (e.g., 2 slots in 240 kHz SCS). If the gap between two neighboring SS/PBCH block is at least 1 symbol with respect to some SCS, symbols other than the reserved ones with respect to 240 kHz SCS can be utilized for the SS/PBCH block mapping. In this example, the SS/PBCH block pattern with respect to $240 \cdot 2^\mu$ kHz SCS can be expressed as follow, wherein $N_{gap}^\mu$ is the minimum number of symbol required for beam sweeping of SS/PBCH block with respect to $240 \cdot 2^\mu$ kHz SCS.

$S_{start}=\{S_1, S_1+(4+N_{gap}^\mu), \ldots, S_1+(4+N_{gap}^\mu)(4 \cdot 2^\mu-1), S_2-4-(4+N_{gap}^\mu)(4 \cdot 2^\mu-1), \ldots, S_2-4-(4+N_{gap}^\mu), S_2-4\}$, $N_{symb}^{slot}=14$, and $K=4 \cdot 2^\mu$.

where $S_1$ is the starting symbol of the first SS/PBCH block within the predefined time unit, and $S_2$ is the symbol after the last symbol of the last SS/PBCH block within the predefined time unit (i.e., equivalently $S_2-4$ is the starting symbol of the last SS/PBCH block).

Figure 19:
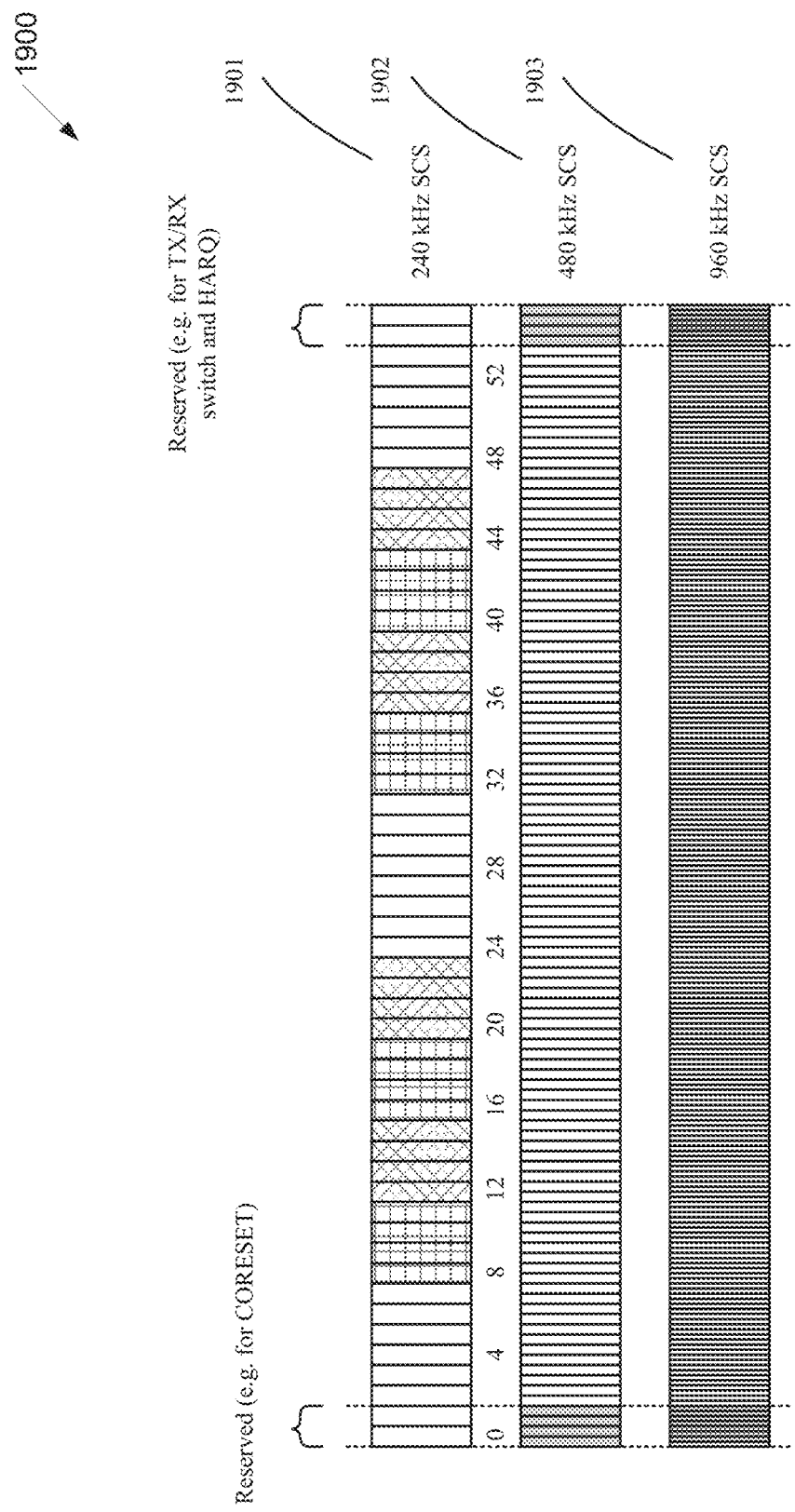
FIG. 19 illustrates yet another example SS/PBCH block patterns according to embodiments of the present disclosure.

Example corresponding to this example is shown in TABLE 4, and illustration of this example is shown in FIG. 19.

TABLE 4

Example SS/PBCH block pattern.

| Example Index | $S_{start}$ | $S_1$ | $S_2$ | $N_{symb}^{slot}$ | K | $N_{gap}^\mu$ | SCS for SSB |
|---|---|---|---|---|---|---|---|
| #1 | {4, 10, 16, 22, 28, 34, 40, 46, 62, 68, 74, 80, 86, 92, 98, 104} | 4 | 108 | 14 | 8 | 2 | 480 kHz |
| #2 | {8, 14, 20, 26, 32, 38, 44, 50, 56, 62, 68, 74, 80, 86, 92, 98, 122, 128, 134, 140, 146, 152, 158, 164, 170, 176, 182, 188, 194, 200, 206, 212} | 8 | 216 | 14 | 16 | 2 | 960 kHz |

FIG. 19 illustrates yet another example SS/PBCH block patterns 1900 according to embodiments of the present disclosure. An embodiment of the SS/PBCH block patterns 1900 shown in FIG. 19 is for illustration only. In one embodiment, the first 2 symbols with respect to 120 kHz SCS, which is $2 \cdot 2^\mu$ symbols with respect to $120 \cdot 2^\mu$ kHz SCS, are reserved and not mapped for SS/PBCH blocks, and the 2 last symbols with respect to 120 kHz SCS, which is $2 \cdot 2^\mu$ symbols with respect to $120 \cdot 2^\mu$ kHz SCS, are reserved and not mapped for SS/PBCH blocks. There are $2 \cdot 2^\mu$ number of SS/PBCH blocks in the predefined time unit (e.g., 1 slot in 120 kHz SCS).

In one example, the first SS/PBCH block within the predefined time unit starts from symbol #2 with respect to 120 kHz SCS, which is symbol #2·2$^\mu$ with respect to 120·2$^\mu$ kHz SCS. The last SS/PBCH block within the predefined time unit starts at symbol #12·2$^\mu$−4 with respect to 120·2$^\mu$ kHz SCS. If the gap between two neighboring SS/PBCH block is at least 1 symbol with respect to some SCS, symbols #6 to #7 with respect to 120 kHz SCS can be utilized for the SS/PBCH block mapping. For instance, the SS/PBCH block in the first half can be shifted to later symbols, and SS/PBCH block in the second half can be shifted to the earlier symbols. In this example, the SS/PBCH block pattern with respect to 120·2$^\mu$ kHz SCS can be expressed as follow, wherein $N_{gap}^\mu$ is the minimum number of symbol required for beam sweeping of SS/PBCH block with respect to 120·2$^\mu$ kHz SCS.

$S_{start}=\{2 \cdot 2^\mu, 2 \cdot 2^\mu+(4+N_{gap}^\mu), \ldots, 2 \cdot 2^\mu+(4+N_{gap}^\mu)(2^\mu-1), 12 \cdot 2^\mu-4-(4+N_{gap}^\mu)(2^\mu-1), \ldots, 12 \cdot 2^\mu-4-(4+N_{gap}^\mu), 12 \cdot 2^\mu-4\}$, $N_{symb}^{slot}=14$, and $K=2^\mu$.

Figure 20:
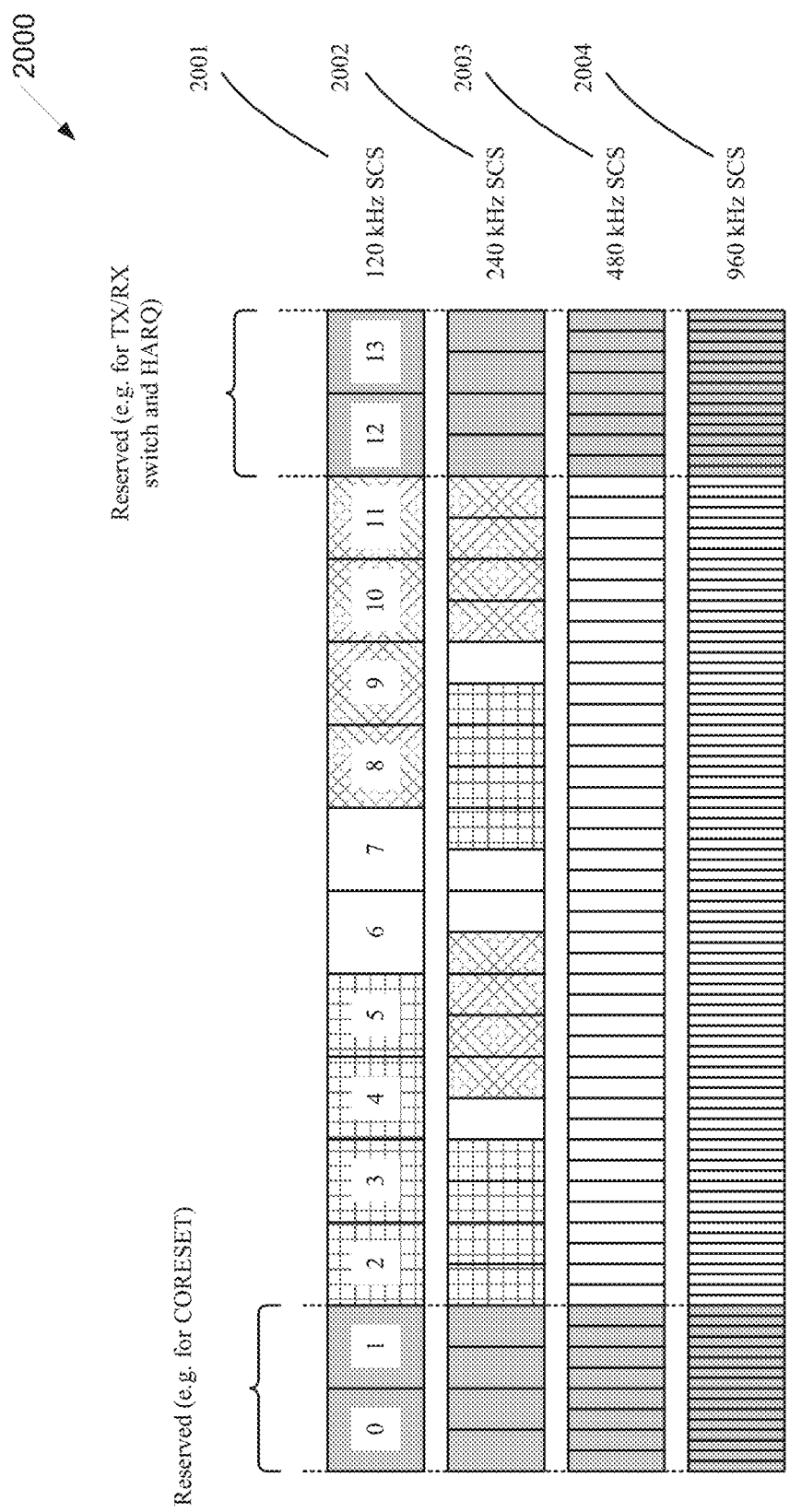
FIG. 20 illustrates yet another example SS/PBCH block patterns according to embodiments of the present disclosure.

Example corresponding to this example is shown in TABLE 5A, and illustration of this example is shown in FIG. 20. 2002 in FIG. 20 corresponds to the example with $N_{gap}^\mu=1$, which is Example 2 in TABLE 5A.

TABLE 5A

Example SS/PBCH block pattern

| Example Index | $S_{start}$ | $N_{symb}^{slot}$ | K | $N_{gap}^\mu$ | SCS for SSB |
|---|---|---|---|---|---|
| #0 | {2, 8} | 14 | 1 | 0 | 120 kHz |
| #1 | {4, 8, 16, 20} | 14 | 2 | 0 | 240 kHz |
| #2 | {4, 9, 15, 20} | 14 | 2 | 1 | 240 kHz |
| #3 | {8, 12, 16, 20, 32, 36, 40, 44} | 14 | 4 | 0 | 480 kHz |
| #4 | {8, 13, 18, 23, 29, 34, 39, 44} | 14 | 4 | 1 | 480 kHz |
| #5 | {16, 20, 24, 28, 32, 36, 40, 44, 64, 68, 72, 76, 80, 84, 88, 92} | 14 | 8 | 0 | 960 kHz |
| #6 | {16, 21, 26, 31, 36, 41, 46, 51, 57, 62, 67, 72, 77, 82, 87, 92} | 14 | 8 | 1 | 960 kHz |

FIG. 20 illustrates yet another example SS/PBCH block patterns 2000 according to embodiments of the present disclosure. An embodiment of the SS/PBCH block patterns 2000 shown in FIG. 20 is for illustration only. In another example, the first SS/PBCH block within the predefined time unit starts from symbol #2 with respect to 120 kHz SCS, which is symbol #2·2$^\mu$ with respect to 120·2$^\mu$ kHz SCS. If the gap between two neighboring SS/PBCH block is at least 1 symbol with respect to some SCS, symbols #6 to #7 with respect to 120 kHz SCS can be utilized for the SS/PBCH block mapping. For instance, the SS/PBCH block in the first half can be shifted to later symbols, and SS/PBCH block in the second half can be shifted to the earlier symbols. In this example, the SS/PBCH block pattern with respect to 120·2$^\mu$ kHz SCS can be expressed as follow, wherein N$_{gap}{}^\mu$ is the minimum number of symbol required for beam sweeping of SS/PBCH block with respect to 120·2$^\mu$ kHz SCS.

$$S_{start}=\{2\cdot 2^\mu, 2\cdot 2^\mu+(4+N_{gap}{}^\mu), \ldots, 2\cdot 2^\mu+(4+N_{gap}{}^\mu)(2\cdot 2^\mu-1)\}, N_{symb}{}^{slot}=14, \text{ and } K=2^\mu.$$

Example corresponding to this example is shown in TABLE 5B.

TABLE 5B

Example SS/PBCH block pattern.

| Example Index | S$_{start}$ | N$_{symb}{}^{slot}$ | K | N$_{gap}{}^\mu$ | SCS for SSB |
|---|---|---|---|---|---|
| #1 | {4, 9, 14, 19} | 14 | 2 | 1 | 240 kHz |
| #2 | {8, 13, 18, 23, 28, 33, 38, 43} | 14 | 4 | 1 | 480 kHz |
| #3 | {16, 21, 26, 31, 36, 41, 46, 51, 56, 61, 66, 71, 76, 81, 86, 91} | 14 | 8 | 1 | 960 kHz |

In another example, the first 2 symbols with respect to 120 kHz SCS, which is 2·2$^\mu$ symbols with respect to 120·2$^\mu$ kHz SCS, are reserved and not mapped for SS/PBCH blocks, and the 1 last symbol with respect to 120 kHz SCS, which is 2$^\mu$ symbols with respect to 120·2$^\mu$ kHz SCS, are reserved and not mapped for SS/PBCH blocks. There are 2·2$^\mu$ number of SS/PBCH blocks in the predefined time unit (e.g., 1 slot in 120 kHz SCS).

In one embodiment, the first SS/PBCH block within the predefined time unit starts from symbol #2 with respect to 120 kHz SCS, which is symbol #2·2$^\mu$ with respect to 120·2$^\mu$ kHz SCS. The last SS/PBCH block within the predefined time unit starts at symbol #S$_2$−4 with respect to 120·2$^\mu$ kHz SCS. If the gap between two neighboring SS/PBCH block is at least 1 symbol with respect to some SCS, symbols #6 to #8 with respect to 120 kHz SCS can be utilized for the SS/PBCH block mapping. For instance, the SS/PBCH block in the first half can be shifted to later symbols, and SS/PBCH block in the second half can be shifted to the earlier symbols. In this example, the SS/PBCH block pattern with respect to 120·2$^\mu$ kHz SCS can be expressed as follow, wherein N$_{gap}{}^\mu$ is the minimum number of symbol required for beam sweeping of SS/PBCH block with respect to 120·2$^\mu$ kHz SCS.

$$S_{start}=\{2\cdot 2^\mu, 2\cdot 2^\mu+(4+N_{gap}{}^\mu), \ldots, 2\cdot 2^\mu+(4+N_{gap}{}^\mu)(2^\mu-1), S_2-4-(4+N_{gap}{}^\mu)(2^\mu-1), \ldots, S_2-4-(4+N_{gap}{}^\mu), S_2-4\}, N_{symb}{}^{slot}=14, \text{ and } K=2^\mu.$$

Figures 21, 22:
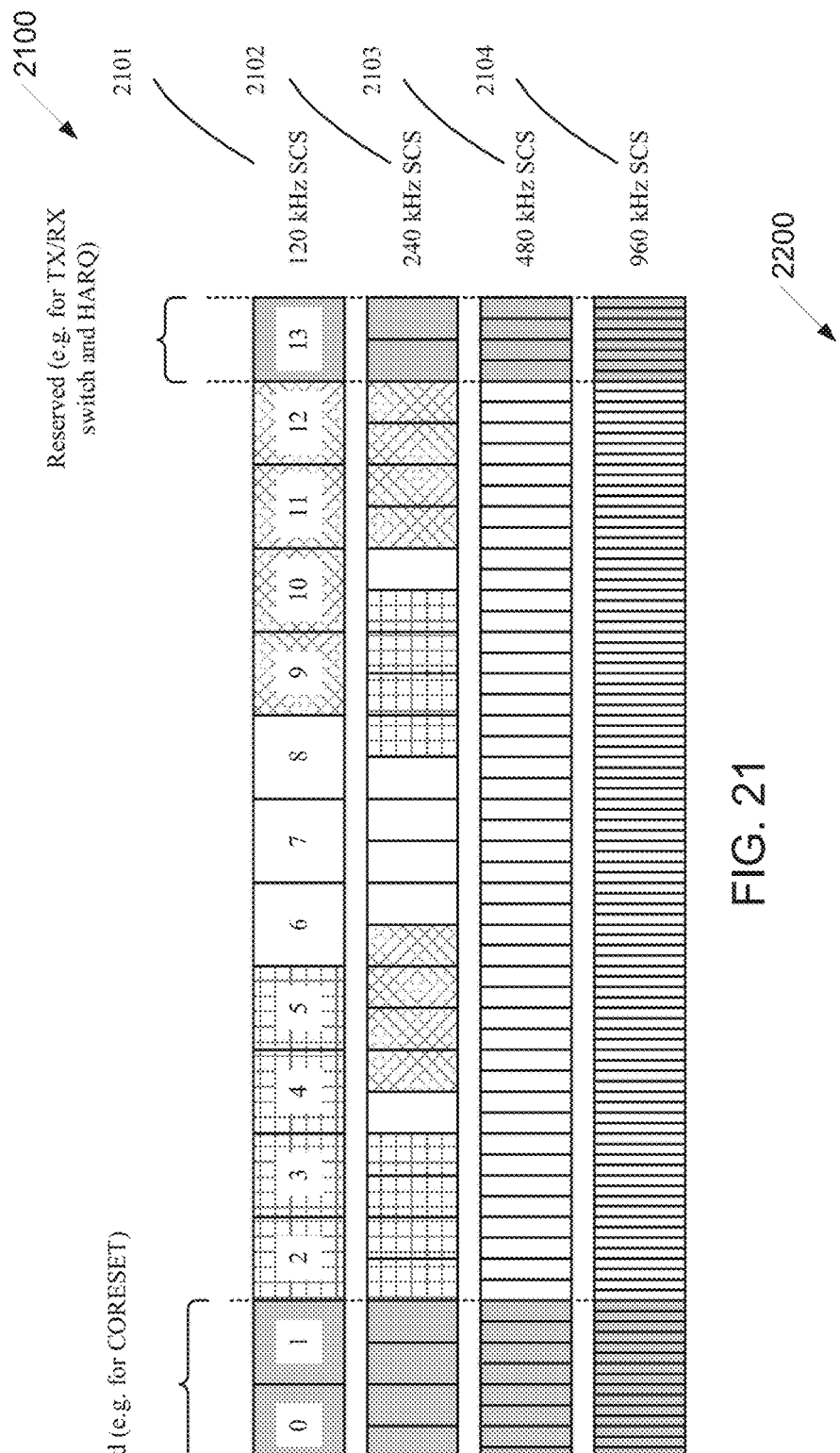
FIG. 21 illustrates yet another example SS/PBCH block patterns according to embodiments of the present disclosure.
FIG. 22 illustrates an example predefined time unit within the predefined time period according to embodiments of the present disclosure.

Example corresponding to this example is shown in TABLE 6, and illustration of this example is shown in FIG. 21. 2102 in FIG. 21 corresponds to the example with N$_{gap}{}^\mu$1, which is Example 2 in TABLE 6.

TABLE 6

Example SS/PBCH block pattern.

| Example Index | S$_{start}$ | N$_{symb}{}^{slot}$ | S$_2$ | K | N$_{gap}{}^\mu$ | SCS for SSB |
|---|---|---|---|---|---|---|
| #0 | {2, 9} | 14 | 13 | 1 | 0 | 120 kHz |
| #1 | {4, 8, 18, 22} | 14 | 26 | 2 | 0 | 240 kHz |
| #2 | {4, 9, 17, 22} | 14 | 26 | 2 | 1 | 240 kHz |
| #3 | {4, 9, 14, 19} | 14 | 25 | 2 | 1 | 240 kHz |
| #4 | {8, 12, 16, 20, 36, 40, 44, 48} | 14 | 52 | 4 | 0 | 480 kHz |
| #5 | {8, 13, 18, 23, 33, 38, 43, 48} | 14 | 52 | 4 | 1 | 480 kHz |
| #6 | {8, 13, 18, 23, 32, 37, 42, 47} | 14 | 51 | 4 | 1 | 480 kHz |
| #7 | {16, 20, 24, 28, 32, 36, 40, 44, 72, 76, 80, 84, 88, 92, 96, 100} | 14 | 104 | 8 | 0 | 960 kHz |
| #8 | {16, 21, 26, 31, 36, 41, 46, 51, 65, 70, 75, 80, 85, 90, 95, 100} | 14 | 104 | 8 | 1 | 960 kHz |
| #9 | {16, 21, 26, 31, 36, 41, 46, 51, 64, 69, 74, 79, 84, 89, 94, 99} | 14 | 103 | 8 | 1 | 960 kHz |

FIG. 21 illustrates yet another example SS/PBCH block patterns 2100 according to embodiments of the present disclosure. An embodiment of the SS/PBCH block patterns 2100 shown in FIG. 21 is for illustration only. In one example, the first 2 symbols with respect to 240 kHz SCS, which is 2·2$^\mu$ symbols with respect to 240·2$^\mu$ kHz SCS, are reserved and not mapped for SS/PBCH blocks, and the 2 last symbols with respect to 240 kHz SCS, which is 2·2$^\mu$ symbols with respect to 240·2$^\mu$ kHz SCS, are reserved and not mapped for SS/PBCH blocks. There are 2·2$^\mu$ number of SS/PBCH blocks in the predefined time unit (e.g., 1 slot in 240 kHz SCS).

Example corresponding to this example is shown in TABLE 7A and TABLE 7B.

TABLE 7A

Example SS/PBCH block pattern.

| Example Index | S$_{start}$ | N$_{symb}{}^{slot}$ | K | N$_{gap}{}^\mu$ | SCS for SSB |
|---|---|---|---|---|---|
| #0 | {2, 8} | 14 | 1 | 0 | 240 kHz |
| #1 | {4, 8, 16, 20} | 14 | 2 | 0 | 480 kHz |
| #2 | {4, 9, 15, 20} | 14 | 2 | 1 | 480 kHz |
| #3 | {4, 9, 14, 19} | 14 | 2 | 1 | 480 kHz |
| #4 | {8, 12, 16, 20, 32, 36, 40, 44} | 14 | 4 | 0 | 960 kHz |
| #5 | {8, 13, 18, 23, 29, 34, 39, 44} | 14 | 4 | 1 | 960 kHz |
| #6 | {8, 13, 18, 23, 28, 33, 38, 43} | 14 | 4 | 1 | 960 kHz |

TABLE 7B

Example SS/PBCH block pattern.

| Example Index | S$_{start}$ | N$_{symb}{}^{slot}$ | K | N$_{gap}{}^\mu$ | SCS for SSB |
|---|---|---|---|---|---|
| #0 | {2, 9} | 14 | 1 | 0 | 240 kHz |
| #1 | {4, 8, 18, 22} | 14 | 2 | 0 | 480 kHz |
| #2 | {4, 9, 17, 22} | 14 | 2 | 1 | 480 kHz |
| #3 | {4, 9, 16, 21} | 14 | 2 | 1 | 480 kHz |
| #4 | {8, 12, 16, 20, 36, 40, 44, 48} | 14 | 4 | 0 | 960 kHz |
| #5 | {8, 13, 18, 23, 33, 38, 43, 48} | 14 | 4 | 1 | 960 kHz |
| #6 | {8, 13, 18, 23, 32, 37, 42, 47} | 14 | 4 | 1 | 960 kHz |

In one embodiment, the first 2 symbols with respect to 480 kHz SCS, which is 2·2$^\mu$ symbols with respect to 480·2$^\mu$ kHz SCS, are reserved and not mapped for SS/PBCH blocks. There are $2 \cdot 2^\mu$ number of SS/PBCH blocks in the predefined time unit (e.g., 1 slot in 480 kHz SCS).

Example corresponding to this example is shown in TABLE 8A and TABLE 8B.

TABLE 8A

Example SS/PBCH block pattern.

| Example Index | $S_{start}$ | $N_{symb}^{slot}$ | K | $N_{gap}^\mu$ | SCS for SSB |
|---|---|---|---|---|---|
| #0 | {2, 8} | 14 | 1 | 2 | 480 kHz |
| #1 | {4, 8, 16, 20} | 14 | 2 | 0 | 960 kHz |
| #2 | {4, 9, 15, 20} | 14 | 2 | 1 | 960 kHz |
| #3 | {3, 8, 15, 20} | 14 | 2 | 1 | 960 kHz |
| #4 | {4, 9, 16, 21} | 14 | 2 | 1 | 960 kHz |
| #5 | {3, 8, 16, 21} | 14 | 2 | 1 | 960 kHz |
| #6 | {4, 10, 16, 22} | 14 | 2 | 2 | 960 kHz |

TABLE 8B

Example SS/PBCH block pattern.

| Example Index | $S_{start}$ | $N_{symb}^{slot}$ | K | $N_{gap}^\mu$ | SCS for SSB |
|---|---|---|---|---|---|
| #0 | {2, 9} | 14 | 1 | 3 | 480 kHz |
| #1 | {4, 8} | 14 | 1 | 0 | 960 kHz |
| #2 | {4, 9, 17, 22} | 14 | 2 | 1 | 960 kHz |
| #3 | {4, 9, 16, 21} | 14 | 2 | 1 | 960 kHz |
| #4 | {4, 9} | 14 | 1 | 1 | 960 kHz |
| #5 | {3, 8} | 14 | 1 | 1 | 960 kHz |
| #6 | {3, 8, 16, 21} | 14 | 2 | 1 | 960 kHz |

In one embodiment, the SS/PBCH block pattern can be enhanced in the design of predefined time unit within the predefined time period, e.g., including the design of $S_{index}$. One illustration of the predefined time unit within the predefined time period is shown in FIG. 22, wherein the predefined time units containing candidate SS/PBCH block are marked in shade, and their corresponding indexes n consist of set $S_{index}$. The examples and embodiments of the present disclosure can be combined with the design of $S_{start}$ and K, as described in the other embodiment of this disclosure.

FIG. 22 illustrates an example predefined time unit within the predefined time period 2200 according to embodiments of the present disclosure. An embodiment of the predefined time unit within the predefined time period 2200 shown in FIG. 22 is for illustration only. In NR Rel-15 and Rel-16, the predefined time period for SS/PBCH block pattern is a half frame. For NR operated from 52.6 GHz to 71 GHz, there can be a need to extend the predefined time period such that more candidate SS/PBCH blocks can be included.

In one embodiment, the predefined time period containing SS/PBCH block can be extended to be more than a half frame. For one example, for operation with shared spectrum channel access, the predefined time period containing SS/PBCH block can be extended to a frame. For another example, for operation with shared spectrum channel access, the predefined time period containing SS/PBCH block can be extended to two frames.

In one embodiment, SS/PBCH blocks can be transmitted in a carrier frequency range, wherein the carrier frequency range can correspond to either of the operation with or without shared spectrum channel access. For example, in one geography area, the carrier frequency range can correspond to the operation with shared spectrum channel access, but for another geography area, the carrier frequency range can correspond to the operation without shared spectrum channel access.

In one example, for a given numerology, the SS/PBCH block pattern in time domain (e.g., including the SS/PBCH mapping pattern in time domain with a predefined time unit and the occasions of the time units within a predefined time duration) can be the same for operation with and without shared spectrum channel access. In this example, $S_{index}$ is the same for operation with and without shared spectrum channel access.

In one example, the maximum number $L_{max}$ of candidate SS/PBCH blocks within a predefined time period can be the same for operation with and without shared spectrum channel access. For this aspect, slots within the predefined time period that contains candidate SS/PBCH blocks are also the same for operation with and without shared spectrum channel access.

For one example, for the higher carrier frequency range considered in this disclosure, $L_{max}=64$ for both operation with and without shared spectrum channel access.

In another example, for a given numerology, the SS/PBCH mapping pattern in time domain with a predefined time unit can be the same for operation with and without shared spectrum channel access, but the maximum number of candidate SS/PBCH blocks within a predefined time period can be the different for operation with and without shared spectrum channel access. In this example, $S_{index}$ is the different for operation with and without shared spectrum channel access.

For example, the maximum number of candidate SS/PBCH blocks within a predefined time period for operation with shared spectrum channel access is larger than the maximum number of candidate SS/PBCH blocks within a predefined time period for operation without shared spectrum channel access, in order to allow more transmission opportunities to accommodate shared spectrum channel access. For this aspect, the slots within the predefined time period that contains candidate SS/PBCH blocks for operation without shared spectrum channel access are a subset of the slots within the predefined time period that contains candidate SS/PBCH blocks for operation with shared spectrum channel access, and the SS/PBCH block pattern in time domain (e.g., in a slot or several consecutive slots) maintains the same for operation with and without shared spectrum channel access. For example, $S_{index}$ for operation without shared spectrum channel access is a subset of $S_{index}$ for operation with shared spectrum channel access.

In one example, for the higher carrier frequency range considered in this disclosure, $L_{max}=64$ for operation without shared spectrum channel access, and $L_{max}=64*2=128$ for operation with shared spectrum channel access.

In another example, for the higher carrier frequency range considered in this disclosure, $L_{max}=64$ for operation without shared spectrum channel access, and $L_{max}=64*4=256$ for operation with shared spectrum channel access.

In yet another example, for the higher carrier frequency range considered in this disclosure, $L_{max}=64$ for operation without shared spectrum channel access, and $L_{max}=64*1.25=80$ for operation with shared spectrum channel access.

In yet another example, for the higher carrier frequency range considered in this disclosure, $L_{max}=64$ for operation without shared spectrum channel access, and $L_{max}=64*2.5=160$ for operation with shared spectrum channel access.

In yet another example, for the higher carrier frequency range considered in this disclosure, $L_{max}$=64 for operation without shared spectrum channel access, and $L_{max}$=64*5=320 for operation with shared spectrum channel access.

In yet another example, for the higher carrier frequency range considered in this disclosure, $L_{max}$=64 for operation without shared spectrum channel access, and $L_{max}$=64*2*$2^\mu$ for one supported SCS and operation with shared spectrum channel access, wherein the SCS corresponds to 120*$2^\mu$ kHz SCS.

In yet another example, for the higher carrier frequency range considered in this disclosure, $L_{max}$=64 for operation without shared spectrum channel access, and $L_{max}$=64*4*$2^\mu$ for one supported SCS and operation with shared spectrum channel access, wherein the SCS corresponds to 120*$2^\mu$ kHz SCS.

In yet another example, for the higher carrier frequency range considered in this disclosure, $L_{max}$=64 for operation without shared spectrum channel access, and $L_{max}$=64*1.25*$2^\mu$ for one supported SCS and operation with shared spectrum channel access, wherein the SCS corresponds to 120*$2^\mu$ kHz SCS.

In yet another example, for the higher carrier frequency range considered in this disclosure, $L_{max}$=64 for operation without shared spectrum channel access, and $L_{max}$=64*2.5*$2^\mu$ for one supported SCS and operation with shared spectrum channel access, wherein the SCS corresponds to 120*$2^\mu$ kHz SCS.

In yet another example, for a given numerology, the SS/PBCH block pattern in time domain can be the different for operation with and without shared spectrum channel access.

In one example, at least for one of the supported numerologies, one example SS/PBCH block pattern in time domain specified in this disclosure could be utilized for operation with shared spectrum channel access, and another different example SS/PBCH block pattern in time domain specified in this disclosure could be utilized for operation without shared spectrum channel access.

In one example, both of them can be supported for the higher frequency range. For example, for at least one of the supported numerologies, the SS/PBCH block pattern in time domain can be the same for operation with and without shared spectrum channel access; and for at least one of the supported numerologies, the SS/PBCH block pattern in time domain can be the different for operation with and without shared spectrum channel access.

In one embodiment, there is a latency requirement such that the spanning of SS/PBCH blocks in time domain cannot exceed X, where X is in the unit of the predefined time unit for SS/PBCH block pattern.

In one example, when the total duration of the candidate SS/PBCH blocks within the predefined time duration in the example of this disclosure, some candidate SS/PBCH block can be truncated to accommodate the service with low latency.

In one example, for the example in this disclosure with one candidate SS/PBCH block in the predefined time unit for SS/PBCH block pattern, the value of n may be restricted to the set as $S_{index}$={0, 1, . . . , X−1}+Y·m, wherein Y·X is the number of predefined time unit for SS/PBCH block pattern reserved for low latency service, and m=0, 1, . . . until the number of values of n achieves $L_{max}/|S_{start}|$, wherein $|S_{start}|$ is the number of candidate SS/PBCH block within a predefined time unit.

In one example, the low latency consideration for SS/PBCH block pattern can be applicable only to the operation without shared spectrum channel access.

At least one of the following examples can be utilized for the design of $S_{index}$ as described in the disclosure, wherein $S_{index}$ can be also referred to as $S_{index,1}$, or $S_{index,2}$ in the previous examples of this disclosure.

In one example, for a SS/PBCH block SCS of 120·$2^\mu$ kHz, denote the number of candidate SS/PBCH blocks in the predefined time unit as $|S_{start}|$, and the maximum number of candidate SS/PBCH block in the predefined time period as $L_{max}$, then $L_{max}/|S_{start}|$ number of predefined time units contains candidate SS/PBCH blocks.

In one example, the index of the predefined time unit can be consecutive. For one implementation, for SS/PBCH block SCS of 120·$2^\mu$ kHz, $L_{max}$, $|S_{start}|$ and the predefined time unit duration K are as described in the example of the embodiment of this disclosure, then $S_{index}$ can be consecutive given by $S_{index}$={0, 1, . . . , $L_{max}/|S_{start}|$−1}.

In one example, for SS/PBCH block SCS of 120·$2^\mu$ kHz, $|S_{start}|$=4·$2^\mu$, and predefined time unit is 2 slots with respect to 120 kHz SCS, then $S_{index}$={0, 1, . . . , $L_{max}/|S_{start}|$−1}.

In another example, for SS/PBCH block SCS of 120·$2^\mu$ kHz, $|S_{start}|$=2·$2^\mu$, and predefined time unit is 1 slot with respect to 120 kHz SCS, then $S_{index}$={0, 1, . . . , $L_{max}/|S_{start}|$−1}.

In yet another example, for SS/PBCH block SCS of 120·$2^\mu$ kHz, $|S_{start}|$=1·$2^\mu$, and predefined time unit is 1 slot with respect to 120 kHz SCS, then $S_{index}$={0, 1, . . . , $L_{max}/|S_{start}|$−1}.

In yet another example, for SS/PBCH block SCS of 120·$2^\mu$ kHz, $|S_{start}|$=4, and predefined time unit is 2 slots with respect to the SCS of SS/PBCH block, then $S_{index}$={0, 1, . . . , $L_{max}/|S_{start}|$−1}.

In yet another example, for SS/PBCH block SCS of 120·$2^\mu$ kHz, $|S_{start}|$=2, and predefined time unit is 1 slot with respect to the SCS of SS/PBCH block, then $S_{index}$={0, 1, . . . , $L_{max}/|S_{start}|$−1}.

In yet another example, for SS/PBCH block SCS of 120·$2^\mu$ kHz, $|S_{start}|$=1, and predefined time unit is 1 slot with respect to the SCS of SS/PBCH block, then $S_{index}$={0, 1, . . . , $L_{max}/|S_{start}|$−1}.

In another embodiment, the index of the predefined time unit can be non-consecutive. For one implementation, for SS/PBCH block SCS of 120·$2^\mu$ kHz, $L_{max}$, $|S_{start}|$ and the predefined time unit K are as described in the example of the embodiment of this disclosure, then $S_{index}$ can be non-consecutive given by $S_{index}$={0, 1, . . . , 8·$2^\mu$/K−1}+10·$2^\mu$/K·m, where m=0,1, . . . , $L_{max}$·K/($|S_{start}|$·8·$2^\mu$)−1.

In one example, for SS/PBCH block SCS of 120·$2^\mu$ kHz, $L_{max}$=64, $|S_{start}|$=4. $2^\mu$, predefined time period is 5 ms, and predefined time unit is 2 slots with respect to 120 kHz SCS, then $S_{index}$={0, 1, 2, 3}+5·m, wherein m=0, 1, . . . , 4/$2^\mu$−1.

In another example, for SS/PBCH block SCS of 120·$2^\mu$ kHz, $L_{max}$=64, $|S_{start}|$=2·$2^\mu$, predefined time period is 5 ms, and predefined time unit is 1 slot with respect to 120 kHz SCS, then $S_{index}$={0, 1, 2, 3, 4, 5, 6, 7}+10·m, wherein m=0, 1, . . . , 4/$2^\mu$−1.

In yet another example, for SS/PBCH block SCS of 120·$2^\mu$ kHz, $L_{max}$=64, $|S_{start}|$=1·$2^\mu$, predefined time period is 10 ms, and predefined time unit is 1 slot with respect to 120 kHz SCS, then $S_{index}$={0, 1, 2, 3, 4, 5, 6, 7}+10·m, wherein m=0, 1, . . . , 8/$2^\mu$−1.

For operation without shared spectrum sharing channel access, at least one of the examples in TABLE 9 and TABLE 10 can be supported.

TABLE 9

Example design of $S_{index}$ according to the disclosure.

| Example # | SSB SCS | $\overline{L}_{max}$ | $|S_{start}|$ | K | Predefined time period | $S_{index}$ |
|---|---|---|---|---|---|---|
| 1 | 120 kHz | 64 | 4 | 2 | Half frame | {0, 1, 2, 3, . . . , 15} |
| 2 | 120 kHz | 64 | 2 | 1 | Half frame | {0, 1, 2, 3, . . . , 31} |
| 3 | 120 kHz | 64 | 1 | 1 | One frame | {0, 1, 2, 3, . . . , 63} |
| 4 | 240 kHz | 64 | 8 | 4 | Half frame | {0, 1, 2, 3, . . . , 7} |
| 5 | 240 kHz | 64 | 4 | 2 | Half frame | {0, 1, 2, 3, . . . , 15} |
| 6 | 240 kHz | 64 | 2 | 1 | Half frame | {0, 1, 2, 3, . . . , 31} |
| 7 | 240 kHz | 64 | 1 | 1 | Half frame | {0, 1, 2, 3, . . . , 63} |
| 8 | 480 kHz | 64 | 16 | 8 | Half frame | {0, 1, 2, 3} |
| 9 | 480 kHz | 64 | 8 | 4 | Half frame | {0, 1, 2, 3, . . . , 7} |
| 10 | 480 kHz | 64 | 4 | 2 | Half frame | {0, 1, 2, 3, . . . , 15} |
| 11 | 480 kHz | 64 | 2 | 1 | Half frame | {0, 1, 2, 3, . . . , 31} |
| 12 | 480 kHz | 64 | 1 | 1 | Half frame | {0, 1, 2, 3, . . . , 63} |
| 13 | 960 kHz | 64 | 32 | 16 | Half frame | {0, 1} |
| 14 | 960 kHz | 64 | 16 | 8 | Half frame | {0, 1, 2, 3} |
| 15 | 960 kHz | 64 | 8 | 4 | Half frame | {0, 1, 2, 3, . . . , 7} |
| 16 | 960 kHz | 64 | 4 | 2 | Half frame | {0, 1, 2, 3, . . . , 15} |
| 17 | 960 kHz | 64 | 2 | 1 | Half frame | {0, 1, 2, 3, . . . , 31} |
| 18 | 960 kHz | 64 | 1 | 1 | Half frame | {0, 1, 2, 3, . . . , 63} |

TABLE 10

Example design of $S_{index}$ according to the disclosure.

| Example # | SSB SCS | $\overline{L}_{max}$ | $|S_{start}|$ | K | Predefined time period | $S_{index}$ |
|---|---|---|---|---|---|---|
| 1 | 120 kHz | 64 | 4 | 2 | Half frame | {0, 1, 2, 3} + 5 · m, m = 0, 1, 2, 3 |
| 2 | 120 kHz | 64 | 2 | 1 | Half frame | {0, 1, 2, . . . , 7} + 10 · m, m = 0, 1, 2, 3 |
| 3 | 120 kHz | 64 | 1 | 1 | One frame | {0, 1, 2, . . . , 7} + 10 · m, m = 0, 1, 2, . . . , 7 |
| 4 | 240 kHz | 64 | 8 | 4 | Half frame | {0, 1, 2, 3} + 5 · m, m = 0, 1 |
| 5 | 240 kHz | 64 | 4 | 2 | Half frame | {0, 1, 2, . . . , 7} + 10 · m, m = 0, 1 |
| 6 | 240 kHz | 64 | 2 | 1 | Half frame | {0, 1, 2, . . . , 15} + 20 · m, m = 0, 1 |
| 7 | 240 kHz | 64 | 1 | 1 | Half frame | {0, 1, 2, . . . , 15} + 20 · m, m = 0, 1, 2, 3 |
| 8 | 480 kHz | 64 | 1 | 1 | Half frame | {0, 1, 2, . . . , 31} + 40 · m, m = 0, 1 |

For operation with shared spectrum sharing channel access, at least one of the examples in TABLE 9 through TABLE 15 can be supported.

TABLE 11

Example design of $S_{index}$ according to the disclosure.

| Example # | SSB SCS | $\overline{L}_{max}$ | $|S_{start}|$ | K | Predefined time period | $S_{index}$ |
|---|---|---|---|---|---|---|
| 1 | 120 kHz | 80 | 4 | 2 | Half frame | {0, 1, 2, 3, . . . , 19} |
| 2 | 120 kHz | 80 | 2 | 1 | Half frame | {0, 1, 2, 3, . . . , 39} |
| 3 | 120 kHz | 80 | 1 | 1 | One frame | {0, 1, 2, 3, . . . , 79} |
| 4 | 240 kHz | 80 | 8 | 4 | Half frame | {0, 1, 2, 3, . . . , 9} |
| 5 | 240 kHz | 80 | 4 | 2 | Half frame | {0, 1, 2, 3, . . . , 19} |
| 6 | 240 kHz | 80 | 2 | 1 | Half frame | {0, 1, 2, 3, . . . , 39} |
| 7 | 240 kHz | 80 | 1 | 1 | Half frame | {0, 1, 2, 3, . . . , 79} |
| 8 | 480 kHz | 80 | 16 | 8 | Half frame | {0, 1, 2, 3, . . . , 4} |
| 9 | 480 kHz | 80 | 8 | 4 | Half frame | {0, 1, 2, 3, . . . , 9} |
| 10 | 480 kHz | 80 | 4 | 2 | Half frame | {0, 1, 2, 3, . . . , 19} |
| 11 | 480 kHz | 80 | 2 | 1 | Half frame | {0, 1, 2, 3, . . . , 39} |
| 12 | 480 kHz | 80 | 1 | 1 | Half frame | {0, 1, 2, 3, . . . , 79} |
| 13 | 960 kHz | 80 | 32 | 16 | Half frame | {0, 1, 2} |
| 14 | 960 kHz | 80 | 16 | 8 | Half frame | {0, 1, 2, 3, 4} |
| 15 | 960 kHz | 80 | 8 | 4 | Half frame | {0, 1, 2, 3, . . . , 9} |
| 16 | 960 kHz | 80 | 4 | 2 | Half frame | {0, 1, 2, 3, . . . , 19} |
| 17 | 960 kHz | 80 | 2 | 1 | Half frame | {0, 1, 2, 3, . . . , 39} |
| 18 | 960 kHz | 80 | 1 | 1 | Half frame | {0, 1, 2, 3, . . . , 79} |

TABLE 12

Example design of $S_{index}$ according to the disclosure.

| Example # | SSB SCS | $\overline{L}_{max}$ | $|S_{start}|$ | K | Predefined time period | $S_{index}$ |
|---|---|---|---|---|---|---|
| 1 | 120 kHz | 128 | 4 | 2 | One frame | $\{0, 1, 2, 3\} + 5 \cdot m, m = 0, 1, 2, \ldots, 7$ |
| 2 | 120 kHz | 128 | 2 | 1 | One frame | $\{0, 1, 2, \ldots, 7\} + 10 \cdot m, m = 0, 1, 2, \ldots, 7$ |
| 3 | 120 kHz | 128 | 1 | 1 | Two frames | $\{0, 1, 2, \ldots, 7\} + 10 \cdot m, m = 0, 1, 2, \ldots, 15$ |
| 4 | 240 kHz | 128 | 8 | 4 | Half frame | $\{0, 1, 2, 3\} + 5 \cdot m, m = 0, 1, 2, 3$ |
| 5 | 240 kHz | 128 | 4 | 2 | Half frame | $\{0, 1, 2, \ldots, 7\} + 10 \cdot m, m = 0, 1, 2, 3$ |
| 6 | 240 kHz | 128 | 2 | 1 | Half frame | $\{0, 1, 2, \ldots, 15\} + 20 \cdot m, m = 0, 1, 2, 3$ |
| 7 | 240 kHz | 128 | 1 | 1 | One frame | $\{0, 1, 2, \ldots, 15\} + 20 \cdot m, m = 0, 1, 2, \ldots, 7$ |
| 8 | 480 kHz | 128 | 16 | 8 | Half frame | $\{0, 1, 2, 3\} + 5 \cdot m, m = 0, 1$ |
| 9 | 480 kHz | 128 | 8 | 4 | Half frame | $\{0, 1, 2, \ldots, 7\} + 10 \cdot m, m = 0, 1$ |
| 10 | 480 kHz | 128 | 4 | 2 | Half frame | $\{0, 1, 2, \ldots, 15\} + 20 \cdot m, m = 0, 1$ |
| 11 | 480 kHz | 128 | 2 | 1 | Half frame | $\{0, 1, 2, \ldots, 31\} + 40 \cdot m, m = 0, 1$ |
| 12 | 480 kHz | 128 | 1 | 1 | Half frame | $\{0, 1, 2, \ldots, 31\} + 40 \cdot m, m = 0, 1, 2, 3$ |
| 13 | 960 kHz | 128 | 32 | 16 | Half frame | $\{0, 1, 2, 3\}$ |
| 14 | 960 kHz | 128 | 16 | 8 | Half frame | $\{0, 1, 2, \ldots, 7\}$ |
| 15 | 960 kHz | 128 | 8 | 4 | Half frame | $\{0, 1, 2, \ldots, 15\}$ |
| 16 | 960 kHz | 128 | 4 | 2 | Half frame | $\{0, 1, 2, \ldots, 31\}$ |
| 17 | 960 kHz | 128 | 2 | 1 | Half frame | $\{0, 1, 2, \ldots, 63\}$ |
| 18 | 960 kHz | 128 | 1 | 1 | Half frame | $\{0, 1, 2, \ldots, 63\} + 80 \cdot m, m = 0, 1$ |

TABLE 13

Example design of $S_{index}$ according to the disclosure.

| Example # | SSB SCS | $\overline{L}_{max}$ | $|S_{start}|$ | K | Predefined time period | $S_{index}$ |
|---|---|---|---|---|---|---|
| 1 | 120 kHz | 160 | 4 | 2 | One frame | $\{0, 1, 2, 3, \ldots, 39\}$ |
| 2 | 120 kHz | 160 | 2 | 1 | One frame | $\{0, 1, 2, 3, \ldots, 79\}$ |
| 3 | 120 kHz | 160 | 1 | 1 | Two frames | $\{0, 1, 2, 3, \ldots, 159\}$ |
| 4 | 240 kHz | 160 | 8 | 4 | Half frame | $\{0, 1, 2, 3, \ldots, 19\}$ |
| 5 | 240 kHz | 160 | 4 | 2 | Half frame | $\{0, 1, 2, 3, \ldots, 39\}$ |
| 6 | 240 kHz | 160 | 2 | 1 | Half frame | $\{0, 1, 2, 3, \ldots, 79\}$ |
| 7 | 240 kHz | 160 | 1 | 1 | One frame | $\{0, 1, 2, 3, \ldots, 159\}$ |
| 8 | 480 kHz | 160 | 16 | 8 | Half frame | $\{0, 1, 2, 3, \ldots, 9\}$ |
| 9 | 480 kHz | 160 | 8 | 4 | Half frame | $\{0, 1, 2, 3, \ldots, 19\}$ |
| 10 | 480 kHz | 160 | 4 | 2 | Half frame | $\{0, 1, 2, 3, \ldots, 39\}$ |
| 11 | 480 kHz | 160 | 2 | 1 | Half frame | $\{0, 1, 2, 3, \ldots, 79\}$ |
| 12 | 480 kHz | 160 | 1 | 1 | Half frame | $\{0, 1, 2, 3, \ldots, 159\}$ |
| 13 | 960 kHz | 160 | 32 | 16 | Half frame | $\{0, 1, 2, 3, 4\}$ |
| 14 | 960 kHz | 160 | 16 | 8 | Half frame | $\{0, 1, 2, 3, \ldots, 9\}$ |
| 15 | 960 kHz | 160 | 8 | 4 | Half frame | $\{0, 1, 2, 3, \ldots, 19\}$ |
| 16 | 960 kHz | 160 | 4 | 2 | Half frame | $\{0, 1, 2, 3, \ldots, 39\}$ |
| 17 | 960 kHz | 160 | 2 | 1 | Half frame | $\{0, 1, 2, 3, \ldots, 79\}$ |
| 18 | 960 kHz | 160 | 1 | 1 | Half frame | $\{0, 1, 2, 3, \ldots, 159\}$ |

TABLE 14

Example design of $S_{index}$ according to the disclosure.

| Example # | SSB SCS | $\overline{L}_{max}$ | $|S_{start}|$ | K | Predefined time period | $S_{index}$ |
|---|---|---|---|---|---|---|
| 1 | 120 kHz | 256 | 4 | 2 | Two frames | $\{0, 1, 2, 3\} + 5 \cdot m, m = 0, 1, 2, \ldots, 15$ |
| 2 | 120 kHz | 256 | 2 | 1 | Two frames | $\{0, 1, 2, \ldots, 7\} + 10 \cdot m, m = 0, 1, 2, \ldots, 15$ |
| 3 | 240 kHz | 256 | 8 | 4 | One frame | $\{0, 1, 2, 3\} + 5 \cdot m, m = 0, 1, 2, \ldots, 7$ |
| 4 | 240 kHz | 256 | 4 | 2 | One frame | $\{0, 1, 2, \ldots, 7\} + 10 \cdot m, m = 0, 1, 2, \ldots, 7$ |

TABLE 14-continued

Example design of $S_{index}$ according to the disclosure.

| Example # | SSB SCS | $L_{max}$ | $|S_{start}|$ | K | Predefined time period | $S_{index}$ |
|---|---|---|---|---|---|---|
| 5 | 240 kHz | 256 | 2 | 1 | One frame | {0, 1, 2, . . . , 15} + 20 · m, m = 0, 1, 2, . . . , 7 |
| 6 | 240 kHz | 256 | 1 | 1 | Two frames | {0, 1, 2, . . . , 15} + 20 · m, m = 0, 1, 2, . . . , 15 |
| 7 | 480 kHz | 256 | 16 | 8 | Half frame | {0, 1, 2, 3} + 5 · m, m = 0, 1, 2, 3 |
| 8 | 480 kHz | 256 | 8 | 4 | Half frame | {0, 1, 2, . . . , 7} + 10 · m, m = 0, 1, 2, 3 |
| 9 | 480 kHz | 256 | 4 | 2 | Half frame | {0, 1, 2, . . . , 15} + 20 · m, m = 0, 1, 2, 3 |
| 10 | 480 kHz | 256 | 2 | 1 | Half frame | {0, 1, 2, . . . , 31} + 40 · m, m = 0, 1, 2, 3 |
| 11 | 480 kHz | 256 | 1 | 1 | Half frame | {0, 1, 2, . . . , 31} + 40 · m, m = 0, 1, 2, . . . , 7 |
| 12 | 960 kHz | 256 | 32 | 16 | Half frame | {0, 1, 2, 3} + 5 · m, m = 0, 1 |
| 13 | 960 kHz | 256 | 16 | 8 | Half frame | {0, 1, 2, . . . , 7} + 10 · m, m = 0, 1 |
| 14 | 960 kHz | 256 | 8 | 4 | Half frame | {0, 1, 2, . . . , 15} + 20 · m, m = 0, 1 |
| 15 | 960 kHz | 256 | 4 | 2 | Half frame | {0, 1, 2, . . . , 31} + 40 · m, m = 0, 1 |
| 16 | 960 kHz | 256 | 2 | 1 | Half frame | {0, 1, 2, . . . , 63} + 80 · m, m = 0, 1 |
| 17 | 960 kHz | 256 | 1 | 1 | Half frame | {0, 1, 2, . . . , 63} + 80 · m, m = 0, 1, 2, 3 |

TABLE 15

Example design of $S_{index}$ according to the disclosure.

| Example # | SSB SCS | $L_{max}$ | $|S_{start}|$ | K | Predefined time period | $S_{index}$ |
|---|---|---|---|---|---|---|
| 1 | 120 kHz | 320 | 4 | 2 | Two frames | {0, 1, 2, 3, . . . , 79} |
| 2 | 120 kHz | 320 | 2 | 1 | Two frames | {0, 1, 2, 3, . . . , 159} |
| 3 | 240 kHz | 320 | 8 | 4 | One frame | {0, 1, 2, 3, . . . , 39} |
| 4 | 240 kHz | 320 | 4 | 2 | One frame | {0, 1, 2, 3, . . . , 79} |
| 5 | 240 kHz | 320 | 2 | 1 | One frame | {0, 1, 2, 3, . . . , 159} |
| 6 | 240 kHz | 320 | 1 | 1 | Two frames | {0, 1, 2, 3, . . . , 319} |
| 7 | 480 kHz | 320 | 16 | 8 | Half frame | {0, 1, 2, 3, . . . , 19} |
| 8 | 480 kHz | 160 | 8 | 4 | Half frame | {0, 1, 2, 3, . . . , 39} |
| 9 | 480 kHz | 320 | 4 | 2 | Half frame | {0, 1, 2, 3, . . . , 79} |
| 10 | 480 kHz | 320 | 2 | 1 | Half frame | {0, 1, 2, 3, . . . , 159} |
| 11 | 480 kHz | 320 | 1 | 1 | Half frame | {0, 1, 2, 3, . . . , 319} |
| 12 | 960 kHz | 320 | 32 | 16 | Half frame | {0, 1, 2, 3, . . . , 9} |
| 13 | 960 kHz | 320 | 16 | 8 | Half frame | {0, 1, 2, 3, . . . , 19} |
| 14 | 960 kHz | 320 | 8 | 4 | Half frame | {0, 1, 2, 3, . . . , 39} |
| 15 | 960 kHz | 320 | 4 | 2 | Half frame | {0, 1, 2, 3, . . . , 79} |
| 16 | 960 kHz | 320 | 2 | 1 | Half frame | {0, 1, 2, 3, . . . , 159} |
| 17 | 960 kHz | 320 | 1 | 1 | Half frame | {0, 1, 2, 3, . . . , 319} |

Figure 23:
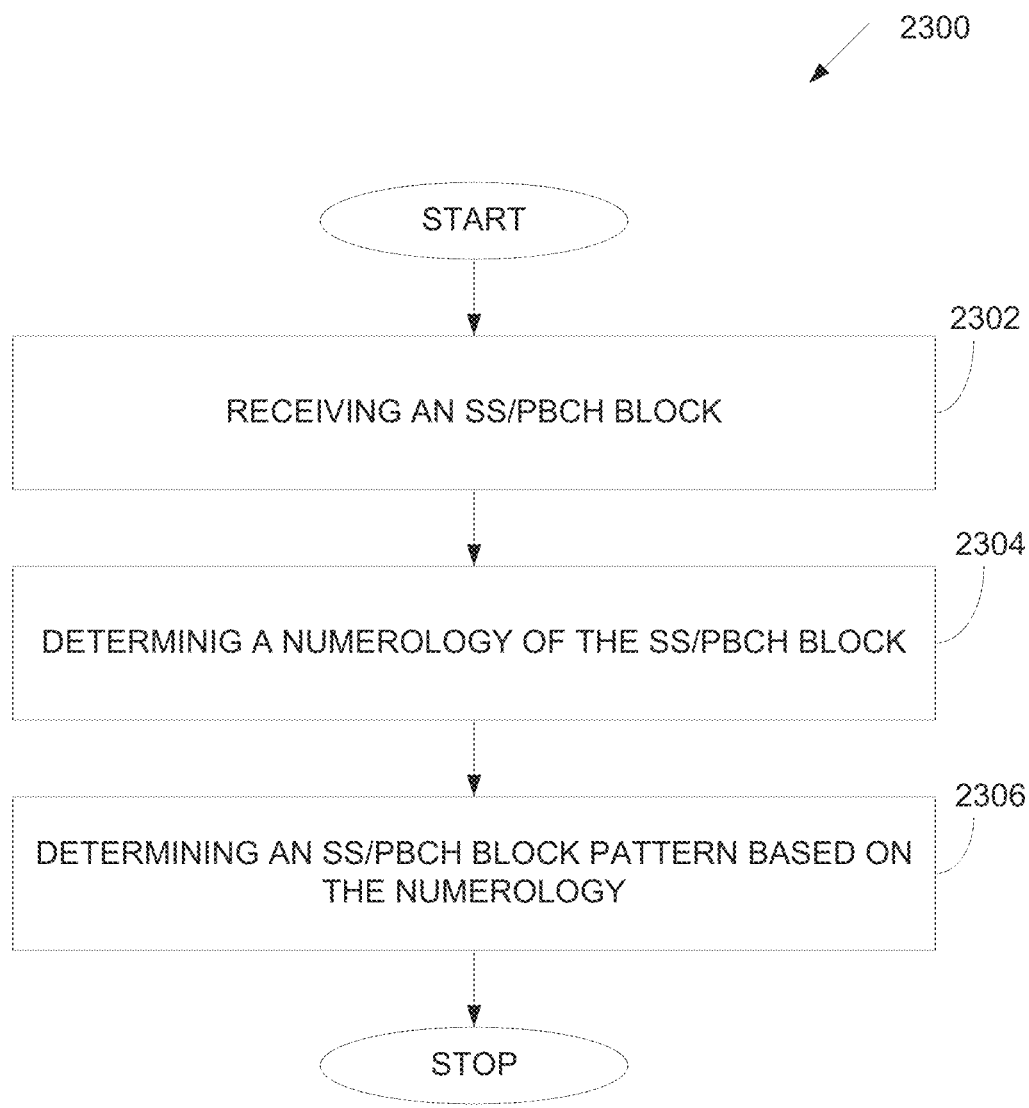
FIG. 23 illustrates a flow chart of a method for SS/PBCH block pattern according to embodiments of the present disclosure.

FIG. 23 illustrates a flow chart of a method 2300 for SS/PBCH block pattern according to embodiments of the present disclosure, as may be performed by UE (e.g., as 111-116 as illustrated in FIG. 1). An embodiment of the method 2300 shown in FIG. 23 is for illustration only. One or more of the components illustrated in FIG. 23 can be implemented in specialized circuitry configured to perform the noted functions or one or more of the components can be implemented by one or more processors executing instructions to perform the noted functions.

As illustrated in FIG. 23, the method 2300 begins at step 2302. In step 2302, the UE receives a SS/PBCH block.

In step 2304, the UE determines a numerology of the SS/PBCH block, wherein the numerology includes an SCS and a CP length.

In step 2306, the UE determines a SS/PBCH block pattern based on the numerology, the SS/PBCH block pattern including candidate SS/PBCH blocks that are mapped to slots within a half frame and a minimum gap ($N_{gap}^{\mu}$) between neighboring candidate SS/PBCH blocks, wherein: $N_{gap}^{\mu}=0$ symbol, based on a determination that the SCS included in the numerology of the SS/PBCH block is 120 kHz or 240 kHz; or $N_{gap}^{\mu}=1$ symbol, based on a determination that the SCS included in the numerology of the SS/PBCH block is 480 kHz or 960 kHz.

In one embodiment, the SS/PBCH block pattern in step 2306 is given by $S_{start}+N_{symb}^{slot} \cdot K \cdot n$, and $n \in S_{index}$; $S_{start}$ is a set of starting symbol indexes for the candidate SS/PBCH blocks in a number of slots (K); and $S_{index}$ is a set of indexes for the number of slots (K) within the half frame, wherein: $N_{symb}^{slot}=14$, based on a determination that the CP length included in the numerology of the SS/PBCH block is a normal CP length; or $N_{symb}^{slot}=12$, based on a determination that the CP length included in the numerology of the SS/PBCH block is an extended CP length.

In one embodiment, the SS/PBCH block pattern in step 2306 is given by $\{2, 8\}+14 \cdot n$, based on a determination that the SCS included in the numerology of the SS/PBCH block is 480 kHz or 960 kHz, and the CP length included in the numerology of the SS/PBCH block is the normal CP length.

In one embodiment, the SS/PBCH block pattern in step 2306 is given by $\{2, 8\}+12 \cdot n$, based on a determination that the SCS included in the numerology of the SS/PBCH block is 480 kHz or 960 kHz, and the CP length included in the numerology of the SS/PBCH block is the extended CP length.

In one embodiment, the UE determines a set of indexes ($S_{index}$) in the SS/PBCH block pattern based on whether the SS/PBCH block is operable with a shared spectrum channel access, wherein the set of indexes ($S_{index}$) includes a first set of indexes for the SS/PBCH block that is operable without the shared spectrum channel access and a second set of indexes for the SS/PBCH block that is operable with the shared spectrum channel access, and the first set of indexes is a subset of the second set of indexes.

In one embodiment, based on a determination that the SCS included in the numerology of the SS/PBCH block is 480 kHz, $S_{index}=\{0, 1, \ldots, 31\}$ for the SS/PBCH block operable without the shared spectrum channel access; or $S_{index}=\{0, 1, \ldots, 31\}+40 \cdot m$, where m=0, 1, 2, 3, for the SS/PBCH block operable with the shared spectrum channel access.

In one embodiment, based on a determination that the SCS included in the numerology of the SS/PBCH block is 960 kHz, $S_{index}=\{0, 1, \ldots, 31\}$ for the SS/PBCH block operable without the shared spectrum channel access; or $S_{index}=\{0, 1, \ldots, 63\}+80 \cdot m$, where m=0, 1, for the SS/PBCH block operable with shared spectrum channel access.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) in a wireless communication system, the UE comprising:
   a processor configured to:
      identify a sub-carrier spacing (SCS) of synchronization signal and physical broadcast channel (SS/PBCH) blocks, and
      identify a SS/PBCH block pattern related to one or more candidate SS/PBCH blocks for a half frame based on the SCS, wherein:
         the SCS is 480 kHz or 960 kHz, and
         first symbols of the one or more candidate SS/PBCH blocks in the half frame have indexes $\{2\ 9\}+14 \cdot n$, where n=0, 1, 2, 3 . . . , 31; and
   a transceiver operably coupled to the processor, the transceiver configured to receive a SS/PBCH block based on the identified SS/PBCH block pattern.

2. The UE of claim 1, wherein
a maximum number of the one or more candidate SS/PBCH blocks in the half frame is 64.

3. The UE of claim 2, wherein a maximum number of SS/PBCH blocks transmitted within the half frame is 64 for an operation without shared spectrum channel access.

4. The UE of claim 2, wherein a maximum number of SS/PBCH blocks transmitted within the half frame is 64 for an operation with shared spectrum channel access.

5. The UE of claim 1, wherein the wireless communication system operates in carrier frequencies within a frequency range between 52600 MHz and 71000 MHz.

6. A base station (BS) in a wireless communication system, the BS comprising:
   a processor configured to:
      identify a sub-carrier spacing (SCS) of synchronization signal and physical broadcast channel (SS/PBCH) blocks, and
      identify a SS/PBCH block pattern related to one or more candidate SS/PBCH blocks for a half frame based on the SCS, wherein:
         the SCS is 480 kHz or 960 kHz, and
         first symbols of the one or more candidate SS/PBCH blocks in the half frame have indexes $\{2,9\}+14\ n$, where n=0, 1, 2, 3 . . . , 31; and
   a transceiver operably connected to the processor, the transceiver configured to transmit the SS/PBCH blocks based on the identified SS/PBCH block pattern.

7. The BS of claim 5, wherein
a maximum number of the one or more candidate SS/PBCH blocks in the half frame is 64.

8. The BS of claim 6, wherein a maximum number of SS/PBCH blocks transmitted within the half frame is 64 for an operation without shared spectrum channel access.

9. The BS of claim 6, wherein a maximum number of SS/PBCH blocks transmitted within the half frame is 64 for an operation with shared spectrum channel access.

10. The BS of claim 6, wherein the wireless communication system operates in carrier frequencies within a frequency range between 52600 MHz and 71000 MHz.

11. A method of a user equipment (UE) in a wireless communication system, the method comprising:
   identifying a sub-carrier spacing (SCS) of synchronization signal and physical broadcast channel (SS/PBCH) blocks; and
   identifying a SS/PBCH block pattern related to one or more candidate SS/PBCH blocks for a half frame based on the SCS wherein:
      the SCS is 480 kHz or 960 kHz, and
      first symbols of the one or more candidate SS/PBCH blocks in the half frame have indexes $\{2,9\}+14 \cdot n$, where n=0, 1, 2, 3 . . . , 31; and
   receiving a SS/PBCH block based on the identified SS/PBCH block pattern.

12. The method of claim 11, wherein
a maximum number of the one or more candidate SS/PBCH blocks in the half frame is 64.

13. The method of claim 12, wherein a maximum number of SS/PBCH blocks transmitted within the half frame is 64 for an operation without shared spectrum channel access.

14. The method of claim 12, wherein a maximum number of SS/PBCH blocks transmitted within the half frame is 64 for an operation with shared spectrum channel access.

15. A method of a base station (BS) in a wireless communication system, the method comprising:
- identifying a sub-carrier spacing (SCS) of synchronization signal and physical broadcast channel (SS/PBCH) blocks;
- identifying a SS/PBCH block pattern related to one or more candidate SS/PBCH blocks for a half frame based on the SCS, wherein:
  - the SCS is 480 kHz or 960 kHz, and
  - first symbols of the one or more candidate SS/PBCH blocks in the half frame have indexes $\{2,9\}+14\cdot n$, where n=0, 1, 2, 3 . . . , 31; and
- transmitting the SS/PBCH blocks based on the identified SS/PBCH block pattern.

16. The method of claim 13, wherein a maximum number of the one or more candidate SS/PBCH blocks in the half frame is 64.

17. The method of claim 13, wherein a maximum number of SS/PBCH blocks transmitted within the half frame is 64 for an operation without shared spectrum channel access and for an operation with shared spectrum channel access.

18. The method of claim 15, wherein the wireless communication system operates in carrier frequencies within a frequency range between 52600 MHz and 71000 MHz.

19. The method of claim 11, wherein the wireless communication system operates in carrier frequencies within a frequency range between 52600 MHz and 71000 MHz.

* * * * *